(12) United States Patent
Lee et al.

(10) Patent No.: US 10,911,800 B2
(45) Date of Patent: *Feb. 2, 2021

(54) APPARATUSES AND METHODS FOR TRANSMITTING OR RECEIVING A BROADCAST CONTENT VIA ONE OR MORE NETWORKS

(71) Applicant: LG ELECTRONICS INC., Seoul (KR)

(72) Inventors: Jangwon Lee, Seoul (KR); Sejin Oh, Seoul (KR); Kyoungsoo Moon, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/107,187

(22) PCT Filed: Jan. 13, 2015

(86) PCT No.: PCT/KR2015/000343
§ 371 (c)(1),
(2) Date: Jun. 22, 2016

(87) PCT Pub. No.: WO2015/105400
PCT Pub. Date: Jul. 16, 2015

(65) Prior Publication Data
US 2017/0019688 A1    Jan. 19, 2017

Related U.S. Application Data

(60) Provisional application No. 61/926,933, filed on Jan. 13, 2014.

(51) Int. Cl.
*H04N 21/238* (2011.01)
*H04N 21/43* (2011.01)
(Continued)

(52) U.S. Cl.
CPC ....... *H04N 21/238* (2013.01); *H04N 21/4307* (2013.01); *H04N 21/4622* (2013.01);
(Continued)

(58) Field of Classification Search
CPC ............. H04N 21/238; H04N 21/4307; H04N 21/4622; H04N 21/6106; H04N 21/631; H04N 21/8547; H04N 21/64707
(Continued)

(56) References Cited

U.S. PATENT DOCUMENTS

2010/0189256 A1   7/2010   Doehla et al.
2011/0173010 A1   7/2011   Lecomte et al.
(Continued)

FOREIGN PATENT DOCUMENTS

CN   103155584 A   6/2013
JP   200153703      9/2002
(Continued)

OTHER PUBLICATIONS

Search Report of European Patent Office in Appl'n No. 15735354.1, dated Oct. 12, 2017.
(Continued)

*Primary Examiner* — Michael R Telan
(74) *Attorney, Agent, or Firm* — Dentons US LLP

(57) ABSTRACT

The present invention relates to an apparatus for supporting hybrid broadcasting in a digital broadcasting system. The present invention provides an apparatus for receiving a broadcast content via one or more networks. The apparatus comprises a broadcast network interface for receiving a broadcast stream including a first portion of the broadcast content via a broadcast network; a heterogeneous network interface for receiving a heterogeneous stream including a second portion of the broadcast content via a heterogeneous network; and wherein the broadcast stream further includes
(Continued)

timeline reference signaling information containing metadata for synchronizing streams transmitted via the one or more networks, and wherein the timeline reference signaling information includes at least one timeline reference information reconstituting timeline of at least one of the broadcast stream and the heterogeneous stream, a processor for configuring the broadcast content using the broadcast stream and the heterogeneous stream based on the timeline reference signaling information. The present invention is effective in easily synchronizing transport streams transmitted through each of heterogeneous networks.

10 Claims, 39 Drawing Sheets

(51) Int. Cl.
    *H04N 21/462*     (2011.01)
    *H04N 21/61*     (2011.01)
    *H04N 21/8547*     (2011.01)
    *H04N 21/63*     (2011.01)

(52) U.S. Cl.
    CPC ....... *H04N 21/6106* (2013.01); *H04N 21/631* (2013.01); *H04N 21/8547* (2013.01)

(58) Field of Classification Search
    USPC .................. 725/109–110; 348/515; 709/219
    See application file for complete search history.

(56) References Cited

U.S. PATENT DOCUMENTS

| | | | |
|---|---|---|---|
| 2012/0230389 A1* | 9/2012 | Laurent | H04N 21/235 375/240.01 |
| 2013/0074141 A1* | 3/2013 | Hwang | H04N 21/8126 725/116 |
| 2013/0293677 A1 | 11/2013 | Lee et al. | |
| 2013/0335629 A1* | 12/2013 | Laurent | H04N 21/236 348/515 |
| 2013/0346566 A1* | 12/2013 | Kwon | H04N 21/4622 709/219 |
| 2014/0013346 A1 | 1/2014 | Amsterdam et al. | |
| 2014/0307734 A1* | 10/2014 | Luby | H04L 12/18 370/390 |

FOREIGN PATENT DOCUMENTS

| | | |
|---|---|---|
| JP | 2004-328188 A | 11/2004 |
| JP | 2010200287 A | 9/2010 |
| JP | 2012-205075 A | 10/2012 |
| JP | 2013-545355 A | 12/2013 |
| KR | 10-2013-0040156 A | 4/2013 |
| KR | 10-2013-0123314 A | 11/2013 |
| WO | 2012/099359 A2 | 7/2012 |
| WO | 2013/061526 A1 | 5/2013 |
| WO | 2013/089437 A1 | 6/2013 |

OTHER PUBLICATIONS

Office Action of Japanese Patent Office in Appl'n No. 2016-544794, dated Sep. 5, 2017.

\* cited by examiner

[Fig. 1]
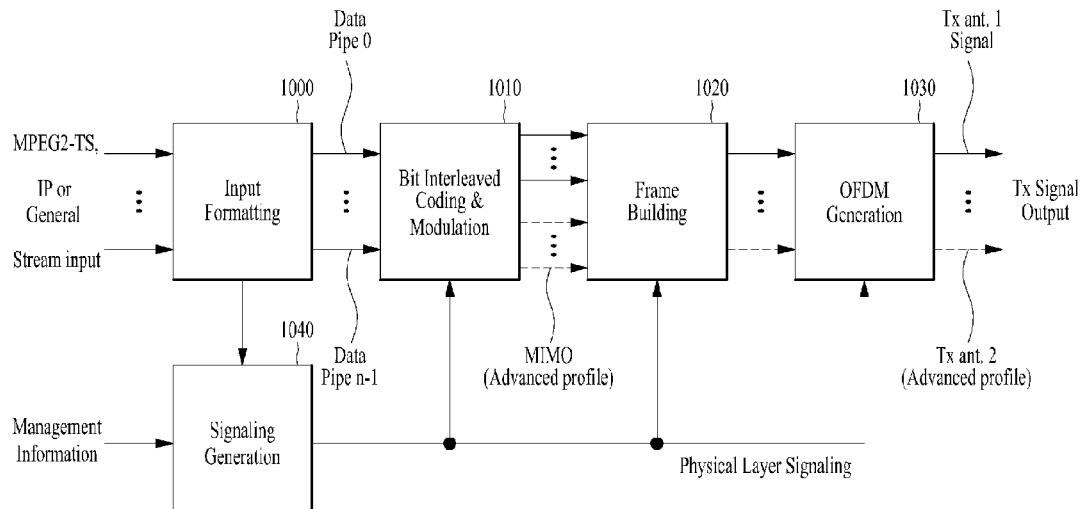
[Fig. 2]
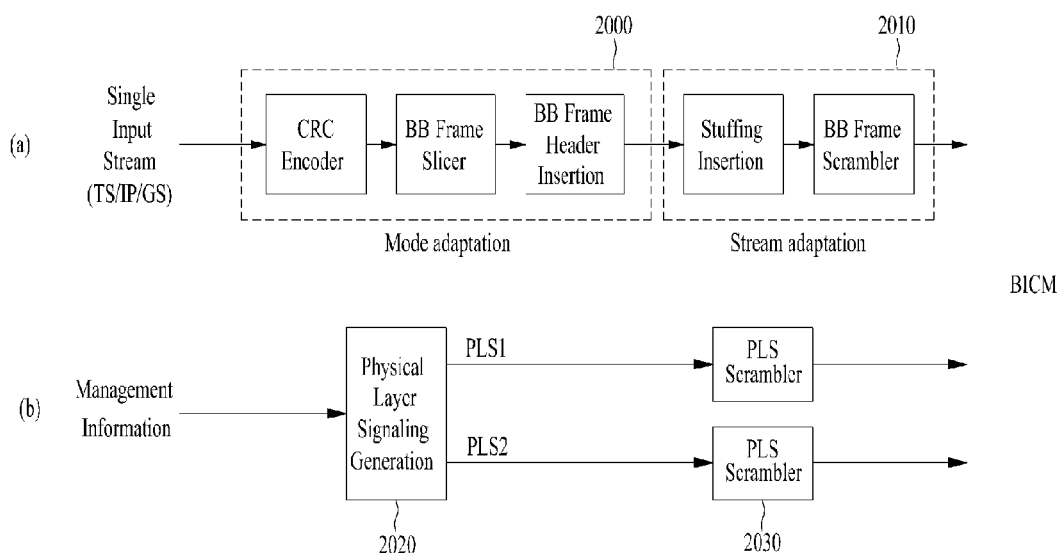
[Fig. 3]
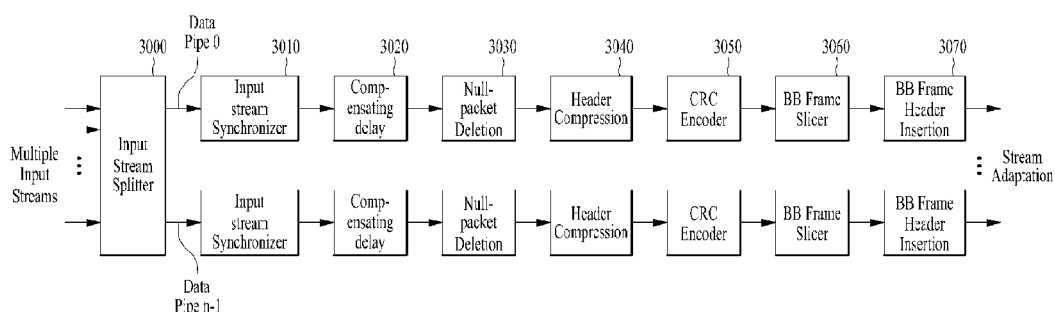

[Fig. 4]
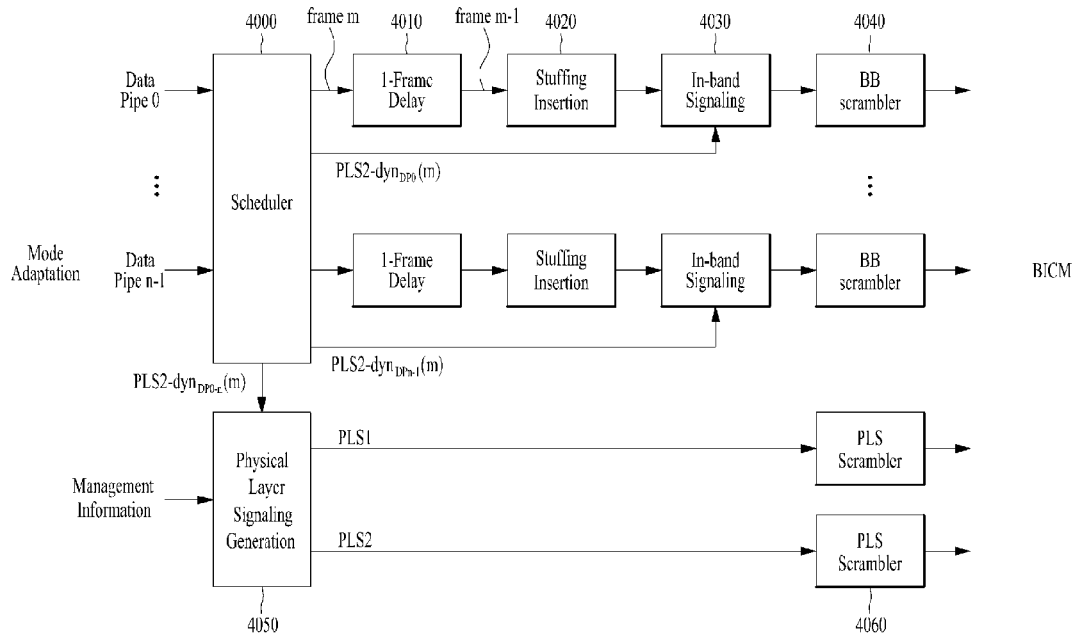
[Fig. 5]
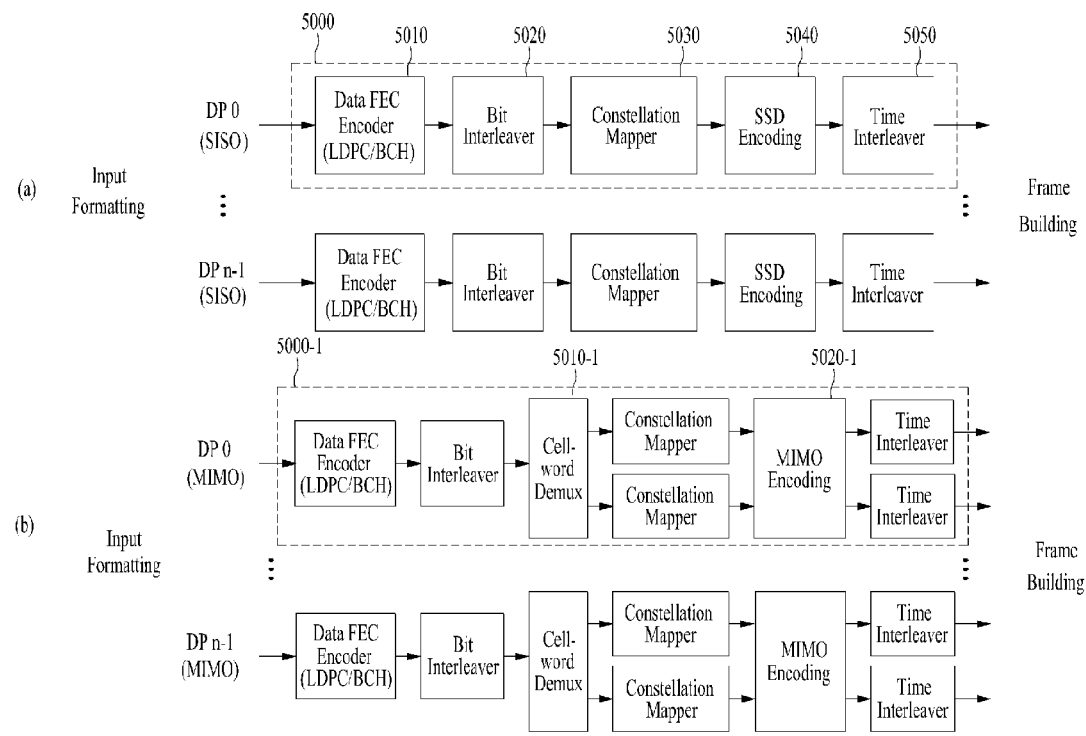

[Fig. 6]
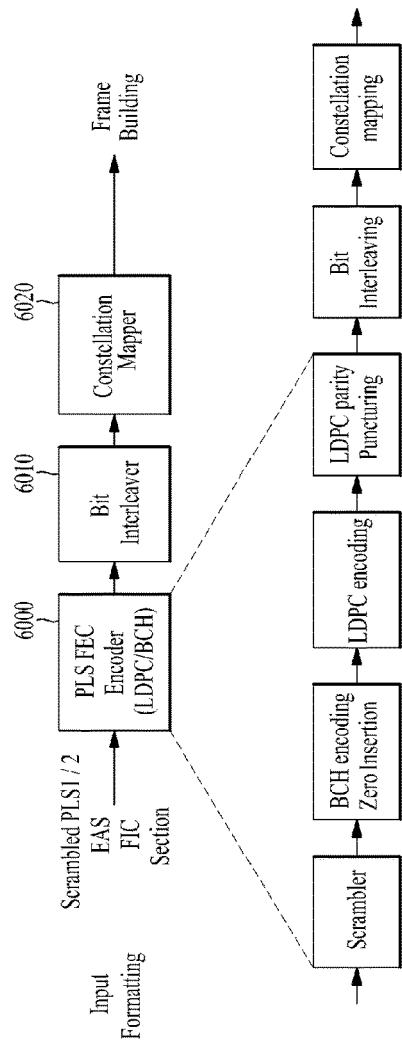
[Fig. 7]
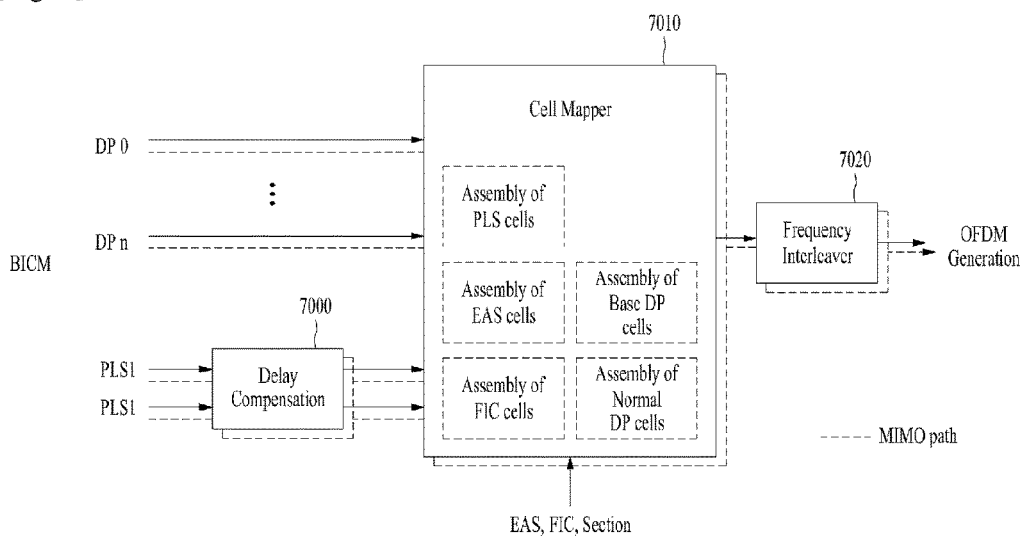

[Fig. 8]
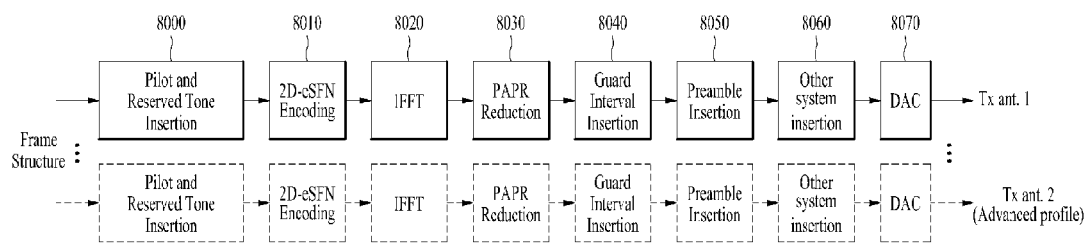
[Fig. 9]
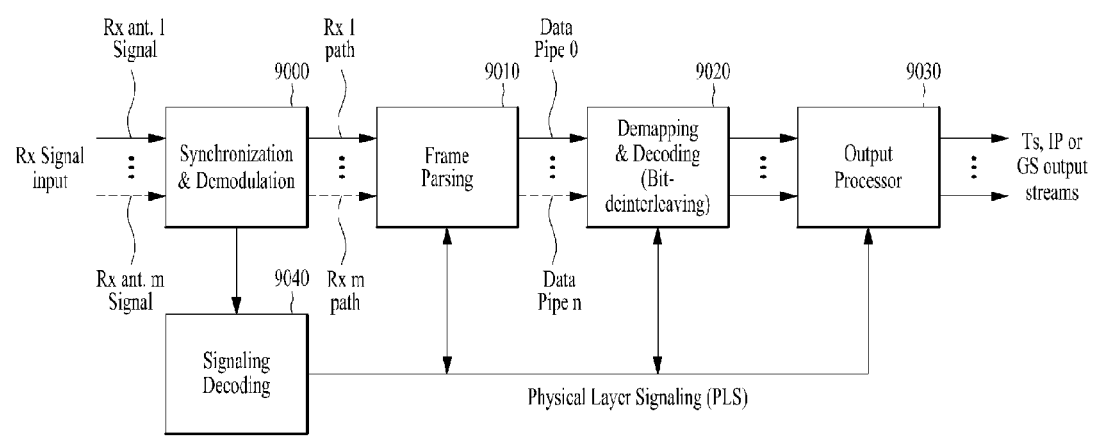

[Fig. 10]
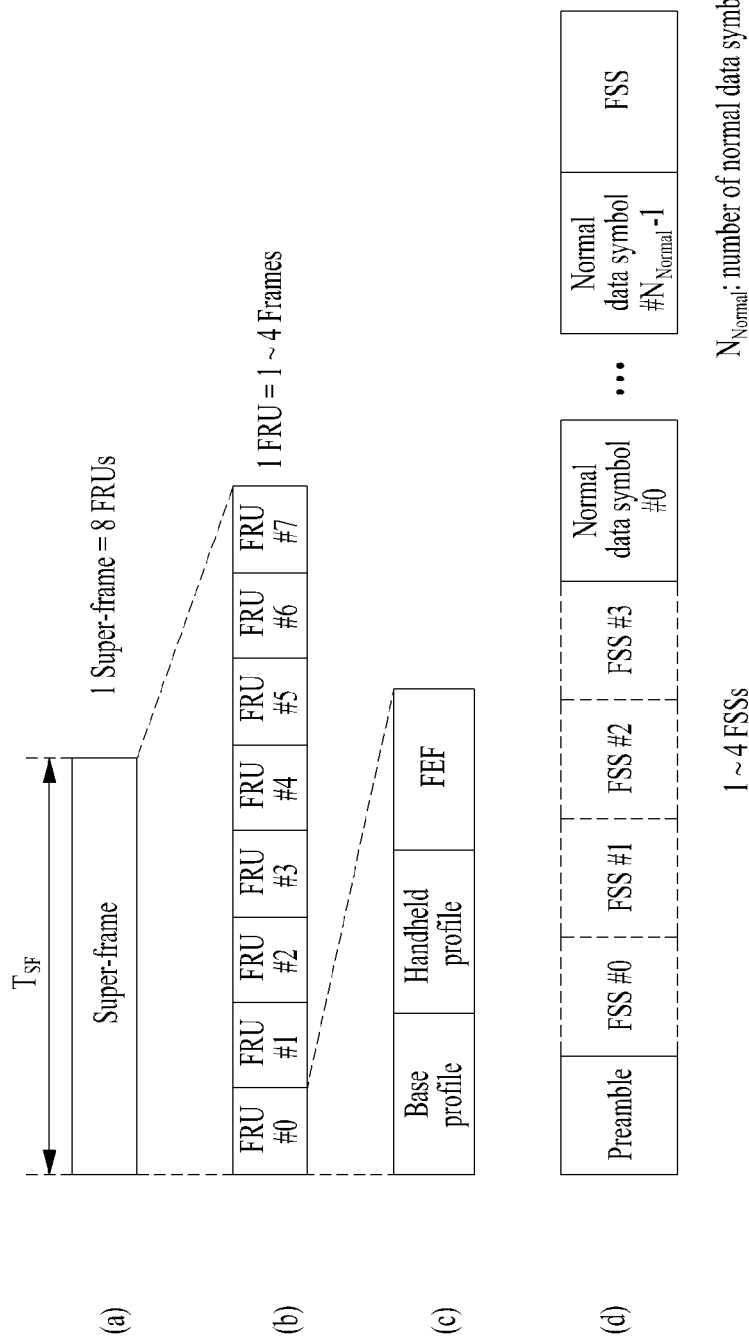

[Fig. 11]
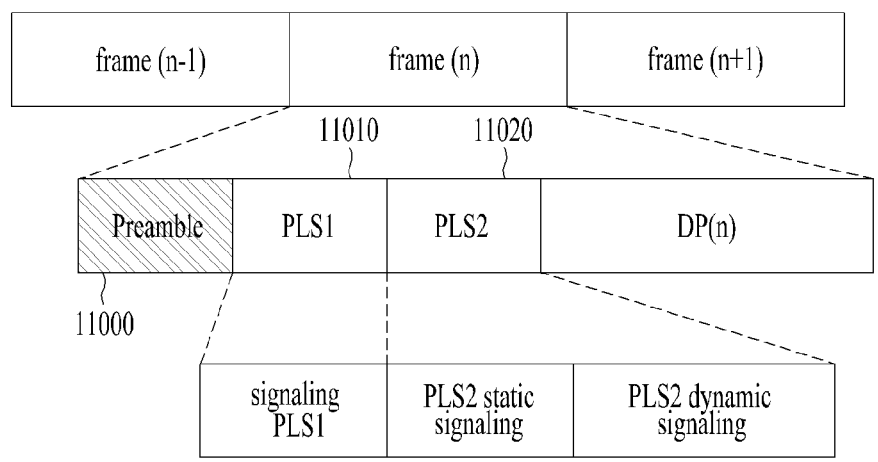
[Fig. 12]
| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Fig. 13]

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

[Fig. 14]

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1: NUM_AUX | |
|         AUX_STREAM_TYPE | 4 |
|         AUX_PRIVATE_CONF | 28 |
|     end | |
| end | |

[Fig. 15]
| Content | | | Bit |
|---|---|---|---|
| FRAME_INDEX | | | 5 |
| PLS_CHANGE_COUNTER | | | 4 |
| FIC_CHANGE_COUNTER | | | 4 |
| RESERVED | | | 16 |
| for i = 1: NUM_DP | | | |
| | | DP_ID | 6 |
| | | DP_START | 15 (or13) |
| | | DP_NUM_BLOCK | 10 |
| end | | RESERVED | 8 |
| EAC_FLAG | | | 1 |
| EAS_WAKE_UP_VERSION_NUM | | | 8 |
| if EAC_FLAG == 1 | | | |
| | | EAC_LENGTH_BYTE | 12 |
| else | | | |
| | | EAC_COUNTER | 12 |
| end | | | |
| for i=1:NUM_AUX | | | |
| | | AUX_PRIVATE_DYN | 48 |
| end | | | |
| CRC 32 | | | 32 |
[Fig. 16]

[Fig. 17]
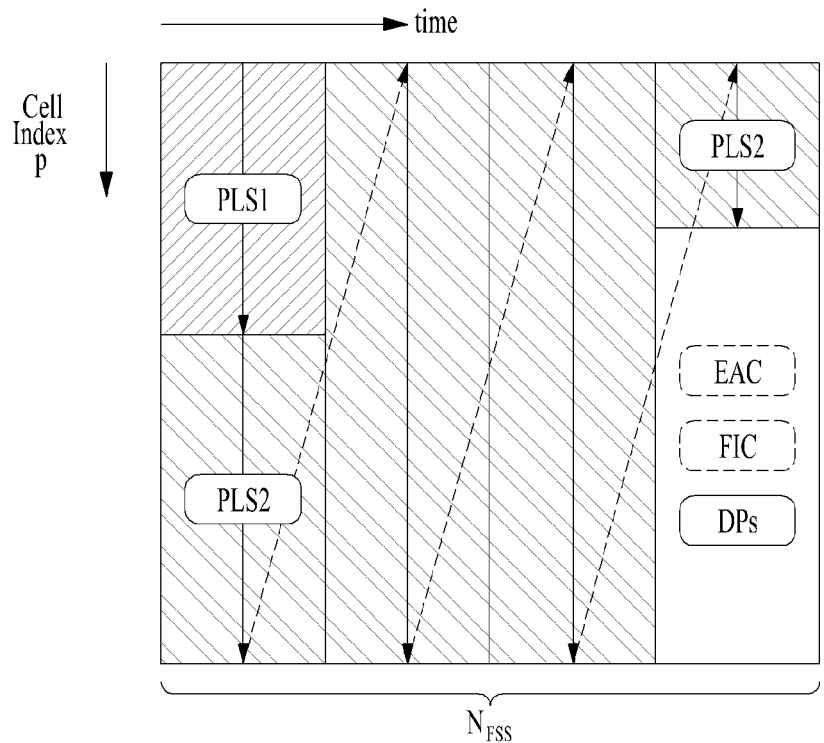
[Fig. 18]
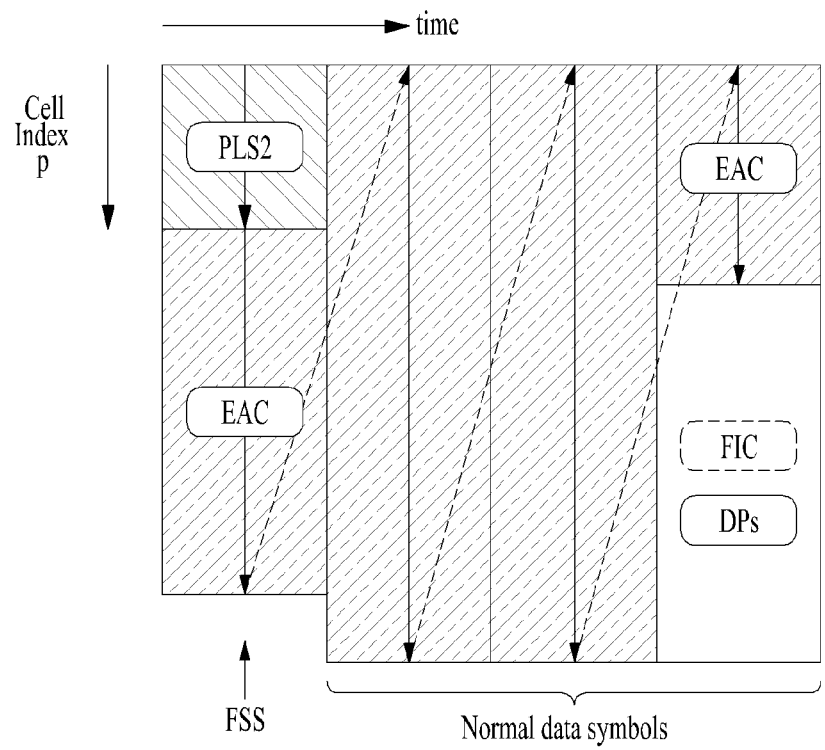

[Fig. 19]
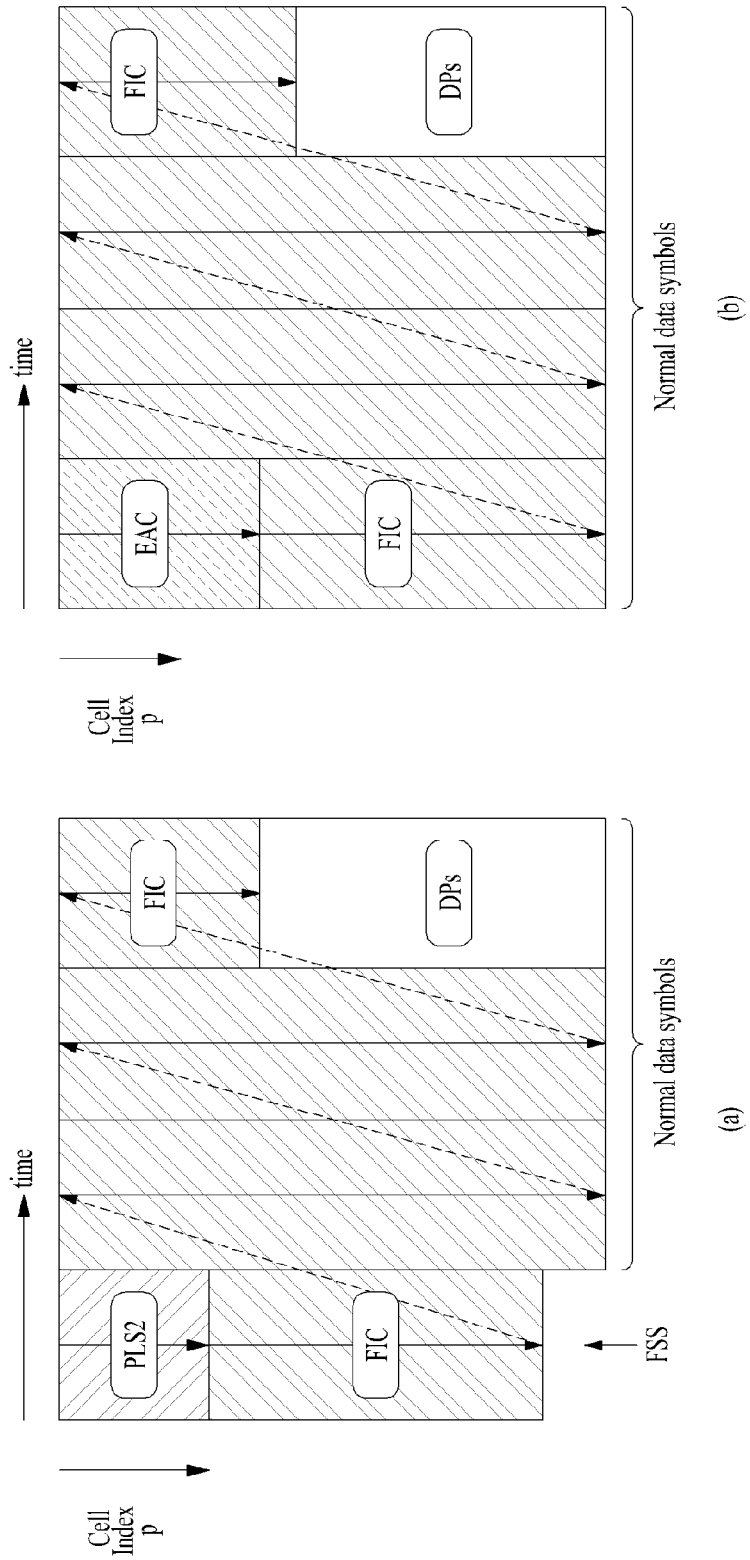

[Fig. 20]
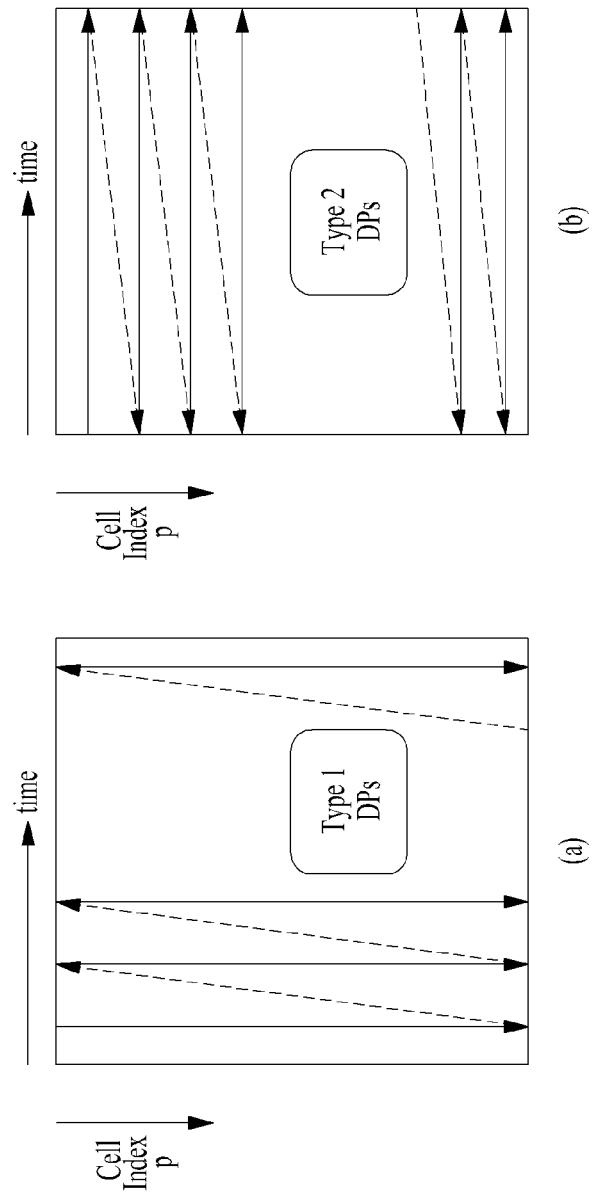

[Fig. 21]
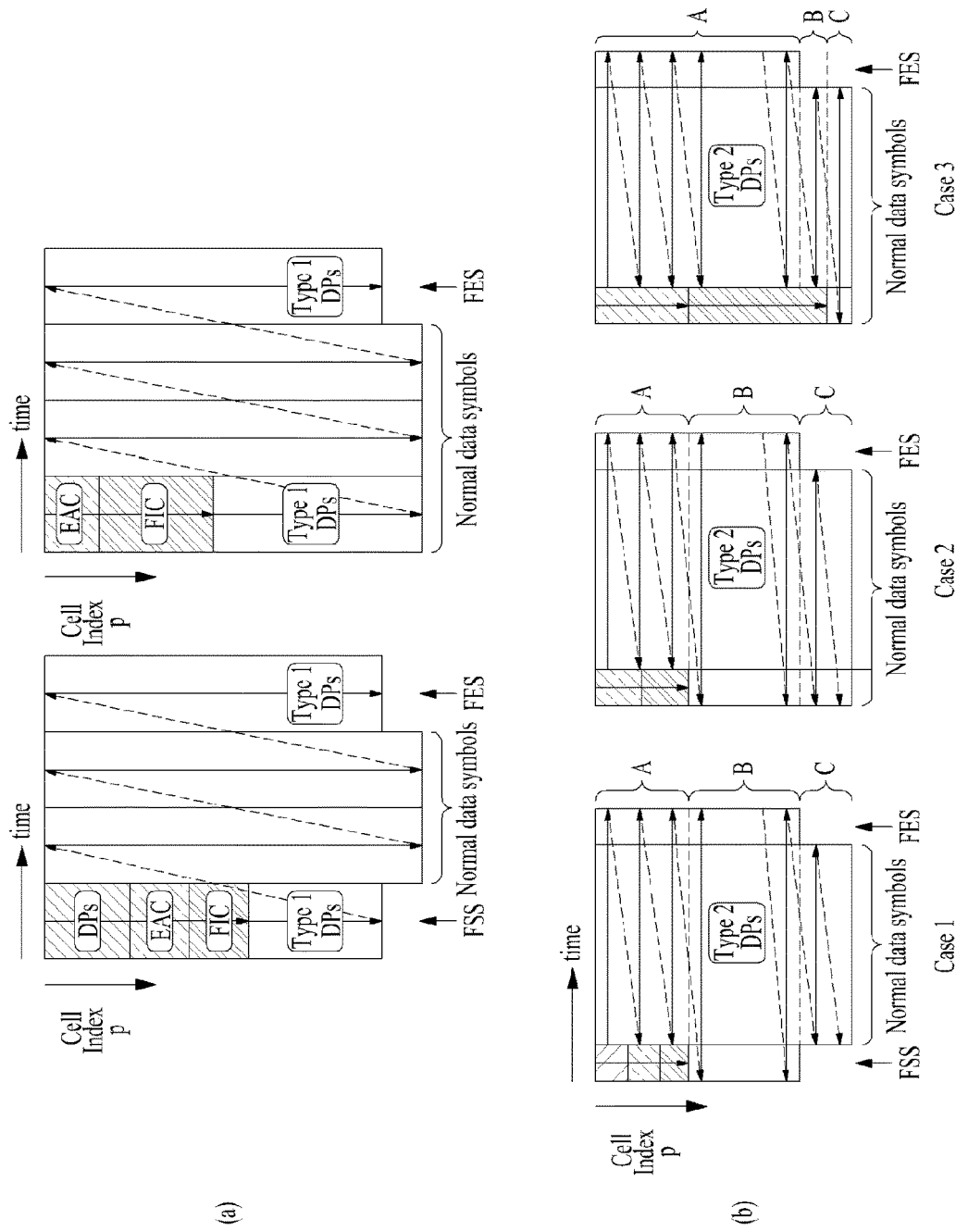
[Fig. 22]
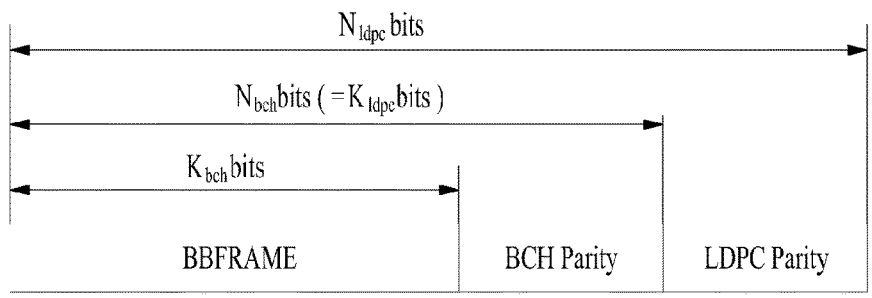

[Fig. 23]
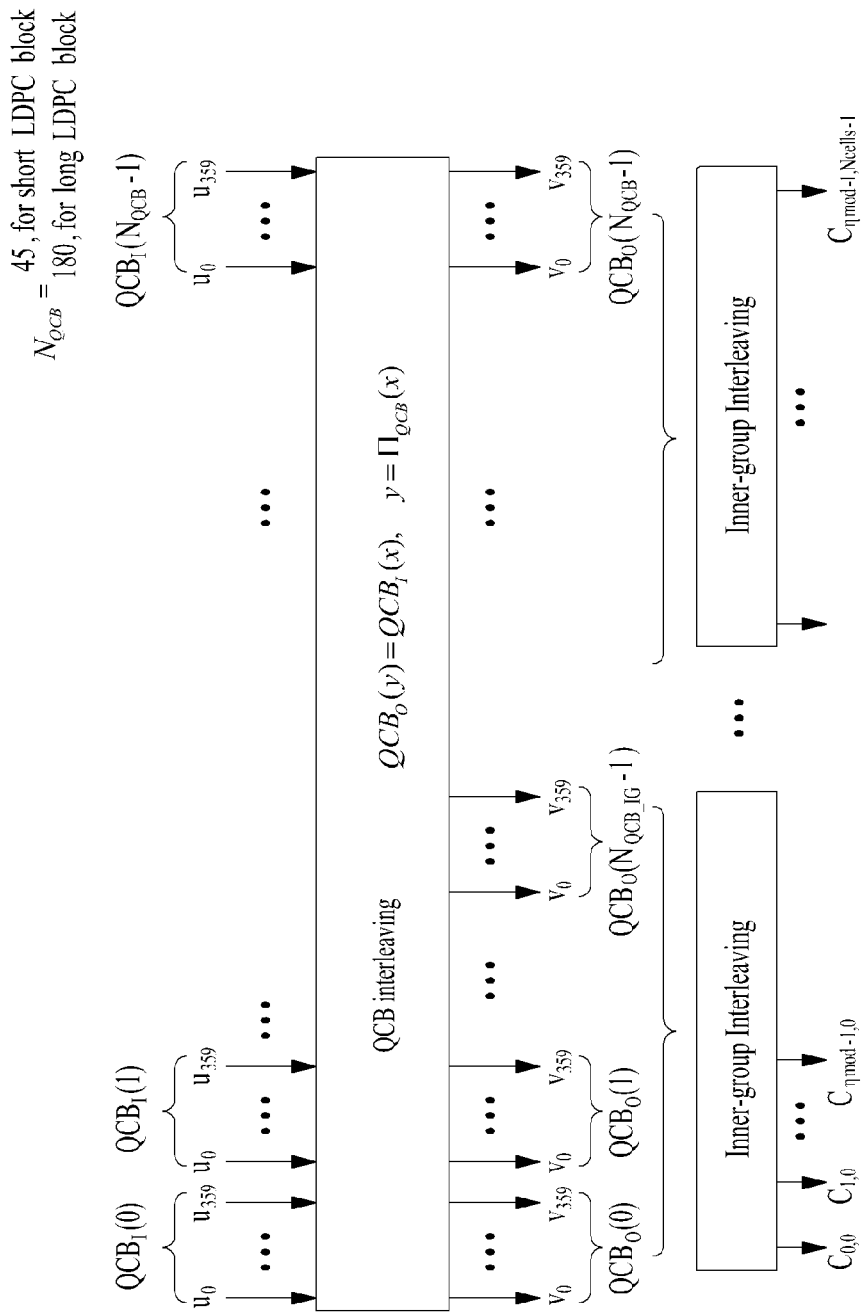

[Fig. 24]
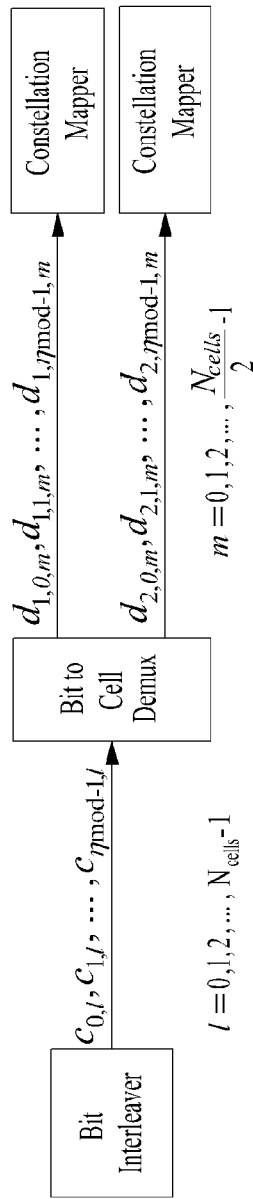
(a)
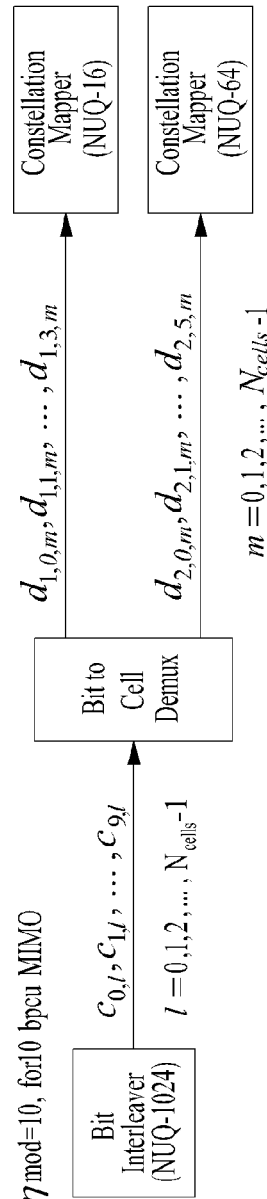
(b)

[Fig. 25]
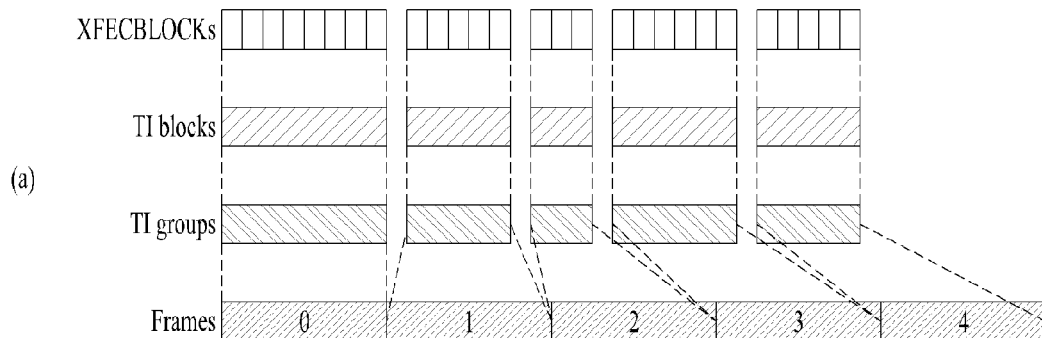
(a)
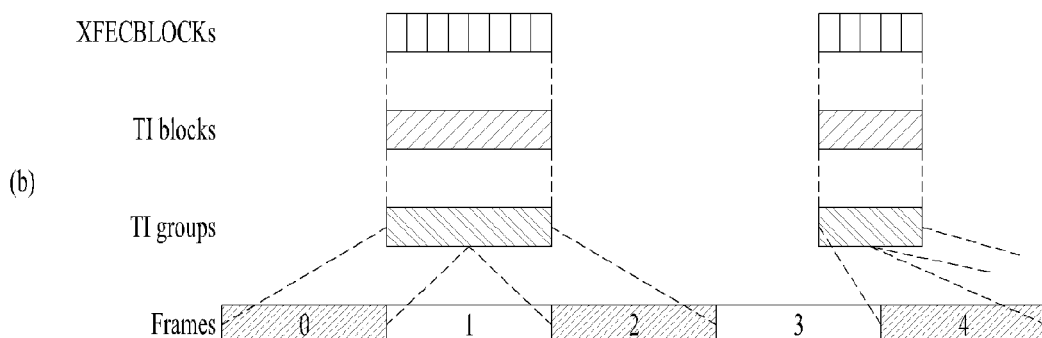
(b)
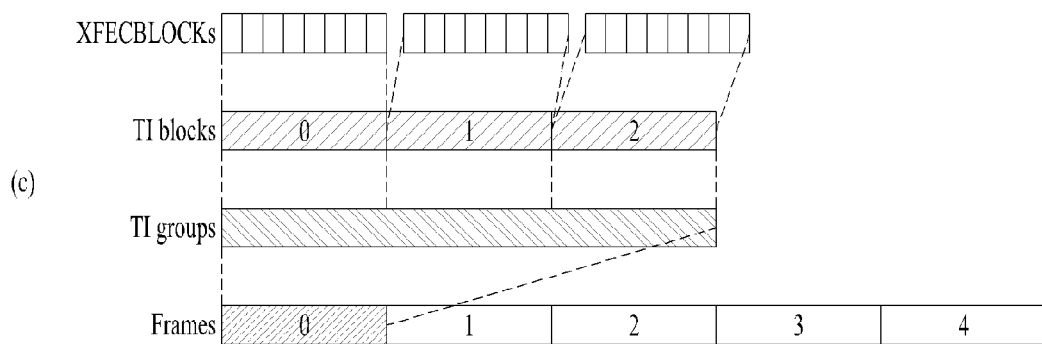
(c)

[Fig. 26]
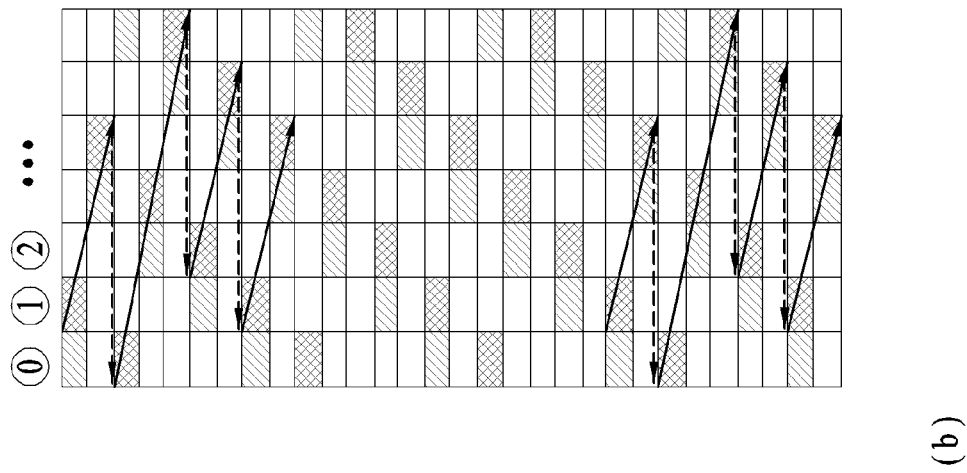
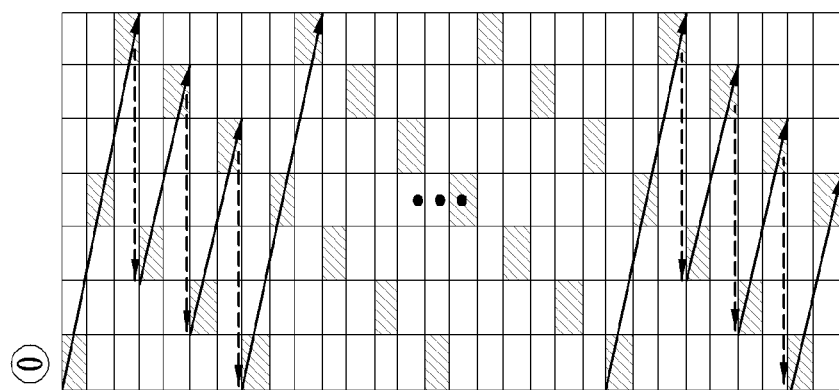
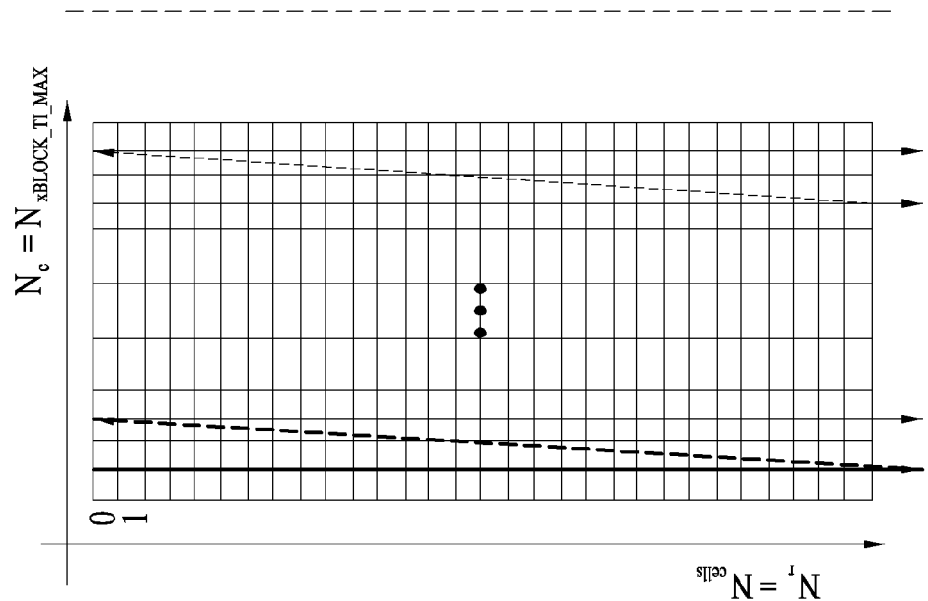

[Fig. 27]
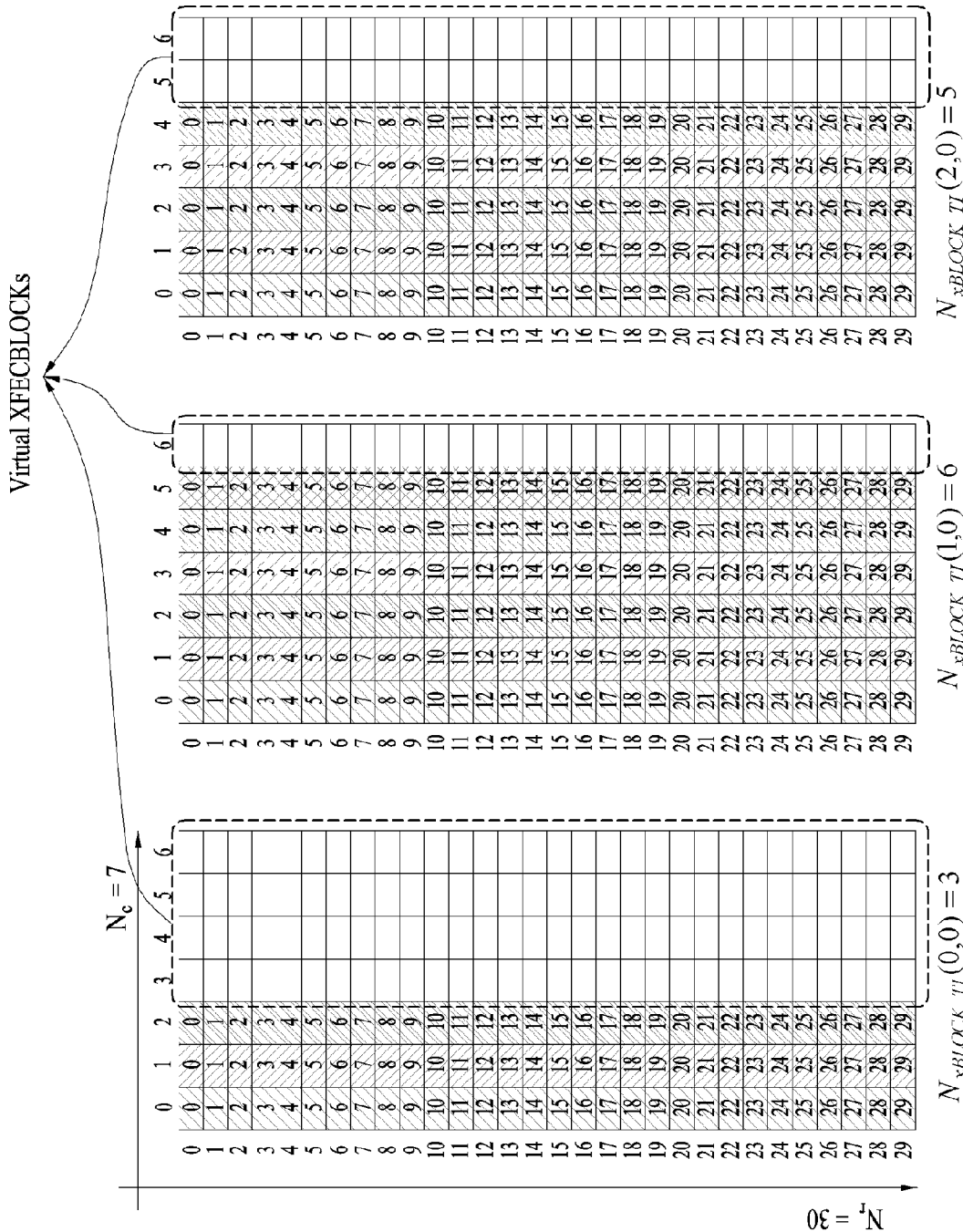

[Fig. 28]
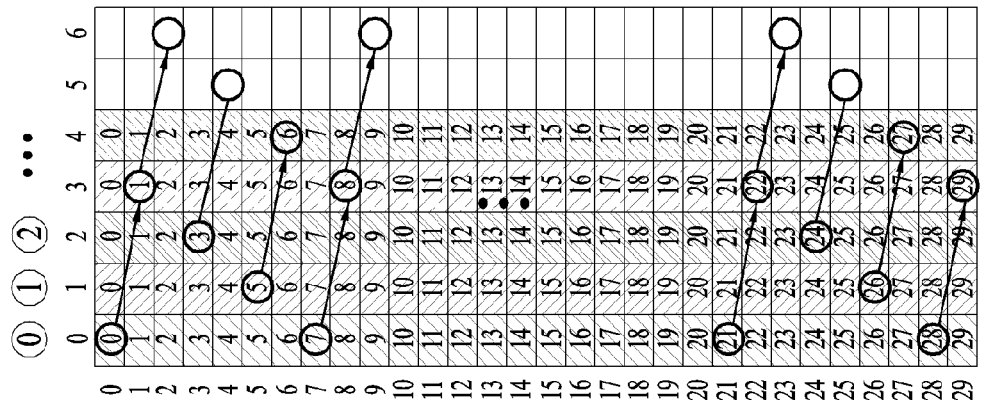
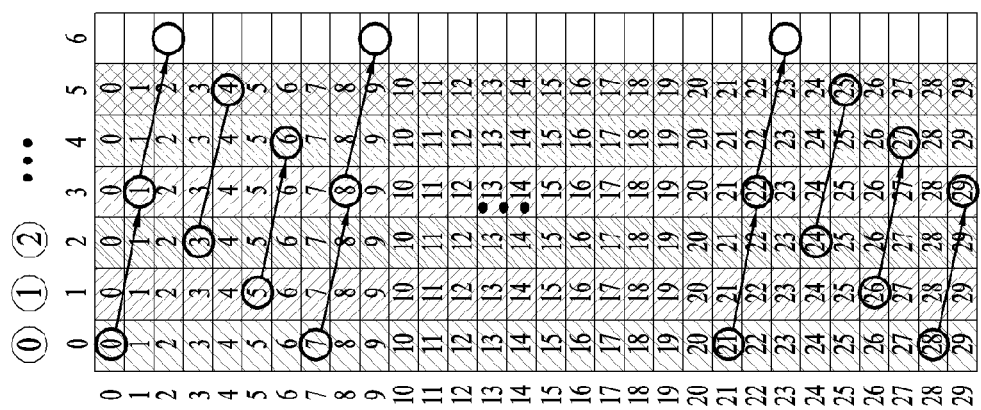
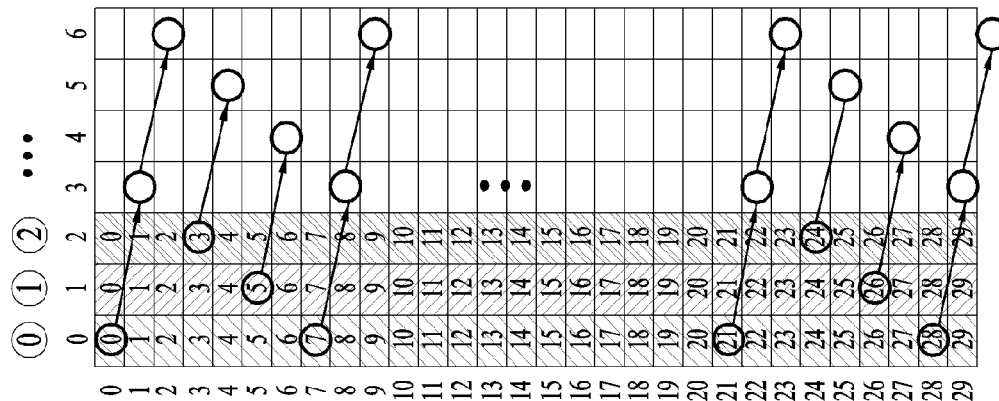

[Fig. 29]

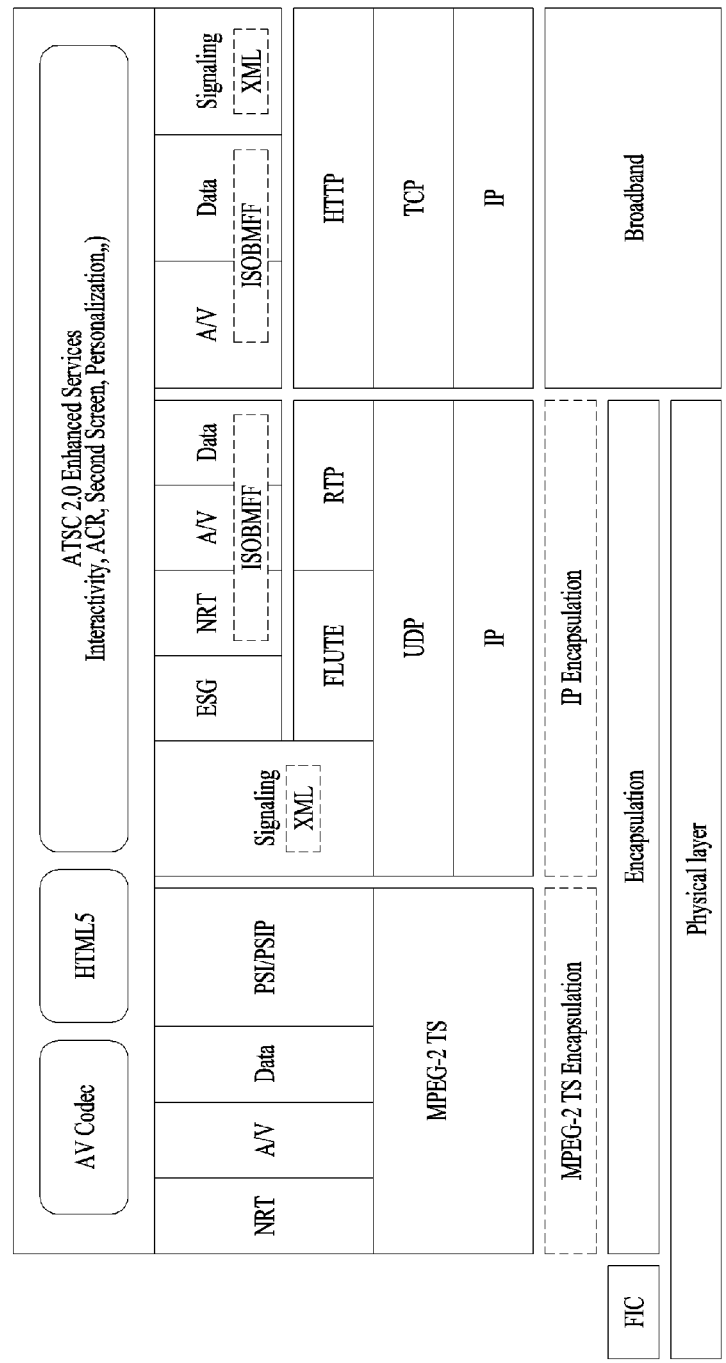
[Fig. 30]

[Fig. 31]
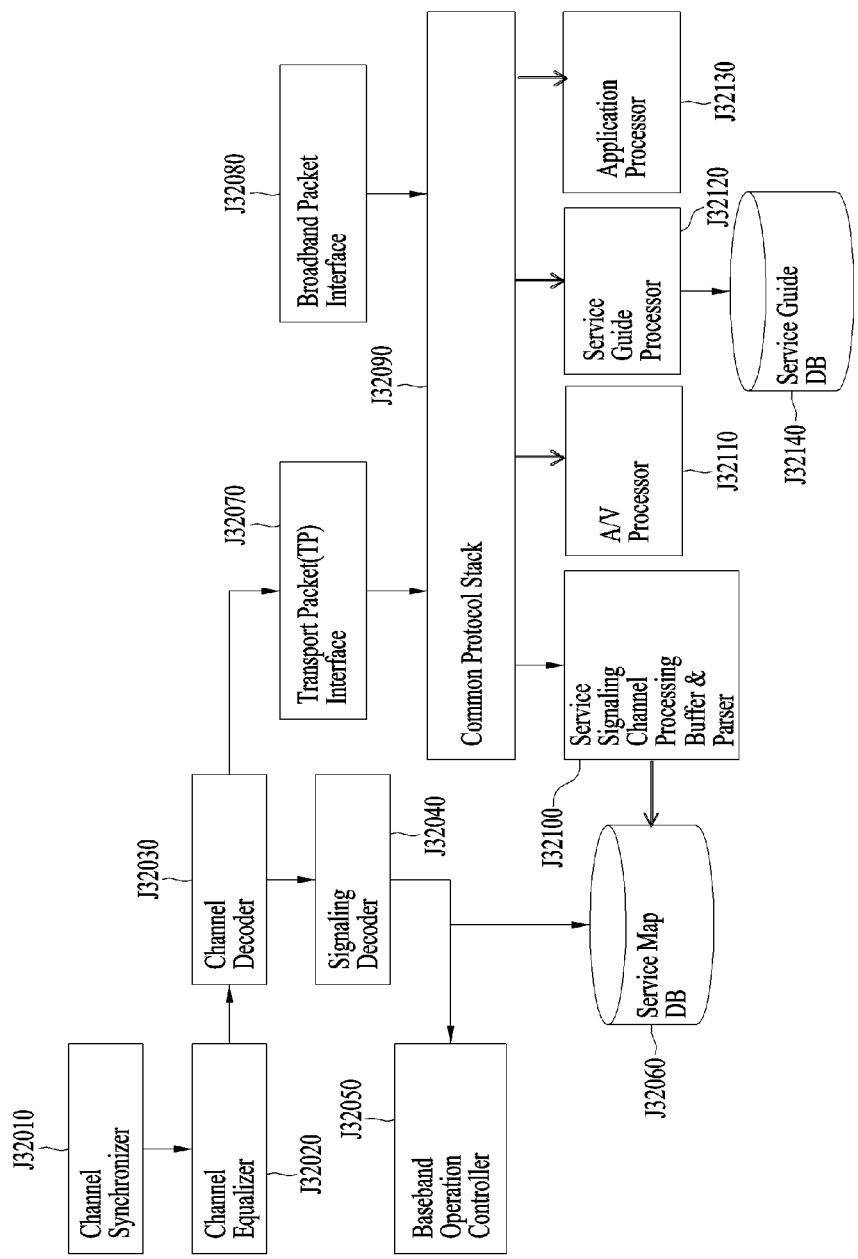

[Fig. 32]
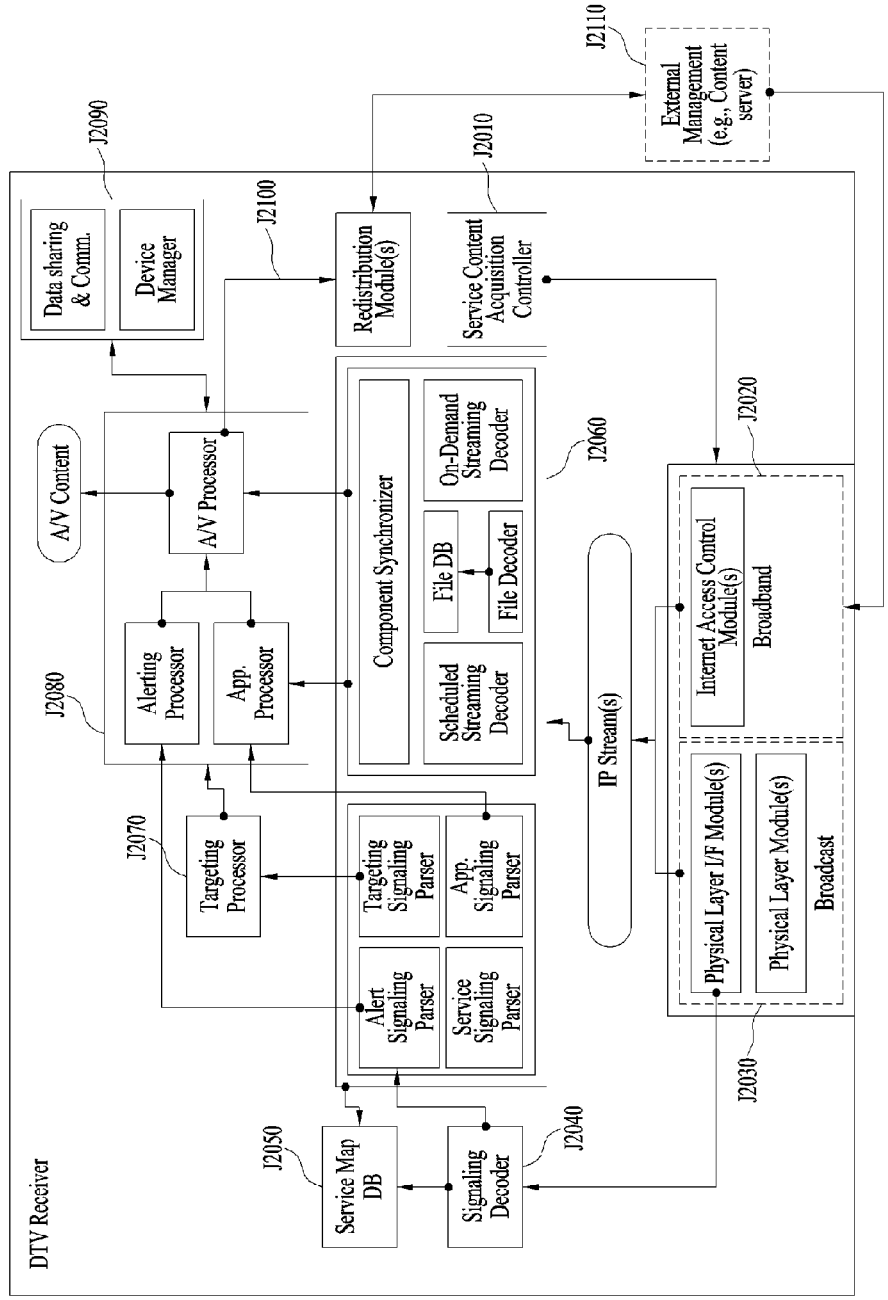

[Fig. 33]
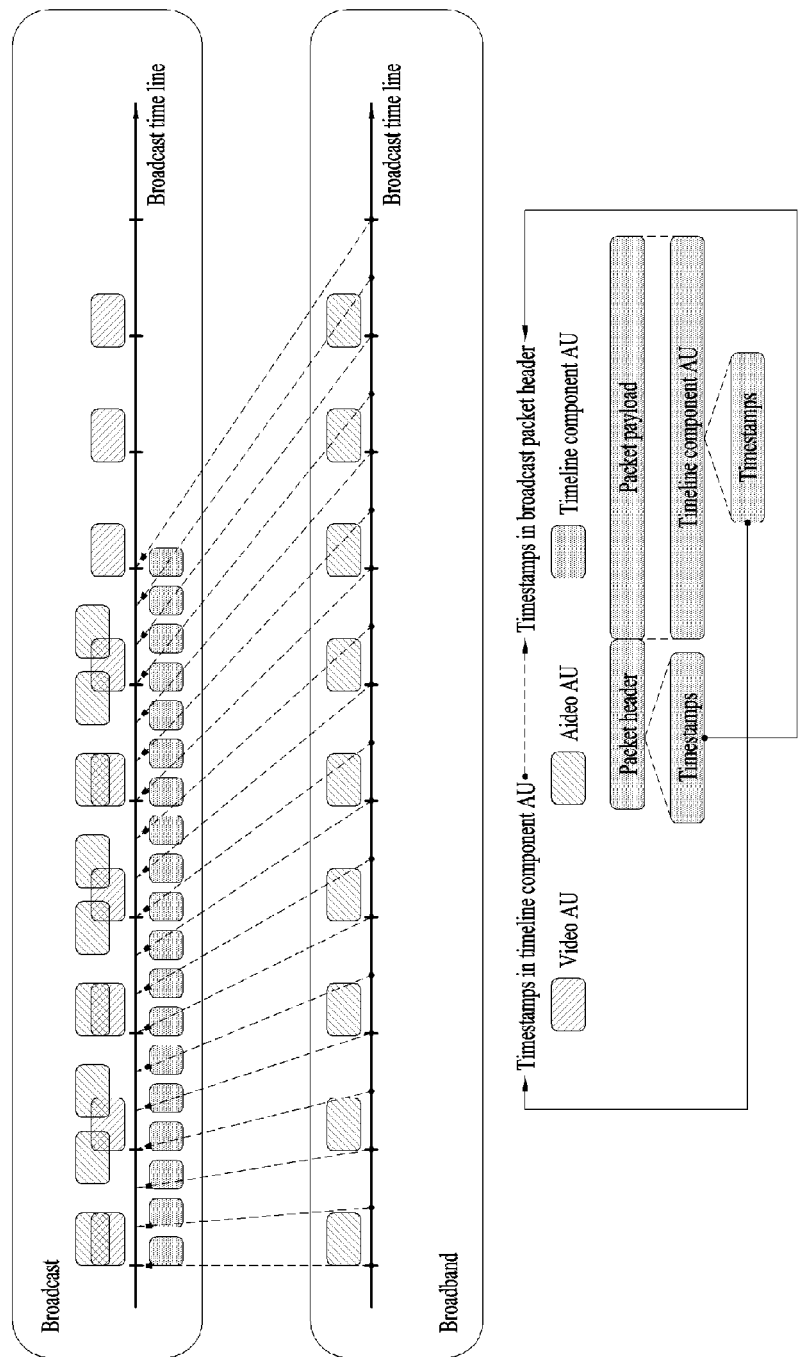

[Fig. 34]

| Syntax | Nb bits |
|---|---|
| Timeline_Component_AU { | |
|   identifier | 8 |
|   version | 8 |
|   AU_length | 32 |
|   location_flag | 1 |
|   PTS_flag | 1 |
|   DTS_flag | 1 |
|   media_time_flag | 1 |
|   NTP_time_flag | 1 |
|   PTP_time_flag | 1 |
|   timecode_flag | 1 |
|   PCR_time_flag | 1 |
|   if(location_flag) { | |
|     location_length | 8 |
|     location | variable |
|   } | |
|   if(media_time_flag) { | |
|     timescale | 32 |
|     if(PTS_flag) { | |
|       if(version == 1) { | |
|         media_time_PTS | 64 |
|       } | |
|       else { | |
|         media_time_PTS | 32 |
|       } | |
|     } | |
|     if(DTS_flag) { | |
|       if(version == 1) { | |
|         media_time_DTS | 64 |
|       } | |
|       else { | |
|         media_time_DTS | 32 |
|       } | |
|     } | |
|   } | |
|   if(NTP_time_flag) { | |
|     if(PTS_flag) { | |
|       if(version == 1) { | |
|         NTP_time_PTS | 64 |
|       } | |
|       else { | |
|         NTP_time_PTS | 32 |
|       } | |
|     } | |

| Syntax | Nb bits |
|---|---|
|     if(DTS_flag) { | |
|       if(version == 1) { | |
|         NTP_time_DTS | 64 |
|       } | |
|       else { | |
|         NTP_time_DTS | 32 |
|       } | |
|     } | |
|   } | |
|   if(PTP_time_flag) { | |
|     if(PTS_flag) { | |
|       if(version == 1) { | |
|         PTP_time_PTS | 64 |
|       } | |
|       else { | |
|         PTP_time_PTS | 32 |
|       } | |
|     } | |
|     if(DTS_flag) { | |
|       if(version == 1) { | |
|         PTP_time_DTS | 64 |
|       } | |
|       else { | |
|         PTP_time_DTS | 32 |
|       } | |
|     } | |
|   } | |
|   if(PCR_time_flag) { | |
|     if(PTS_flag) { | |
|       reserved | 7 |
|       PCR_time_PTS | 33 |
|     } | |
|     if(DTS_flag) { | |
|       reserved | 7 |
|       PCR_time_DTS | 33 |
|     } | |
|   } | |
| } | |

[Fig. 35]

| Syntax | No. Bits | Format |
|---|---|---|
| Timeline_component_AU{ | | |
| identifier | 8 | TBD |
| AU_length | 32 | uimsbf |
| location_flag | 1 | bslbf |
| PTS_flag | 1 | bslbf |
| DTS_flag | 1 | bslbf |
| timestamp_version_flag | 1 | bslbf |
| timsteamp_type | 4 | uimsbf |
|   if(location_flag){ | | |
| location_length | 8 | uimsbf |
| location | variable | |
| } | | |
|   if (timestamp_type==0x00) { | | |
|    timescale | 32 | |
|    if(PTS_flag) | | |
|     media_time_PTS | 32 or 64 | uimsbf |
|    if(DTS_flag) { | | |
|     media_time_DTS | 32 or 64 | uimsbf |
| } | | |
|   if (timestamp_type==0x01 \|\| <br>    timestamp_type==0x02 \|\| <br>    timestamp_type==0x03) { | | |
|   if(PTS_flag) | | |
|     timestamp_type_PTS | 32 or 64 | uimsbf |
|   if(DTS_flag) | | |
|     timestamp_to_DTS | 32 or 64 | uimsbf |
| } | | |
| } | | |

[Fig. 36]
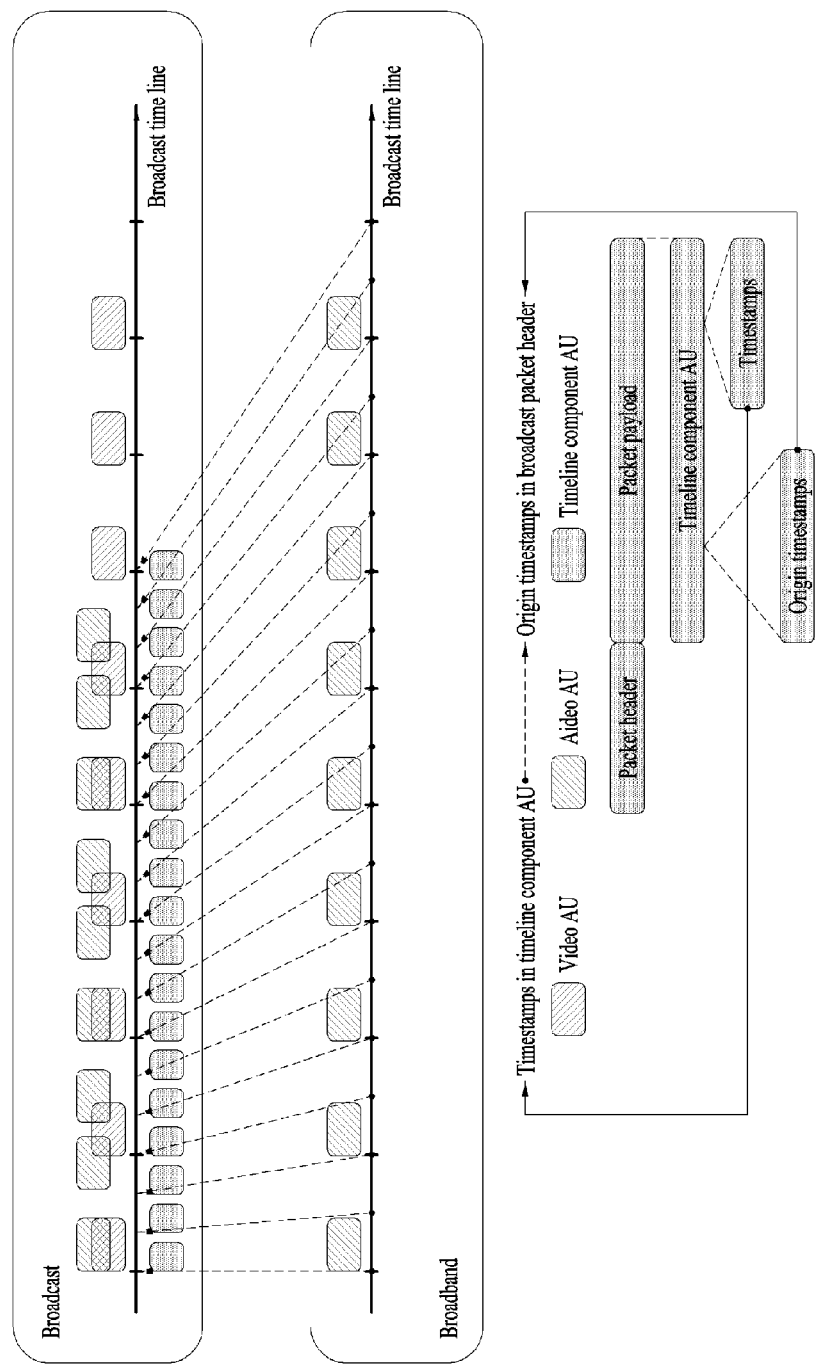

[Fig. 37]

| Syntax | Nb bits |
|---|---|
| Timeline_Component_AU { | |
|   identifier | 8 |
|   version | 8 |
|   AU_length | 32 |
|   origin_PTS_flag | 1 |
|   origin_DTS_flag | 1 |
|   reserved | 6 |
|   if(origin_PTS_flag) { | |
|     if(version==1) { | |
|       origin_PTS | 64 |
|     } | |
|     else { | |
|       origin_PTS | 32 |
|     } | |
|   } | |
|   if(origin_DTS_flag) { | |
|     if(version==1) { | |
|       origin_DTS | 64 |
|     } | |
|     else { | |
|       origin_DTS | 32 |
|     } | |
|   } | |
|   location_length | 1 |
|   PTS_flag | 1 |
|   DTS_flag | 1 |
|   media_time_flag | 1 |
|   NTP_time_flag | 1 |
|   PTP_time_flag | 1 |
|   timecode_flag | 1 |
|   PCR_time_flag | 1 |
|   if(location_flag) { | |
|     location_URL_length | 8 |
|     location_URL | variable |
|   } | |
|   if(media_time_flag) { | |
|     timescale | 32 |
|     if(PTS_flag) { | |
|       if(version==1) { | |
|         media_time_PTS | 64 |
|       } | |
|       else { | |
|         media_time_PTS | 32 |
|       } | |
|     } | |
|     if(DTS_flag) { | |
|       if(version==1) { | |
|         media_time_DTS | 64 |
|       } | |
|       else { | |
|         media_time_DTS | 32 |
|       } | |
|     } | |
|   } | |

| Syntax | Nb bits |
|---|---|
| if(NTP_time_flag) { | |
|   if(PTS_flag) { | |
|     if(version==1) { | |
|       NTP_time_PTS | 64 |
|     } | |
|     else { | |
|       NTP_time_PTS | 32 |
|     } | |
|   } | |
|   if(DTS_flag) { | |
|     if(version==1) { | |
|       NTP_time_DTS | 64 |
|     } | |
|     else { | |
|       NTP_time_DTS | 32 |
|     } | |
|   } | |
| } | |
| if(PTP_time_flag) { | |
|   if(PTS_flag) { | |
|     if(version==1) { | |
|       PTP_time_PTS | 64 |
|     } | |
|     else { | |
|       PTP_time_PTS | 32 |
|     } | |
|   } | |
|   if(DTS_flag) { | |
|     if(version==1) { | |
|       PTP_time_DTS | 64 |
|     } | |
|     else { | |
|       PTP_time_DTS | 32 |
|     } | |
|   } | |
| } | |
| if(PCR_time_flag) { | |
|   if(PTS_flag) { | |
|     reserved | 7 |
|     PCR_time_PTS | 33 |
|   } | |
|   if(DTS_flag) { | |
|     reserved | 7 |
|     PCR_time_DTS | 33 |
|   } | |
| } | |
| } | |

[Fig. 38]

| Syntax | No. Bits | Format |
|---|---|---|
| timeline_component_AU{ | | |
| identifier | 8 | TBD |
| AU_length | 32 | uimsbf |
| location_flag | 1 | bslbf |
| origin_timestamp_flag | 1 | bslbf |
| timestamp_version | 1 | bslbf |
| timestamp_type | 1 | bslbf |
| timestamp_format | 4 | bslbf |
| if(location_flag){ | | |
| location_length /*M*/ | 8 | uimsbf |
| location | 8*M | |
| } | | |
| if(origin_timestamp_flag){ | | |
| origin_timestamp_version | 1 | bslbf |
| origin_timestamp_type | 1 | uimsbf |
| origin_timestamp_format | 4 | uimsbf |
| origin_location_flag | 1 | bslbf |
| reserved | 1 | '1' |
| if(origin_location_flag){ | | |
| origin_location_length /*L*/ | 8 | uimsbf |
| origin_location | 8*L | |
| } | | |
| if(origin_timestamp_format ==0x00){ | | |
| origin_timescale | 32 | uimsbf |
| origin_media_time | 32 or 64 | uimsbf |
| } else if (origin_timestamp_format==0x01 \|\| origin_timestamp_format==0x02 \|\| origin_timestamp_format==0x03) { | | |
| origin_timestamp | 32 or 64 | uimsbf |
| } else { | | |
| private_data_length /*LEN*/ | 16 | uimsbf |
| private_data_bytes() | 8*LEN | |
| } | | |
| } | | |
| if(timestamp_format ==0x00){ | | |
| timescale | 32 | uimsbf |
| media_time | 32 or 64 | uimsbf |
| } else if (timestamp_format==0x01 \|\| timestamp_format==0x02 \|\| timestamp_format==0x03) { | | |
| timestamp | 32 or 64 | uimsbf |
| } else { | | |
| data_bytes() | variable | |
| } | | |
| } | | |

[Fig. 39]
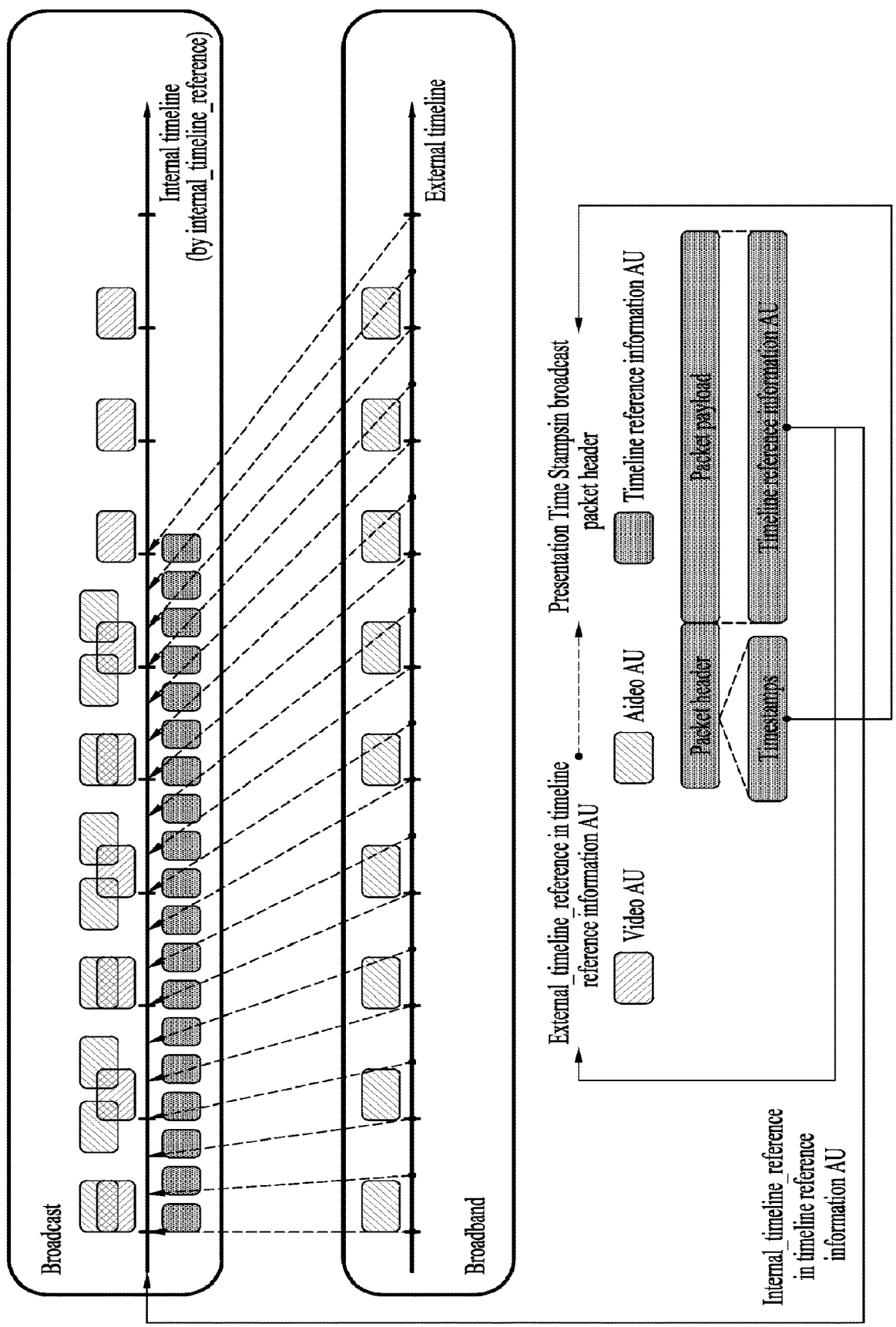

[Fig. 40]

| Syntax | No. Bits | Format |
|---|---|---|
| timeline_reference_information_AU { | | |
|     AU_identifier | 8 | TBD |
|     AU_length | 32 | uimsbf |
|     external_media_URL_flag | 1 | bslbf |
|     internal_timeline_reference_flag | 1 | bslbf |
|     external_timeline_reference_flag | 1 | bslbf |
|     reserved | 5 | bslbf |
|     if(external_media_URL_flag) { | | |
|         external_media_URL_length/*L1*/ | 8 | uimsbf |
|         external_media_URL | 8*L1 | |
|     } | | |
|     if(internal_timeline_reference_flag) { | | |
|         internal_timeline_reference_format | 8 | uimsbf |
|         internal_timeline_reference_timescale_flag | 1 | bslbf |
|         internal_timeline_reference_length/*L2*/ | 7 | uimsbf |
|         if(internal_timeline_reference_timescale_flag) { | | |
|             internal_timeline_reference_timescale | 32 | uimsbf |
|         } | | |
|         internal_timeline_reference | 8*L2 | uimsbf |
|     } | | |
|     if(internal_timeline_reference_flag) { | | |
|         external_timeline_reference_format | 8 | uimsbf |
|         external_timeline_reference_timescale_flag | 1 | bslbf |
|         external_timeline_reference_length/*L3*/ | 7 | uimsbf |
|         if(internal_timeline_reference_timescale_flag) { | | |
|             external_timeline_reference_timescale | 32 | uimsbf |
|         } | | |
|         external_timeline_reference | 8*L3 | uimsbf |
|     } | | |
| } | | |

[Fig. 41]

| Syntax | No. Bits | Format |
|---|---|---|
| timeline_reference_information_AU { | | |
|     AU_identifier | 8 | TBD |
|     AU_length | 32 | uimsbf |
|     external_media_location_flag | 1 | bslbf |
|     nb_of_timeline_reference | 7 | uimsbf |
|     if(external_media_URL_flag) { | | |
|         external_media_URL_length/*L1*/ | 8 | uimsbf |
|         external_media_URL | 8*L1 | |
|     } | | |
|     for(i=0; i<=nb_of_timeline_reference; i++) { | | |
|         timeline_reference_type | 1 | bslbf |
|         timeline_reference_identifier | 7 | uimsbf |
|         timeline_reference_format | 8 | uimsbf |
|         timeline_reference_timescale_flag | 1 | bslbf |
|         timeline_reference_length/*L2*/ | 7 | uimsbf |
|         if(timeline_reference_timescale_flag) { | | |
|             timeline_reference_timescale | 32 | uimsbf |
|         } | | |
|         timeline_reference | 8*L2 | uimsbf |
|     } | | |
| } | | |

[Fig. 42]
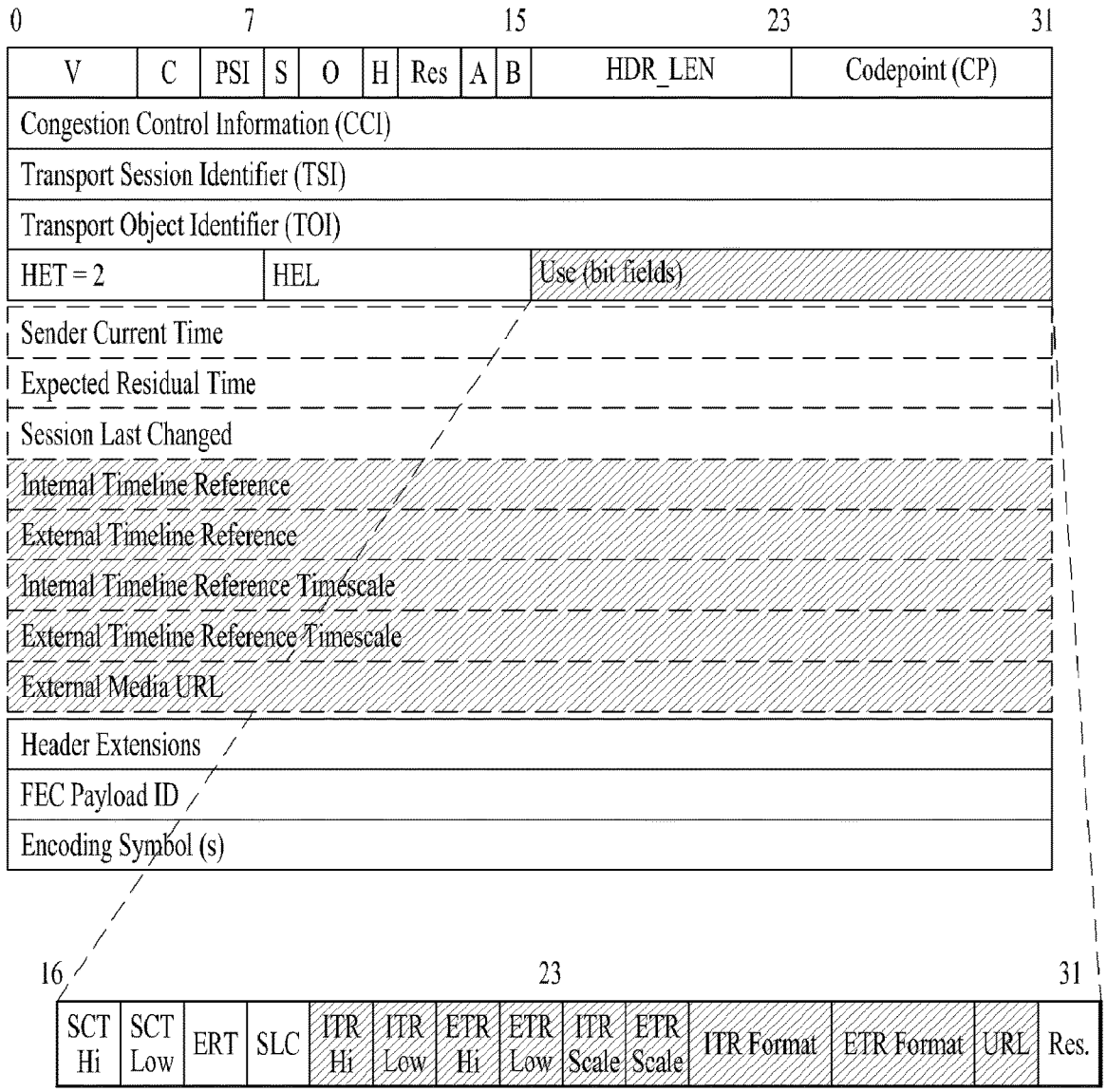

[Fig. 43]
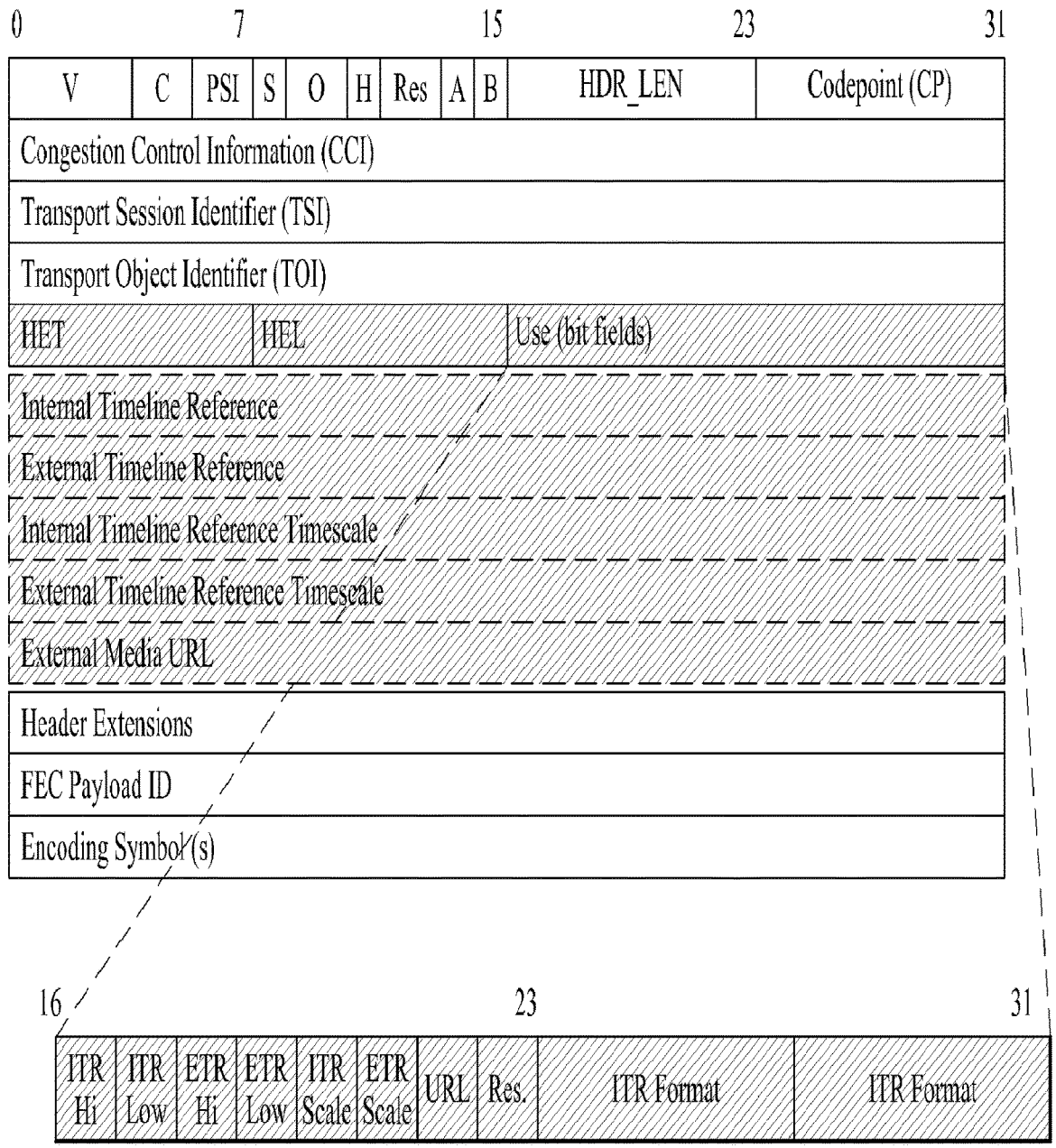

[Fig. 44]
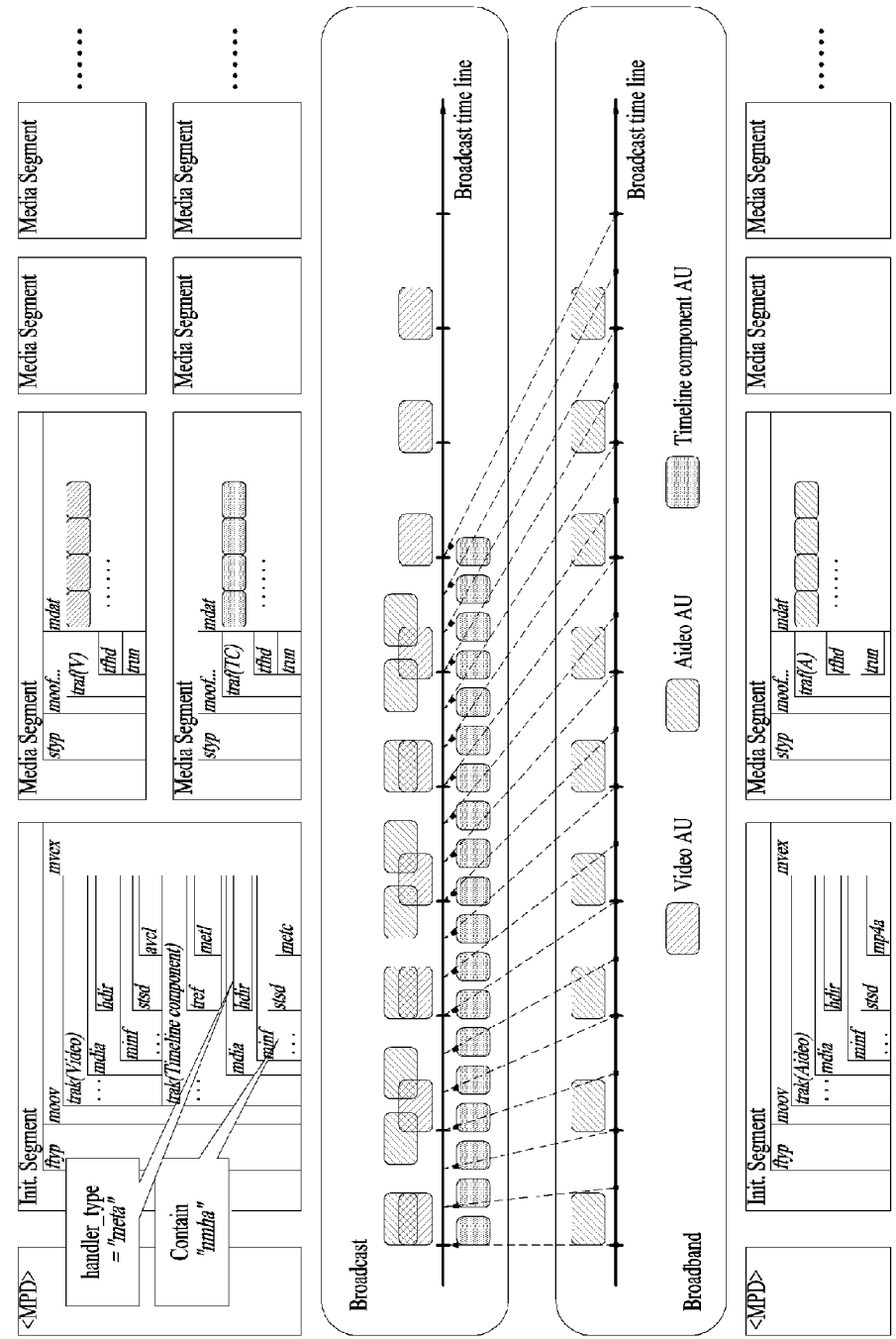

[Fig. 45]

```
aligned(8) abstract class SampleEntry (unsigned int(32) format)
extends Box(format) {
  const unsigned int(8)[6] reserved = 0;
  unsigned int(16) data_reference_index;
}
class MetaDataSampleEntry(codingname) extends SampleEntry (codingname) {
}
aligned(8) class TimelineComponentMetaDataSampleEntry extends MetaDataSampleEntry('metc') {
}
aligned(8) class SampleDescriptionBox (unsigned int(32) handler_type)extends FullBox('stsd', 0, 0) {
  int i ;
  unsigned int(32) entry_count;
  for (i = 1 ; i <= entry_count ; i++) {
    switch (handler_type) {
      case 'soun': // for audio tracks
        AudioSampleEntry();
        break;
      case 'vide': // for video tracks
        VisualSampleEntry();
        break;
      case 'hint': // Hint track
        HintSampleEntry();
        break;
      case 'meta': // Metadata track
        MetadataSampleEntry();
        break;
    }
  }
}
```

[Fig. 46]

```
aligned(8) class TrackReferenceBox extends Box('tref') {
}
aligned(8) class TrackReferenceTypeBox ('metl') extends Box(reference_type) {
  unsigned int(32) track_IDs[];
}
```

[Fig. 47]
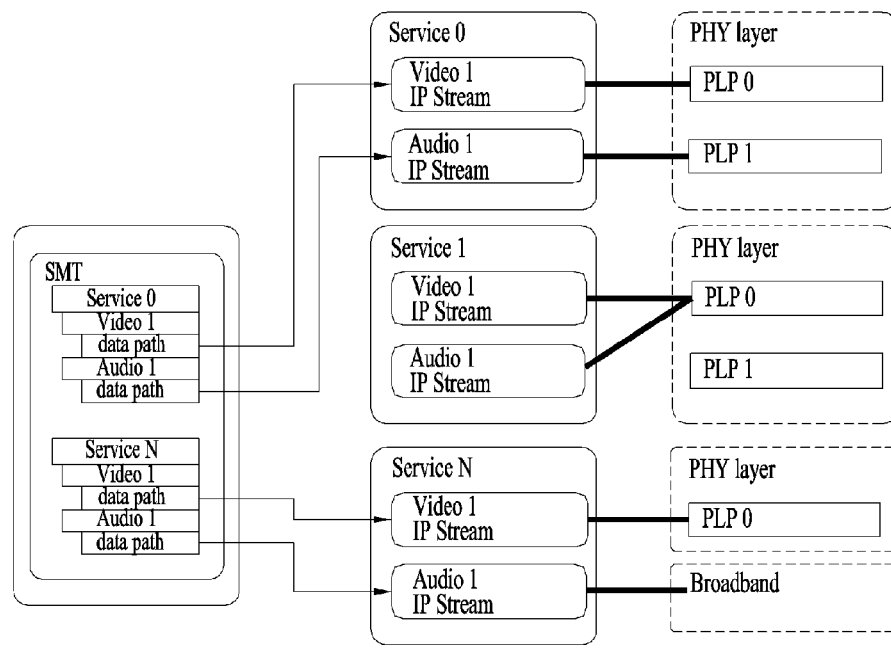

[Fig. 48]
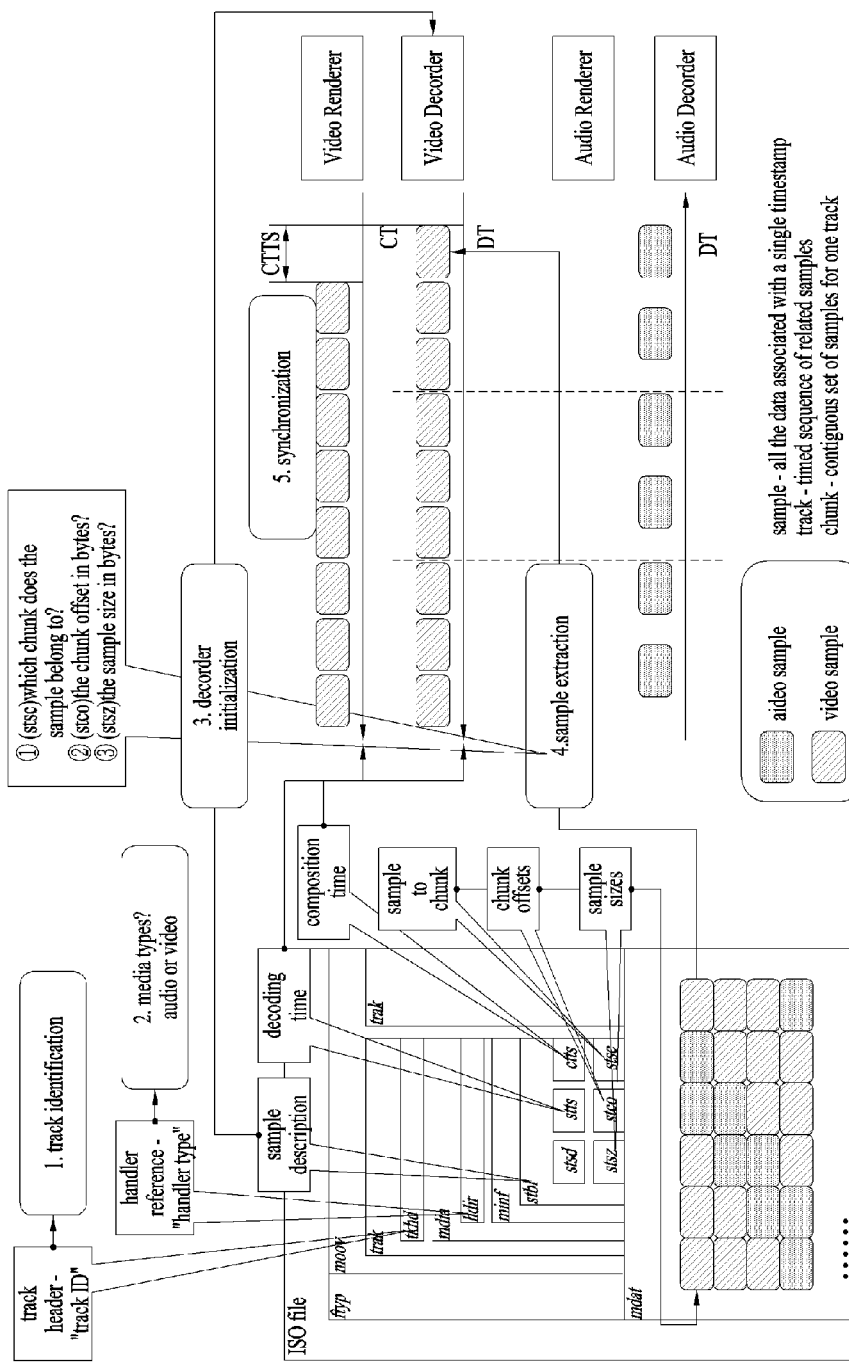

[Fig. 49]
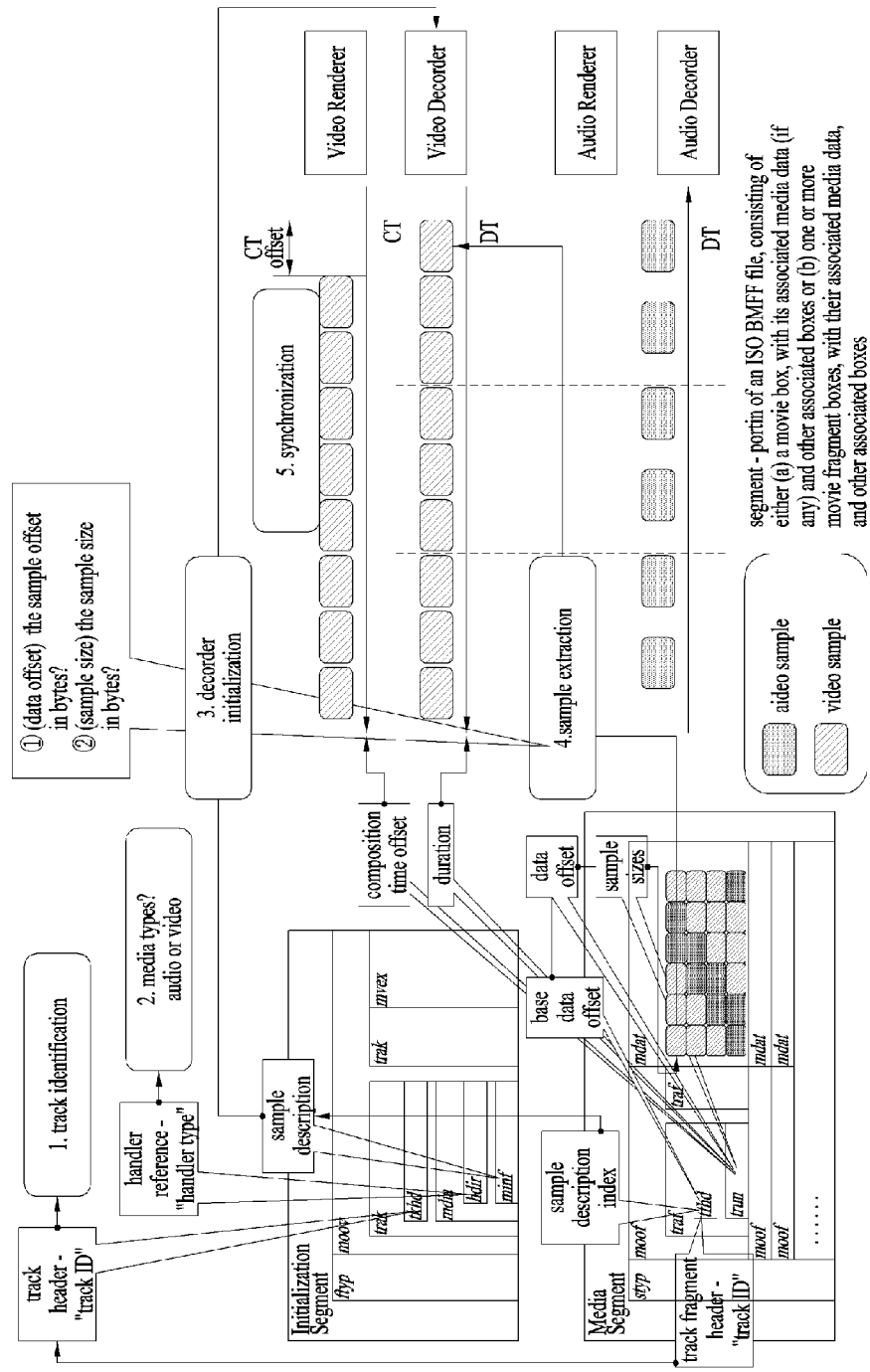

APPARATUSES AND METHODS FOR TRANSMITTING OR RECEIVING A BROADCAST CONTENT VIA ONE OR MORE NETWORKS

This application is a National Stage Application of International Application No. PCT/KR2015/000343 filed Jan. 13, 2015, which claims priority from U.S. Provisional Application No. 61/926,933 filed on Jan. 13, 2014, each of which are hereby incorporated by reference in their entirety

TECHNICAL FIELD

The present invention relates to an apparatus for transmitting broadcast signals, an apparatus for receiving broadcast signals and methods for transmitting and receiving broadcast signals.

The present invention relates to a method and apparatus for supporting hybrid broadcasting in a digital broadcasting system, and more particularly, to a transmission/reception processing method and apparatus for combining and using transport streams transmitted/received from one or more transport networks in a digital broadcasting system.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

A digital broadcasting system mainly provides a content through a general broadcasting network of existing terrestrial broadcasting, satellite broadcasting, or cable broadcasting. However, the broadcasting network has problems in that a bandwidth is restricted and viewers have difficulty in actively participating in an activity related to a broadcast content.

In particular, due to diversification and high quality of content, the bandwidth of the broadcasting network in which a broadcast content is transmitted is insufficient. As a solution to this, a hybrid broadcasting system has been developed. In this system, data is received through each of the broadcasting network and the Internet and used at the same time.

However, the hybrid broadcasting system fails to suggest an appropriate scheme of synchronizing transport streams transmitted through each of the broadcasting network and the Internet in a process of combining the transport streams. In addition, the hybrid broadcasting system suggests a scheme that requires complicated calculation for synchronization of transport streams transmitted through each of the broadcasting network and the Internet.

DISCLOSURE

Technical Problem

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

A current hybrid broadcasting system has a problem in that transport streams transmitted through each of a broadcasting network and the Internet are provided by being combined with separate content having a form that does not require synchronization.

In addition, the hybrid broadcasting system has a problem of requiring excessive calculation performance of a receiver to synchronize transport streams transmitted through each of the broadcasting network and the Internet.

An object of the present invention devised to solve the above-described problems.

Technical Solution

To achieve the object and other advantages and in accordance with the purpose of the invention, as embodied and broadly described herein, the present invention provides an apparatus for receiving a broadcast content via one or more networks. The apparatus comprises a broadcast network interface for receiving a broadcast stream including a first portion of the broadcast content via a broadcast network, a heterogeneous network interface for receiving a heterogeneous stream including a second portion of the broadcast content via a heterogeneous network, and wherein the broadcast stream further includes timeline reference signaling information containing metadata for synchronizing streams transmitted via the one or more networks, and wherein the timeline reference signaling information includes at least one timeline reference information indicating predetermined time information constituting timeline of at least one media stream, a processor for configuring the broadcast content using the broadcast stream and the heterogeneous stream based on the timeline reference signaling information.

Preferably, wherein the timeline reference signaling information includes internal timeline reference information indicating predetermined time information constituting timeline of the broadcast stream and external timeline reference information indicating predetermined time information constituting timeline of the heterogeneous stream.

Preferably, wherein the broadcast stream further includes a packet header and a packet payload, wherein the packet header includes the timeline reference signaling information for the broadcast stream and the heterogeneous stream, and wherein the processor is configuring the broadcast content using the broadcast stream and the heterogeneous stream based on the internal timeline reference information and the external timeline reference information.

Preferably, wherein the packet payload includes the timeline reference signaling information, and wherein the processor is configuring the broadcast content using the broadcast stream and the heterogeneous stream based on the internal timeline reference information and the external timeline reference information.

Preferably, wherein the timeline reference signaling information includes external media URL information identifying the heterogeneous stream, wherein the processor is configuring the broadcast content using the broadcast stream and the heterogeneous stream based on the external media URL information, the internal timeline reference information and the external timeline reference information.

Preferably, wherein the heterogeneous stream corresponds to an internet stream.

Preferably, wherein the heterogeneous stream corresponds to the broadcast stream, wherein the timeline of the heterogeneous stream differs from that of the broadcast stream.

As embodied and broadly described herein, the present invention provides an apparatus for transmitting a broadcast content via one or more networks. The apparatus comprises a signaling encoder for encoding timeline reference signaling information containing metadata for synchronizing streams transmitted via the one or more networks, a first encoder for encoding a broadcast stream including a first portion of the broadcast content and the timeline reference signaling information, a second encoder for encoding a heterogeneous stream including a second portion of the broadcast content, wherein the timeline reference signaling information includes at least one timeline reference information indicating predetermined time information constituting timeline of at least one media stream, a broadcast network interface for transmitting the encoded broadcast stream via a broadcast network; and a heterogeneous network interface for transmitting the encoded heterogeneous stream via a heterogeneous network.

Preferably, wherein the timeline reference signaling information includes internal timeline reference information constituting timeline of the broadcast stream and external timeline reference information constituting timeline of the heterogeneous stream.

Preferably, wherein the broadcast stream further includes a packet header and a packet payload, wherein the packet header includes the timeline reference signaling information for the broadcast stream and the heterogeneous stream.

Preferably, wherein the packet payload includes the timeline reference signaling information for the broadcast stream and the heterogeneous stream.

Preferably, wherein the timeline reference signaling information includes external media URL information identifying the heterogeneous stream, wherein the external media URL information includes at least one of location information and identification information.

Preferably, wherein the heterogeneous stream corresponds to an internet stream.

Preferably, wherein the heterogeneous stream corresponds to the broadcast stream, wherein the timeline of the heterogeneous stream differs from that of the broadcast stream.

Advantageous Effects

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

The present invention is effective in easily synchronizing transport streams transmitted through each of heterogeneous networks.

The present invention is effective in synchronizing transport streams transmitted through each of heterogeneous networks applicable to a wide use irrespective of characteristics of the heterogeneous networks.

The present invention is effective in enhancing user convenience since it is possible to provide a variety of broadcast data combinable with the same content through heterogeneous networks.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFDM generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 illustrates the basic operation of a twisted row-column block interleaver according to an embodiment of the present invention.

FIG. 27 illustrates an operation of a twisted row-column block interleaver according to another embodiment of the present invention.

FIG. 28 illustrates a diagonal-wise reading pattern of a twisted row-column block interleaver according to an embodiment of the present invention.

FIG. 29 illustrates interlaved XFECBLOCKs from each interleaving array according to an embodiment of the present invention.

FIG. 30 is a view showing a protocol stack for a next generation broadcasting system according to an embodiment of the present invention.

FIG. 31 illustrates a receiver of a next generation broadcasting system according to an embodiment of the present invention.

FIG. 32 is a view showing a broadcast receiver according to an embodiment of the present invention.

FIG. 33 illustrates a timeline component for synchronization between a transport stream in the broadcasting network and a transport stream in the Internet (heterogeneous network) according to an embodiment of the present invention.

FIG. 34 illustrates syntax of the timeline component AU according to an embodiment of the present invention.

FIG. 35 illustrates syntax of the timeline component AU according to another embodiment of the present invention.

FIG. 36 illustrates a scheme of synchronizing a stream transmitted through a heterogeneous network (for example, the Internet) with a stream transmitted through the broadcasting network using a timeline component when a timestamp of a broadcasting network transmission packet is absent according to an embodiment of the present invention.

FIG. 37 illustrates syntax of the timeline component AU according to another embodiment of the present invention.

FIG. 38 illustrates syntax of the timeline component AU according to another embodiment of the present invention.

FIG. 39 illustrates a method of synchronization between a stream transmitted over a broadcast network and a stream transmitted over a heterogeneous network using timeline reference signaling information according to another embodiment of the present invention.

FIG. 40 illustrates a syntax of a timeline reference information AU according to another embodiment of the present invention.

FIG. 41 illustrates a syntax of a timeline reference information AU according to another embodiment of the present invention.

FIG. 42 illustrates the structure of an LCT packet supporting transmission of timeline reference information according to another embodiment of the present invention.

FIG. 43 illustrates the structure of an LCT packet supporting transmission of timeline reference information according to another embodiment of the present invention.

FIG. 44 illustrates a synchronization scheme using the timeline component AU between a transport stream in the broadcasting network to which DASH is applied and a transport stream in a heterogeneous network (for example, the Internet) according to an embodiment of the present invention.

FIG. 45 illustrates the sample entry for identifying a timeline component in the ISO BMFF according to an embodiment of the present invention.

FIG. 46 illustrates a track reference type box for expressing a dependency relation between a timeline component track and another track in the ISO BMFF according to an embodiment of the present invention.

FIG. 47 illustrates a configuration for acquiring a service and/or content in the next generation broadcasting system according to an embodiment of the present invention.

FIG. 48 illustrates a scheme of accessing video data and/or audio data in the ISO BMFF according to an embodiment of the present invention.

FIG. 49 illustrates a scheme of accessing video data and/or audio data in the ISO BMFF according to another embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The term "signaling" in the present invention may indicate that service information (SI) that is transmitted and received from a broadcast system, an Internet system, and/or a broadcast/Internet convergence system. The service information (SI) may include broadcast service information (e.g., ATSC-SI and/or DVB-SI) received from the existing broadcast systems.

The term "broadcast signal" may conceptually include not only signals and/or data received from a terrestrial broadcast, a cable broadcast, a satellite broadcast, and/or a mobile broadcast, but also signals and/or data received from bidirectional broadcast systems such as an Internet broadcast, a broadband broadcast, a communication broadcast, a data broadcast, and/or VOD (Video On Demand).

The term "PLP" may indicate a predetermined unit for transmitting data contained in a physical layer. Therefore, the term "PLP" may also be replaced with the terms 'data unit' or 'data pipe' as necessary.

A hybrid broadcast service configured to interwork with the broadcast network and/or the Internet network may be used as a representative application to be used in a digital television (DTV) service. The hybrid broadcast service transmits, in real time, enhancement data related to broadcast A/V (Audio/Video) contents transmitted through the terrestrial broadcast network over the Internet, or transmits, in real time, some parts of the broadcast A/V contents over the Internet, such that users can experience a variety of contents.

The present invention aims to provide a method for encapsulating an IP packet, an MPEG-2 TS packet, and a packet applicable to other broadcast systems in the next generation digital broadcast system in such a manner that the IP packet, the MPEG-2 TS packet, and the packet can be transmitted to a physical layer. In addition, the present invention proposes a method for transmitting layer-2 signaling using the same header format.

The contents to be described hereinafter may be implemented by the device. For example, the following processes can be carried out by a signaling processor, a protocol processor, a processor, and/or a packet generator.

Among terms used in the present invention, a real time (RT) service literally means a real time service. That is, the RT service is a service which is restricted by time. On the other hand, a non-real time (NRT) service means a non-real time service excluding the RT service. That is, the NRT service is a service which is not restricted by time. Data for an NRT service will be referred to as NRT service data.

A broadcast receiver according to the present invention may receive a non-real time (NRT) service through a medium, such as terrestrial broadcasting, cable broadcasting, or the Internet. The NRT service is stored in a storage medium of the broadcast receiver and is then displayed on a display device at a predetermined time or according to a user's request. In one embodiment, the NRT service is received in the form of a file and is then stored in the storage medium. In one embodiment, the storage medium is an internal hard disc drive (HDD) mounted in the broadcast receiver. In another example, the storage medium may be a universal serial bus (USB) memory or an external HDD connected to the outside of a broadcast receiving system. Signaling information is necessary to receive files constituting the NRT service, to store the files in the storage medium, and to provide the files to a user. In the present invention, such signaling information will be referred to as NRT service signaling information or NRT service signaling data. The NRT service according to the present invention may be classified into a fixed NRT service and a mobile NRT service according to a method of obtaining an IP datagram. In particular, the fixed NRT service is provided to a fixed broadcast receiver and the mobile NRT service is provided to a mobile broadcast receiver. In the present invention, the fixed NRT service will be described as an embodiment. However, the present invention may be applied to the mobile NRT service.

Among terms used in the present invention, an application (or synchronized application) is a data service providing interactive experience to a viewer to improve viewing experience. The application may be named a triggered declarative object (TDO), a declarative object (DO), or an NRT declarative object (NDO).

Among terms used in the present invention, a trigger is a signaling element for indentifying signaling and setting a provision time of an application or an event in the application. The trigger may include location information of a TDO parameter table (TPT) (which may be named a TDO parameter element). The TPT is a signaling element including metadata for operating an application within a specific range.

The trigger may function as a time base trigger and/or an activation trigger. The time base trigger is used to set a time base for suggesting a criterion of a reproduction time of an event. The activation trigger is used to set an operation time of an application or an event in the application. The operation may correspond to start, end, pause, kill and/or resuming of an application or an event in the application. Time base messages may be used as the time base trigger or the time base trigger may be used as the time base messages. Activation messages, which will hereinafter be described, may be used as the activation trigger or the activation trigger may be used as the activation messages.

A media time is a parameter used to refer to a specific time when a content is reproduced.

The triggered declarative object (TDO) indicates additional information in a broadcast content. The TDO is a concept of triggering the additional information in the broadcast content on timing. For example, in a case in which an audition program is broadcast, current ranking of audition participants preferred by a viewer may be shown together with a corresponding broadcast content. At this time, additional information regarding the current ranking of the audition participants may be the TDO. The TDO may be changed through bidirectional communication with the viewer or may be provided in a state in which a viewer's intention is reflected in the TDO.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc.

The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles (base, handheld and advanced profiles) each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8 bit field identifies uniquely a DP within the system identified by the SYSTEM_ID dummy cell: cell carrying a pseudorandom value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFTsize.

reserved for future use: not defined by the present document but may be defined in future superframe: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-

TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feed-back shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_i$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

$$C_{ldpc}=[I_{ldpc}P_{ldpc}]=[i_0,i_1, \ldots ,i_{K_{ldpc}-1},p_0,p_1, \ldots , p_{N_{ldpc}-K_{ldpc}-1}]$$ [Math Figure 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 |  |  |  |  |  |  |  |
|  | >1020 | 2100 |  | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit ineterlaeved PLS1 data and PLS2 data onto constellations.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

FIG. 8 illustrates an OFDM generation block according to an embodiment of the present invention.

The OFDM generation block illustrated in FIG. 8 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PRO-FILE = '000' (base) | Current PHY_PRO-FILE = '001' (handheld) | Current PHY_PRO-FILE = '010' (advanced) | Current PHY_PRO-FILE = '111' (FEF) |
|---|---|---|---|---|
| FRU_CON-FIGURE = 000 | Only base profile present | Only handheld profile present | Only advanced profile present | Only FEF present |
| FRU_CON-FIGURE = 1XX | Handheld profile present | Base profile present | Base profile present | Base profile present |
| FRU_CON-FIGURE = X1X | Advanced profile present | Advanced profile present | Handheld profile present | Handheld profile present |
| FRU_CON-FIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$ the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$. The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |

TABLE 16-continued

| Value | Modulation |
| --- | --- |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group ($N_{TI}=1$). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I=1$). The allowed $P_I$ values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAY-LOAD_TYPE Is TS | If DP_PAY-LOAD_TYPE Is IP | If DP_PAY-LOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
| --- | --- |
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
| --- | --- |
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
| --- | --- |
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
| --- | --- |
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Math Figure 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

(a) shows an addressing of OFDM cells for mapping type 1 DPs and (b) shows an an addressing of OFDM cells for mapping for type 2 DPs.

Addressing of OFDM cells for mapping Type 1 DPs (0, ..., DDP11) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, ..., DDP21) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$ supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch}$ - $K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch}$ - $K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math Figure 3]

The parameters for long FECBLOCK and short FECBLOCK are given in the above table 28 and 29, respectively.

The detailed procedure to calculate $N_{ldpc}-K_{ldpc}$ parity bits for long FECBLOCK, is as follows:

1) Initialize the parity bits, $$p_0=p_1=p_2=\ldots=p_{N_{ldpc}-K_{ldpc}-1}=0$$ [Math Figure 4]

2) Accumulate the first information bit–$i_0$, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0$$
$$p_{4837} = p_{4837} \oplus i_0 \quad p_{4989} = p_{4989} \oplus i_0$$
$$p_{6138} = p_{6138} \oplus i_0 \quad p_{6458} = p_{6458} \oplus i_0$$
$$p_{6921} = p_{6921} \oplus i_0 \quad p_{6974} = p_{6974} \oplus i_0$$
$$p_{7572} = p_{7572} \oplus i_0 \quad p_{8260} = p_{8260} \oplus i_0$$
$$p_{8496} = p_{8496} \oplus i_0$$

[Math Figure 5]

3) For the next 359 information bits, $i_s$, s=1, 2, . . . , 359 accumulate $i_s$ at parity bit addresses using following Math figure.

$$\{x+(s \bmod 360) \times Q_{ldpc}\} \bmod(N_{ldpc}-K_{ldpc})$$ [Math Figure 6]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}$=24 for rate 13/15, so for information bit $i_1$, the following operations are performed:

$$p_{1007} = p_{1007} \oplus i_1 \quad p_{2839} = p_{2839} \oplus i_1$$
$$p_{4861} = p_{4861} \oplus i_1 \quad p_{5013} = p_{5013} \oplus i_1$$
$$p_{6162} = p_{6162} \oplus i_1 \quad p_{6482} = p_{6482} \oplus i_1$$
$$p_{6945} = p_{6945} \oplus i_1 \quad p_{6998} = p_{6998} \oplus i_1$$
$$p_{7596} = p_{7596} \oplus i_1 \quad p_{8284} = p_{8284} \oplus i_1$$
$$p_{8520} = p_{8520} \oplus i_1$$

[Math Figure 7]

4) For the 361st information bit $i_{360}$, the addresses of the parity bit accumulators are given in the second row of the addresses of parity check matrix. In a similar manner the addresses of the parity bit accumulators for the following 359 information bits $i_s$, s=361, 362, ... , 719 are obtained using the Math Figure 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$p_i = p_i \oplus p_{i-1}, i=1,2, \ldots , N_{ldpc} - K_{ldpc} - 1$     [Math Figure 8]

where final content of $p_i$, i=0, 1, ... $N_{ldpc} - K_{ldpc} - 1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells}=64800/\eta_{mod}$ or $16200/\eta_{mod}$ according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with $N_{QCB\_IG}$ QC blocks of the QCB interleaving output. Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word ($c_{0,i}$, $c_{1,i}$, ... , $c_{nmod-1,i}$), of the bit interleaving output is demultiplexed into ($d_{1,0,m}$, $d_{1,1,m}$ ... , $d_{1,nmod-1,m}$) and ($d_{2,0,m}$, $d_{2,1,m}$ ... , $d_{2,nmod-1,m}$) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word ($c_{0,i}$, $c_{1,i}$, ... , $c_{9,i}$) of the Bit Interleaver output is demultiplexed into ($d_{1,0,m}$, $d_{1,1,m}$ ... , $d_{1,3,m}$) and ($d_{2,0,m}$, $d_{2,1,m}$, ... , $d_{2,5,m}$), as shown in (b).

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1' ($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFEC-BLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}1}, d_{n,s,1,0}, \ldots, d_{n,s,1,N_{cells}1},$$
$$\ldots, d_{n,s,N_{xBLOCK\_TI}(n,s)1,0}, \ldots, d_{n,s,N_{xBLOCK\_TI}(n,s)1,N_{cells}1}),$$

where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q}, & \text{the output of } SSD \text{ encoding} \\ g_{n,s,r,q}, & \text{the output of } MIMO \text{ encoding} \end{cases}$$

In addition, assume that output XFECBLOCKs from the time interleaver are defined as $$(h_{n,s,0}, h_{n,s,1}, \ldots, h_{n,s,i}, \ldots, h_{n,s,N_{xBLOCK\_TI}(n,s) \times N_{cells}-1}),$$

where $h_{n,s,i}$ is the ith output cell (for i=0, ..., $N_{xBLOCK\_TI}$ (n,s)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}$ (n,s).

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

$$\text{GENERATE}(R_{n,s,i}, C_{n,s,i}) = \qquad [\text{Math Figure 9}]$$

$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$ and it is determined by $N_{xBLOCK\_TI\_MAX}$ given in the PLS2-STAT as follows expression.

for [Math Figure 10]

$$\begin{cases} N'_{xBLOCK\_TI\_MAX} = \\ N_{xBLOCK\_TI\_MAX} + 1, & \text{if } N_{xBLOCK\_TI\_MAX} \mod 2 = 0 \\ N'_{xBLOCK\_TI\_MAX} = \\ N_{xBLOCK\_TI\_MAX}, & \text{if } N_{xBLOCK\_TI\_MAX} \mod 2 = 1 \end{cases},$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N_{xBLOCK\_TI\_MAX}'$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N_{xBLOCK\_TI\_MAX}'$ by inserting the virtual XFECBLOCKs into the TI memory and the reading process is accomplished as follow expression.

| Math FIG. 11 |
|---|
| p = 0;<br>for i = 0; i < $N_{cells}N'_{xBLOCK\_TI\_MAX}$; i = i + 1<br>{GENERATE ($R_{n,s,i}$, $C_{n,s,i}$);<br>$V_i = N_r C_{n,s,j} + R_{n,s,j}$<br>if $V_i < N_{cells}N_{xBLOCK\_TI}$ (n,s)<br>{<br>$Z_{n,s,p} = V_i$; p = p + 1;<br>}<br>} |

The number of TI groups is set to 3. The option of time interleaver is signaled in the PLS2-STAT data by DP_TI_TYPE='0', DP_FRAME_INTERVAL='1', and DP_TI_LENGTH='1', i.e., $N_{TI}=1$, $I_{JUMP}=1$, and $P_I=1$. The number of XFECBLOCKs, each of which has $N_{cells}=30$ cells, per TI group is signaled in the PLS2-DYN data by $N_{xBLOCK\_TI}(0,0)=3$, $N_{xBLOCK\_TI}(1,0)=6$, and $N_{xBLOCK\_TI}(2,0)=5$, respectively. The maximum number of XFECBLOCK is signaled in the PLS2-STAT data by $N_{xBLOCK\_Group\_MAX}$, which leads to $\lfloor N_{xBLOCK\_Group\_MAX} \rfloor$ $N_{TI}]=N_{xBLOCK\_TI\_MAX}=6$.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N_{xBLOCK\_TI\_MAX}'=7$ and $S_{shift}=(7-1)/2=3$. Note that in the reading process shown as pseudocode above, if $V_i \geq N_{cells}N_{xBLOCK\_TI}(n,s)$, the value of $V_i$ is skipped and the next calculated value of $V_i$ is used.

Figure 29:
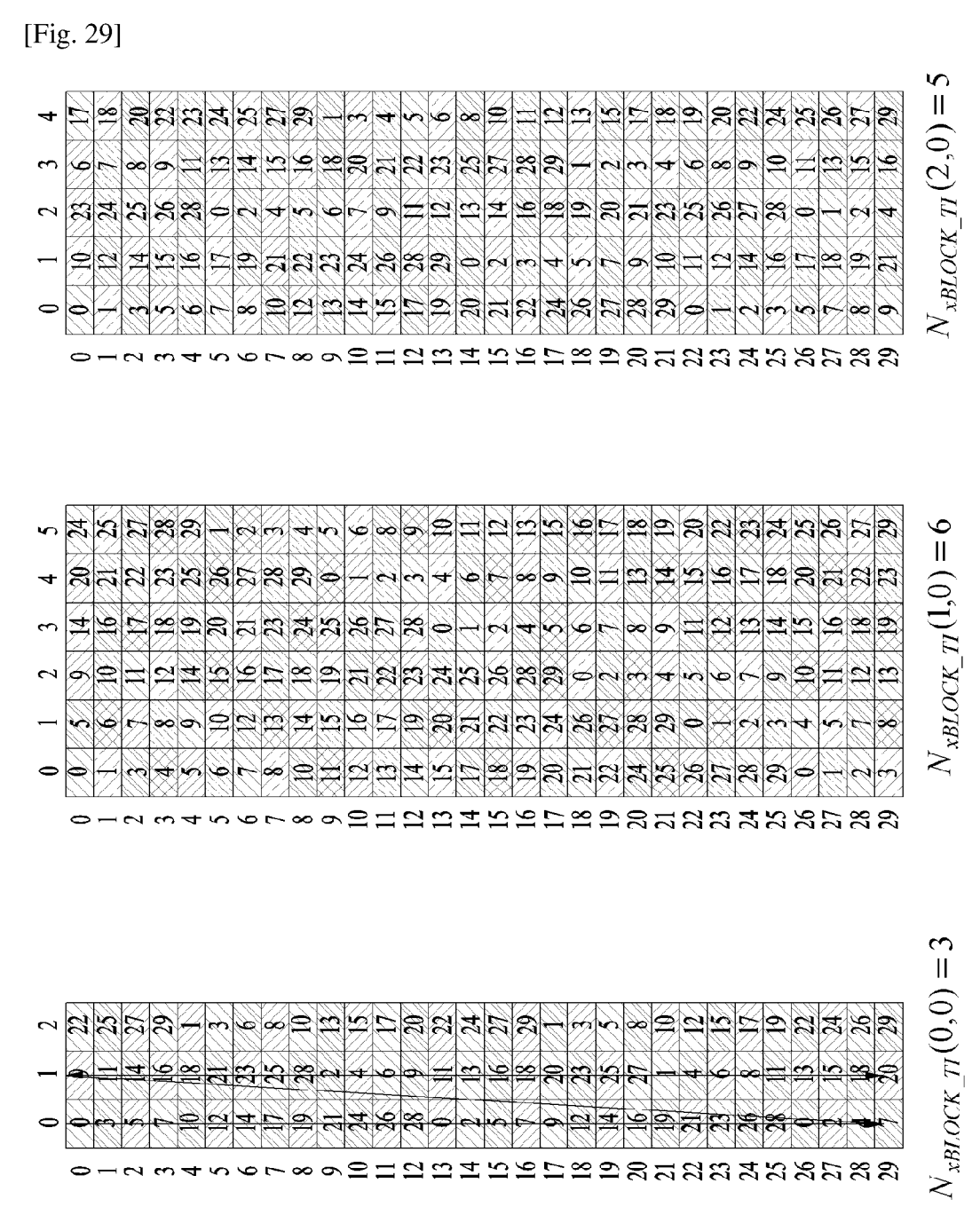

FIG. 29 illustrates interlaved XFECBLOCKs from each interleaving array according to an embodiment of the present invention.

FIG. 29 illustrates the interleaved XFECBLOCKs from each interleaving array with parameters of $N_{xBLOCK\_Group\_MAX}'=7$ and $S_{shift}=3$.

FIG. 30 is a view showing a protocol stack for a next generation broadcasting system according to an embodiment of the present invention.

The broadcasting system according to the present invention may correspond to a hybrid broadcasting system in which an Internet Protocol (IP) centric broadcast network and a broadband are coupled.

The broadcasting system according to the present invention may be designed to maintain compatibility with a conventional MPEG-2 based broadcasting system.

The broadcasting system according to the present invention may correspond to a hybrid broadcasting system based on coupling of an IP centric broadcast network, a broadband network, and/or a mobile communication network (or a cellular network).

Referring to the figure, a physical layer may use a physical protocol adopted in a broadcasting system, such as an ATSC system and/or a DVB system. For example, in the physical layer according to the present invention, a transmitter/receiver may transmit/receive a terrestrial broadcast signal and convert a transport frame including broadcast data into an appropriate form.

In an encapsulation layer, an IP datagram is acquired from information acquired from the physical layer or the acquired IP datagram is converted into a specific frame (for example, an RS Frame, GSE-lite, GSE, or a signal frame). The frame main include a set of IP datagrams. For example, in the encapsulation layer, the transmitter include data processed from the physical layer in a transport frame or the receiver extracts an MPEG-2 TS and an IP datagram from the transport frame acquired from the physical layer.

A fast information channel (FIC) includes information (for example, mapping information between a service ID and a frame) necessary to access a service and/or content. The FIC may be named a fast access channel (FAC).

The broadcasting system according to the present invention may use protocols, such as an Internet Protocol (IP), a User Datagram Protocol (UDP), a Transmission Control Protocol (TCP), an Asynchronous Layered Coding/Layered Coding Transport (ALC/LCT), a Rate Control Protocol/RTP Control Protocol (RCP/RTCP), a Hypertext Transfer Protocol (HTTP), and a File Delivery over Unidirectional Transport (FLUTE). A stack between these protocols may refer to the structure shown in the figure.

In the broadcasting system according to the present invention, data may be transported in the form of an ISO based media file format (ISOBMFF). An Electrical Service Guide (ESG), Non Real Time (NRT), Audio/Video (A/V), and/or general data may be transported in the form of the ISOBMFF.

Transport of data through a broadcast network may include transport of a linear content and/or transport of a non-linear content.

Transport of RTP/RTCP based A/V and data (closed caption, emergency alert message, etc.) may correspond to transport of a linear content.

An RTP payload may be transported in the form of an RTP/AV stream including a Network Abstraction Layer (NAL) and/or in a form encapsulated in an ISO based media file format. Transport of the RTP payload may correspond to transport of a linear content. Transport in the form encapsulated in the ISO based media file format may include an MPEG DASH media segment for A/V, etc.

Transport of a FLUTE based ESG, transport of non-timed data, transport of an NRT content may correspond to transport of a non-linear content. These may be transported in an MIME type file form and/or a form encapsulated in an ISO based media file format. Transport in the form encapsulated in the ISO based media file format may include an MPEG DASH media segment for A/V, etc.

Transport through a broadband network may be divided into transport of a content and transport of signaling data.

Transport of the content includes transport of a linear content (A/V and data (closed caption, emergency alert message, etc.)), transport of a non-linear content (ESG, non-timed data, etc.), and transport of a MPEG DASH based Media segment (A/V and data).

Transport of the signaling data may be transport including a signaling table (including an MPD of MPEG DASH) transported through a broadcasting network.

In the broadcasting system according to the present invention, synchronization between linear/non-linear contents transported through the broadcasting network or synchronization between a content transported through the broadcasting network and a content transported through the broadband may be supported. For example, in a case in which one UD content is separately and simultaneously transported through the broadcasting network and the broadband, the receiver may adjust the timeline dependent upon a transport protocol and synchronize the content through the broadcasting network and the content through the broadband to reconfigure the contents as one UD content.

An applications layer of the broadcasting system according to the present invention may realize technical characteristics, such as Interactivity, Personalization, Second Screen, and automatic content recognition (ACR). These characteristics are important in extension from ATSC 2.0 to ATSC 3.0. For example, HTML5 may be used for a characteristic of interactivity.

In a presentation layer of the broadcasting system according to the present invention, HTML and/or HTML5 may be used to identify spatial and temporal relationships between components or interactive applications.

In the present invention, signaling includes signaling information necessary to support effective acquisition of a content and/or a service. Signaling data may be expressed in a binary or XMK form. The signaling data may be transmitted through the terrestrial broadcasting network or the broadband.

A real-time broadcast A/V content and/or data may be expressed in an ISO Base Media File Format, etc. In this case, the A/V content and/or data may be transmitted through the terrestrial broadcasting network in real time and may be transmitted based on IP/UDP/FLUTE in non-real time. Alternatively, the broadcast A/V content and/or data may be received by receiving or requesting a content in a streaming mode using Dynamic Adaptive Streaming over HTTP (DASH) through the Internet in real time. In the broadcasting system according to the embodiment of the present invention, the received broadcast A/V content and/or data may be combined to provide various enhanced services, such as an Interactive service and a second screen service, to a viewer.

An example of the physical layer (a Broadcast PHY and a Broadband PHY) of the transmitter may be the structure shown in FIG. 1. An example of the physical layer of the receiver may be the structure shown in FIG. 9.

The signaling data and the IP/UDP datagram may be transmitted through a specific data pipe (hereinafter, DP) of a transport frame (or a frame) delivered to the physical layer. For example, the input formatting block 1000 may receive signaling data and IP/UDP datagram and demultiplex each of the signaling data and the IP/UDP datagram into at least one DP. The output processor 9300 may perform an operation contrary to that of the input formatting block 1000.

FIG. 31 illustrates a receiver of a next generation broadcasting system according to an embodiment of the present invention.

The receiver according to the present embodiment may include a receiving unit (not illustrated), a channel synchronizer J32010, a channel equalizer J32020, a channel decoder J32030, a signaling decoder J32040, a baseband operation controller J32050, a service map database (DB) J32060, a transport packet interface J32070, a broadband packet interface J32080, a common protocol stack J32090, a service signaling channel processing buffer & parser J32100, an A/V processor J32110, a service guide processor J32120, an application processor J32130 and/or a service guide DB J32140.

The receiving unit (not illustrated) receives a broadcast signal.

The channel synchronizer J32010 synchronizes a symbol frequency and timing so as to decode a signal received in a baseband. Here, the baseband refers to a region in which the broadcast signal is transmitted/received.

The channel equalizer J32020 performs channel equalization upon a received signal. The channel equalizer J32020 compensates for the received signal when the signal is distorted due to multipath, Doppler effect, or the like.

The channel decoder J32030 restores the received signal to a meaningful transport frame. The channel decoder J32030 performs forward error correction (FEC) on data or a transport frame included in the received signal.

The signaling decoder J32040 extracts and decodes signaling data included in the received signal. Here, the signaling data includes signaling data and/or service information to be described below.

The baseband operation controller J32050 controls processing of a signal in the baseband.

The service map DB J32060 stores the signaling data and/or the service information. The service map DB J32060 may store signaling data which is transmitted by being included in a broadcast signal and/or the signaling data which is transmitted by being included in a broadband packet.

The transport packet interface J32070 extracts a transport packet from a transport frame or a broadcast signal. The transport packet interface J32070 extracts signaling data or an IP datagram from the transport packet.

The broadband packet interface J32080 receives a broadcasting-related packet through the Internet. The broadband packet interface J32080 extracts the packet acquired through the Internet, and combines or extracts signaling data or A/V data from the packet.

The common protocol stack J32090 processes a received packet according to a protocol which is included in a protocol stack. For example, the common protocol stack J32090 may process the received packet according to the above-described protocol stack.

The service signaling channel processing buffer & parser J32100 extracts signaling data included in the received packet. The service signaling channel processing buffer & parser J32100 extracts signaling information related to scanning and/or acquisition of a service and/or content from an IP datagram and the like, and parses the extracted signaling information. The signaling data may be present at a certain position or channel in the received packet. The position or channel may be referred to as a service signaling channel. For example, the service signaling channel may have a particular IP address, a UDP port number, a transmission session identifier, and the like. The receiver may recognize data transmitted to the particular IP address, the UDP port number, the transmission session, and the like as signaling data.

The A/V processor J32110 decodes and presents received A/V data.

The service guide processor J32120 extracts announcement information from the received signal, manages the service guide DB J32140 and provides a service guide.

The application processor J32130 extracts application data and/or application-related information included in the received packet, and processes the extracted data and/or information.

The service guide DB J32140 stores service guide data.

FIG. 32 is a view showing a broadcast receiver according to an embodiment of the present invention.

The broadcast receiver according to an embodiment of the present invention includes a service/content acquisition controller J2010, an Internet interface J2020, a broadcast interface J2030, a signaling decoder J2040, a service map database J2050, a decoder J2060, a targeting processor J2070, a processor J2080, a managing unit J2090, and/or a redistribution module J2100. In the figure is shown an external management device J2110 which may be located outside and/or in the broadcast receiver.

The service/content acquisition controller J2010 receives a service and/or content and signaling data related thereto through a broadcast/broadband channel. Alternatively, the service/content acquisition controller J2010 may perform control for receiving a service and/or content and signaling data related thereto.

The Internet interface J2020 may include an Internet access control module. The Internet access control module receives a service, content, and/or signaling data through a broadband channel. Alternatively, the Internet access control module may control the operation of the receiver for acquiring a service, content, and/or signaling data.

The broadcast interface J2030 may include a physical layer module and/or a physical layer I/F module. The physical layer module receives a broadcast-related signal through a broadcast channel. The physical layer module processes (demodulates, decodes, etc.) the broadcast-related signal received through the broadcast channel. The physical layer I/F module acquires an Internet protocol (IP) datagram from information acquired from the physical layer module or performs conversion to a specific frame (for example, a broadcast frame, RS frame, or GSE) using the acquired IP datagram The signaling decoder J2040 decodes signaling data or signaling information (hereinafter, referred to as 'signaling data') acquired through the broadcast channel, etc.

The service map database J2050 stores the decoded signaling data or signaling data processed by another device (for example, a signaling parser) of the receiver.

The decoder J2060 decodes a broadcast signal or data received by the receiver. The decoder J2060 may include a scheduled streaming decoder, a file decoder, a file database (DB), an on-demand streaming decoder, a component synchronizer, an alert signaling parser, a targeting signaling parser, a service signaling parser, and/or an application signaling parser.

The scheduled streaming decoder extracts audio/video data for real-time audio/video (A/V) from the IP datagram, etc. and decodes the extracted audio/video data.

The file decoder extracts file type data, such as NRT data and an application, from the IP datagram and decodes the extracted file type data.

The file DB stores the data extracted by the file decoder.

The on-demand streaming decoder extracts audio/video data for on-demand streaming from the IP datagram, etc. and decodes the extracted audio/video data.

The component synchronizer performs synchronization between elements constituting a content or between elements constituting a service based on the data decoded by the scheduled streaming decoder, the file decoder, and/or the on-demand streaming decoder to configure the content or the service.

The alert signaling parser extracts signaling information related to alerting from the IP datagram, etc. and parses the extracted signaling information.

The targeting signaling parser extracts signaling information related to service/content personalization or targeting from the IP datagram, etc. and parses the extracted signaling information. Targeting is an action for providing a content or service satisfying conditions of a specific viewer. In other words, targeting is an action for identifying a content or service satisfying conditions of a specific viewer and providing the identified content or service to the viewer.

The service signaling parser extracts signaling information related to service scan and/or a service/content from the IP datagram, etc. and parses the extracted signaling information. The signaling information related to the service/content includes broadcasting system information and/or broadcast signaling information.

The application signaling parser extracts signaling information related to acquisition of an application from the IP datagram, etc. and parses the extracted signaling information. The signaling information related to acquisition of the application may include a trigger, a TDO parameter table (TPT), and/or a TDO parameter element.

The targeting processor J2070 processes the information related to service/content targeting parsed by the targeting signaling parser.

The processor J2080 performs a series of processes for displaying the received data. The processor J2080 may include an alert processor, an application processor, and/or an A/V processor.

The alert processor controls the receiver to acquire alert data through signaling information related to alerting and performs a process for displaying the alert data.

The application processor processes information related to an application and processes a state of an downloaded application and a display parameter related to the application.

The A/V processor performs an operation related to audio/video rendering based on decoded audio data, video data, and/or application data.

The managing unit J2090 includes a device manager and/or a data sharing & communication unit.

The device manager performs management for an external device, such as addition/deletion/renewal of an external device that can be interlocked, including connection and data exchange.

The data sharing & communication unit processes information related to data transport and exchange between the receiver and an external device (for example, a companion device) and performs an operation related thereto. The transportable and exchangeable data may be signaling data, a PDI table, PDI user data, PDI Q&A, and/or A/V data.

The redistribution module J2100 performs acquisition of information related to a service/content and/or service/content data in a case in which the receiver cannot directly receive a broadcast signal.

The external management device J2110 refers to modules, such as a broadcast service/content server, located outside the broadcast receiver for providing a broadcast service/content. A module functioning as the external management device may be provided in the broadcast receiver.

FIG. 33 illustrates a timeline component for synchronization between a transport stream in the broadcasting network and a transport stream in the Internet (heterogeneous network) according to an embodiment of the present invention.

There is a possibility that streams transmitted through heterogeneous networks such as the broadcasting network and the Internet may be synchronized and used for one service in the receiver of the above-described broadcasting system. For example, as illustrated, when a video stream is transmitted through the broadcasting network and an audio stream is transmitted through the Internet, the two streams need to be synchronized, decoded and reproduced for one service. In other words, video is acquired over the broadcasting network and audio is acquired over the Internet to use one service. For example, a viewer who desires to view the same content using audio recorded in a different language from a language provided in the broadcasting network may receive the audio of the corresponding content recorded in the desired language through the Internet and use the received audio.

However, the two streams have different timelines and thus a mechanism is needed to perform mapping between the two timelines. Here, each of the timelines may indicate absolute or relative time serving as a criterion for reproduction or decoding of data or content transmitted through each transport network. In a service, content contained in video transmitted through the broadcasting network needs to be identical to content contained in audio transmitted through the Internet.

The present embodiment proposes a method and apparatus for using a timeline component for synchronization between streams transmitted through heterogeneous networks such as the broadcasting network and the Internet. A timeline component stream may include one or more timeline component access units (AUs). The timeline components AU may be contiguously disposed in the timeline component.

The timeline component AU shows an example in which a timeline of a stream transmitted through the Internet is mapped to a timeline of a stream transmitted through the broadcasting network. When a header of a packet transmitted through the broadcasting network includes information about the timeline of the stream transmitted through the broadcasting network, a timeline component AU transmissible through the broadcasting network may include timestamp information and the like such as a decoding time stamp (DTS), a presentation time stamp (PTS), and the like of a stream transmitted through a heterogeneous network (for example, the Internet). When information about a timeline of the stream transmitted through the heterogeneous network (for example, the Internet) is included in the timeline component AU, the information about the timeline of the stream transmitted through the heterogeneous network (for example, the Internet) may be packetized in the same packet structure as that of the stream transmitted through the broadcasting network. In this way, a timestamp of the stream transmitted through the broadcasting network included in the packet header may be mapped to a timestamp of the stream transmitted through the Internet on a one-to-one basis, and both the streams may be synchronized in one timeline, and decoded and reproduced. The aforementioned timestamp information may represent a timeline reference value for constituting a timeline of a stream transmitted over an external network (e.g., a heterogeneous network, an Internet network, etc.).

The presentation timestamp (PTS) is a timestamp metadata field in an MPEG transport stream, MPEG program stream or similar data stream that is used to achieve synchronization of programs' separate elementary streams (for example Video, Audio, Subtitles) when presented to the viewer. The PTS is given in units related to a program's overall clock reference, either Program Clock Reference (PCR) or System Clock Reference (SCR), which is also transmitted in the transport stream or program stream.

The Decode Time Stamp (DTS) indicates the time at which an access unit should be instantaneously removed from the receiver buffer and decoded. It differs from the Presentation Time Stamp (PTS) only when picture reordering is used for B pictures. If DTS is used, PTS may be provided in the bit stream.

The above description may be applied to a case in which streams transmitted through one network use different timelines. For example, when the above-described scheme is used, a relay service provider, who collects streams transmitted through a plurality of heterogeneous networks and provides the streams to viewers, does not need to directly perform reprocessing for synchronization of different streams.

FIG. 34 illustrates syntax of the timeline component AU according to an embodiment of the present invention.

The timeline component AU may be expressed in another format such as XML or the like.

The timeline component AU may include identifier information, version information, AU_length information, location_flag information, PTS_flag information, DTS_flag information, media_time_flag information, NTP_time_flag information, PTP_time_flag information, timecode_flag information, PCR_time_flag information, location_length information, location information, timescale information, media_time_PTS information, media_time_DTS information, NTP_time_PTS information, NTP_time_DTS information, PTP_time_PTS information, PTP_time_DTS information, timecode_PTS information, timecode_DTS information, PCR_time_PTS information, and/or PCR_time_DTS information.

The identifier information is an identifier that uniquely indicates a structure of the timeline component AU.

The version information may indicate lengths of timestamp fields such as a lower PTS, DTS and the like. For example, the length may correspond to 64 bits when the version information has a value of 1, and correspond to 32 bits when the version information has a value of 0.

The AU_length information indicates a length of the timeline component AU.

The location_flag information indicates whether the timeline component AU includes location information of a stream transmitted through an external network.

The PTS_flag information indicates whether the timeline component AU includes a PTS value.

The DTS_flag information indicates whether the timeline component AU includes a DTS value.

The media_time_flag information indicates whether a timestamp having a media time format is included.

The NTP_time_flag information indicates whether a timestamp having an NTP format is included.

The PTP_time_flag information indicates whether a timestamp having a PTP format is included.

The timecode_flag information indicates whether a timestamp having a society of motion picture and television engineers (SMPTE) time code format is included.

The PCR_time_flag information indicates whether a PCR-based timestamp of an MPEG-2 TS is included.

The location_length information indicates a length of a location field.

The location information indicates a URL or a unique ID of a stream transmitted through a heterogeneous network. When the location information indicates the unique ID, the location information may be used by being linked to information such as signaling data or the like.

The timescale information indicates a media timescale. The timescale information is information for identifying a unit of time indicated by other information.

The media_time_PTS information indicates a PTS expressed in a media time format.

The media_time_DTS information indicates a DTS expressed in a media time format.

The NTP_time_PTS information indicates a PTS expressed in an NPT format.

The NTP_time_DTS information indicates a DTS expressed in an NPT format.

The PTP_time_PTS information indicates a PTS expressed in a PTP format.

The PTP_time_DTS information indicates a DTS expressed in a PTP format.

The PTP_time_PTS or PTP_time_DTS information can have a size either one 32 bits, 64 bits or 80 bits.

The timecode_PTS information indicates a PTS expressed in an SMPTE time code format.

The timecode_DTS information indicates a DTS expressed in an SMPTE time code format.

The PCR_time_PTS information indicates a PTS expressed in a PCR format.

The PCR_time_DTS information indicates a DTS expressed in a PCR format.

According to an embodiment of the present invention, the receiver may synchronize a stream transmitted through the broadcasting network with a stream transmitted through a heterogeneous network by applying at least one timestamp information included in the timeline component AU to a stream in an external network which is identified by the location information.

FIG. 35 illustrates syntax of the timeline component AU according to another embodiment of the present invention.

The timeline component AU may be expressed in another format such as XML or the like.

The timeline component AU may include identifier information, version information, AU_length information, location_flag information, PTS_flag information, DTS_flag information, timestamp_version_flag information, timestamp_type information, location_length information, location information, timescale information, media_time_PTS information, media_time_DTS information, timestamp_type_PTS information, and/or timestamp_to_DTS information (or timestamp_type_DTS information).

Description of information corresponding to the same term as that of the information included in syntax of the timeline component AU described above is replaced by the above description.

The timestamp_version_flag information indicates a timestamp format of a timeline to be mapped. For example, it is possible to indicate that a 32-bit format is to be used when the timestamp_version_flag information has a value of 0, and a 64-bit format is to be used when the timestamp_version_flag information has a value of 1.

The timestamp_type information indicates a type of a timestamp of a timeline to be mapped. For example, the timestamp_type information indicates that the type corresponds to a media time when the information has a value of 0x00, indicates that the type corresponds to NTP when the information has a value of 0x01, indicates that the type corresponds to PTP when the information has a value of 0x02, and indicates that the type corresponds to a time code when the information has a value of 0x03. When the information has a value of 0x04-0x1F, the type may be defined later, and the value may be reserved.

The timescale information may indicate a timescale that expresses a media time of a timeline to be mapped. For example, in an MPEG-2 TS, the timescale may have a value of 90K.

The media_time_PTS information may indicate a presentation timestamp of a timeline to be mapped, that is, a media time with respect to a point in time at which reproduction is performed. The media_time_PTS information may be indicated by a 32-bit format when a timestamp_version_flag value is 0, and indicated by a 64-bit format when the value is 1.

The media_time_DTS information may indicate a decoding timestamp of a timeline to be mapped, that is, a media time with respect to a point in time at which decoding is performed. The media_time_DTS information may be indicated by a 32-bit format when a timestamp_version_flag value is 0, and indicated by a 64-bit format when the value is 1.

The timestamp_type_PTS information may indicate a presentation timestamp according to a timestamp type of a timeline to be mapped, that is, a point in time at which reproduction is performed. The timestamp_type_PTS information may be indicated by a 32-bit format when a timestamp_version_flag value is 0, and indicated by a 64-bit format when the value is 1. For example, when a timestamp_type field value indicates NTP, a timestamp_type_PTS field value may have a timestamp value for an NTP-based reproduction time point.

The timestamp_type_DTS information may indicate a decoding timestamp according to a timestamp type of a timeline to be mapped, that is, a point in time at which decoding is performed. The timestamp_type_DTS information may be indicated by a 32-bit format when a timestamp_version_flag value is 0, and indicated by a 64-bit format when the value is 1. For example, when a timestamp- _type field value indicates an NTP, a timestamp_type_PTS field value may have a timestamp value for an NTP-based decoding time point.

FIG. 36 illustrates a scheme of synchronizing a stream transmitted through a heterogeneous network (for example, the Internet) with a stream transmitted through the broadcasting network using a timeline component when a timestamp of a broadcasting network transmission packet is absent according to an embodiment of the present invention.

In the above-described synchronization scheme through sharing of a timeline between transport streams transmitted through heterogeneous networks using the timeline component, the timeline may be shared by mapping a timestamp of a packet header of a broadcasting network transport stream to a timestamp of an Internet transport stream included in a timeline component AU of a packet payload on a one-to-one basis.

However, timestamp-related information may not be present in a header of the broadcasting network transmission packet.

As in the figure, when the timestamp-related information is not present in the header of the transmission packet, additional information for an origin timestamp in a timeline is needed. The timeline may be shared between the broadcasting network and the Internet by mapping the origin timestamp to the timestamp of the Internet transport stream on a one-to-one basis.

Information related to the origin timestamp and the timestamp of the transport stream in the heterogeneous network (for example, the Internet) may be included in the timeline component AU.

The origin timestamp may be defined as a timestamp on a reference timeline. For example, in the above-described embodiment, a timestamp for the stream transmitted through the broadcasting network may be defined as the origin timestamp.

The origin timestamp may represent a timeline reference value for constituting a timeline of a stream transmitted over an internal network (e.g., the broadcast network).

FIG. 37 illustrates syntax of the timeline component AU according to another embodiment of the present invention.

Syntax of the timeline component AU according to another embodiment of the present invention may include information related to the origin timestamp in addition to syntax of the timeline component AU described above.

The timeline component AU may include identifier information, version information, AU_length information, location_flag information, origin_PTS_flag information, origin_DTS_flag information, origin_PTS information, origin_DTS information, location_length information, PTS_flag information, DTS_flag information, media_time_flag information, NTP_time_flag information, PTP_time_flag information, timecode_flag information, PCR_time_flag information, location_URL_length information, location_URL information, timescale information, media_time_PTS information, media_time_DTS information, NTP_time_PTS information, NTP_time_DTS information, PTP_time_PTS information, PTP_time_DTS information, timecode_PTS information, timecode_DTS information, PCR_time_PTS information, and/or PCR_time_DTS information.

Description of information corresponding to the same term as that of the information included in syntax of the timeline component AU described above is replaced by the above description.

The origin_PTS_flag information indicates whether the timeline component AU includes an origin_PTS value.

The origin_DTS_flag information indicates whether the timeline component AU includes an origin DTS value.

The origin_PTS information indicates a PTS of a current packet on a reference base timeline of timeline mapping.

The origin_DTS information indicates a DTS of a current packet on a reference base timeline of timeline mapping.

The location_URL_length information indicates a length of the location_URL information.

The location_URL information may indicate a URL of a stream transmitted through a heterogeneous network, or an identifier that uniquely identifies the stream transmitted through the heterogeneous network.

The receiver may acquire a timeline component AU from a packet payload of a transport stream in the broadcasting network, and parse origin_PTS information and/or origin_DTS information in the timeline component AU to acquire timestamp information for the transport stream in the broadcasting network based on the parsed information. The receiver may synchronize a transport stream of the broadcasting network with a transport stream of a heterogeneous network using information related to the timestamp of the transport stream in the broadcasting network acquired through the origin_PTS information and/or the origin_DTS information and a timestamp for the heterogeneous network included in the timeline component AU.

FIG. 38 illustrates syntax of the timeline component AU according to another embodiment of the present invention.

The timeline component AU may include additional metadata related to a media stream transmitted through the broadcasting network or the Internet. The figure illustrates the timeline component AU which includes metadata for a timeline related to the media stream among the additional metadata.

The timeline component AU may be expressed in another format such as XML.

The timeline component AU may include identifier information, AU_length information, location_flag information, origin_timestamp_flag information, timestamp_version information, timestamp_type information, timestamp_format information, location_length information, location information, origin_timestamp_version information, origin_timestamp_type information, origin_timestamp_format information, origin_location_flag information, origin_location_length information, origin_location information, origin_timescale information, origin_media_time information, origin_timestamp information, private_data_1-ength information, private_data_bytes( )information, timescale information, media_time information, timestamp information and/or data_bytes( ) information.

Description of information corresponding to the same term as that of the information included in syntax of the timeline component AU described above is replaced by the above description.

The identifier information may be an identifier indicating that it is metadata related to a timeline, or an identifier indicating that a structure of the timeline component AU is included.

The AU_length information may indicate a length of information included in the timeline component AU.

The location_flag information may indicate whether location information of a service, a content component, or the like related to information included in the timeline component AU is included.

The origin_timestamp_flag information may indicate whether information related to an origin timestamp is included.

The timestamp_version information may indicate version information of a timestamp included in the timeline component AU.

The timestamp_type information may indicate a type of a timestamp included in the timeline component AU. For example, the timestamp_type information may indicate a DTS that indicates a point in time at which data of an access unit or the like (for example, an audio access unit) of a related service/content component is decoded when the timestamp_type information has a value of 0x00, and the timestamp_type information may indicate a PTS that indicates a point in time at which data of an access unit or the like (for example, an audio access unit) of a related service/content component is reproduced when the timestamp_type information has a value of 0x01.

The timestamp_format information may indicate a format of a timestamp included in the timeline component AU. For example, the timestamp_format information may indicate that the format is a media time when the information has a value of 0x00, an NTP when the information has a value of 0x01, a PTP when the information has a value of 0x02, and a time code when the information has a value of 0x03. Values of 0x04-0x0F may be reserved for future extension.

The location_length information may indicate a length of a location field.

The location information may indicate location information of a service, a content component, or the like related to information included in the timeline component AU. The location information may be expressed in a form such as an IP address/port number, a URI, or the like.

The origin_timestamp_version information may indicate a version of a timestamp format with respect to a base timeline that may serve as a reference line of timeline mapping. It is possible to indicate that a 32-bit format is used when a value of the corresponding field is 0, and a 64-bit format is used when the value is 1. For example, when a video stream is transmitted through the broadcasting network and an audio stream is transmitted through the Internet, and timeline mapping of the audio stream to the video stream is performed, a timestamp of the video stream transmitted through the broadcasting network may correspond to a reference base timeline. In this case, the origin_timestamp_version information may indicate a timestamp format of the video stream transmitted through the broadcasting network.

The origin_timestamp_type information may indicate a type of a timestamp with respect to a base timeline that may serve as a reference line of timeline mapping. For example, the origin_timestamp_type information may indicate a DTS that indicates a point in time at which data of an access unit or the like (for example, an audio access unit) of a service/content component or the like related to the base timeline is decoded when the origin_timestamp_type information has a value of 0x00, and the origin_timestamp_type information may indicate a PTS that indicates a point in time at which data of an access unit or the like (for example, an audio access unit) of a service/content component or the like related to the base timeline is reproduced when the origin_timestamp_type information has a value of 0x01.

The origin_timestamp_format information may indicate a format of a timestamp with respect to a base timeline that may serve as a reference line of timeline mapping. For example, the origin_timestamp_format information may indicate that the format is a media time when the information has a value of 0x00, an NTP when the information has a value of 0x01, a PTP when the information has a value of 0x02, and a time code when the information has a value of 0x03. Values of 0x04-0x0F may be reserved for future extension.

The origin_location_flag information may indicate whether location information of a service/content component or the like related to a base timeline that may serve as a reference line of timeline mapping is included.

The origin_location_length information may indicate a length of an origin_location field.

The origin_location information may indicate location information of a service/content component or the like related to a base timeline that may serve as a reference line of timeline mapping. The origin_location information may be expressed in a form such as an IP address/port number, a URI, or the like.

The origin_timescale information may indicate a timescale that may be used when expressing a media time of a base timeline that serves as a reference line of timeline mapping. For example, in an MPEG-2 TS, the timescale may have a value 90K.

The origin_media_time information may indicate a media time on a base timeline that serves as a reference line of timeline mapping. Content contained in a corresponding media time may vary with an origin_timestamp_type. For example, the origin_media_time information may indicate a media time with respect to a reproduction time point when the origin_timestamp_type is a PTS, and indicate a media time with respect to a decoding time point when the origin_timestamp_type is a DTS. The origin_media_time information may be indicated by 32 bits when an origin_timestamp_version value is 0 and by 64 bits when the corresponding field value is 1.

The origin_timestamp information may indicate a timestamp of a format that varies with a field value of an origin_timestamp_format on a base timeline serving as a reference line of timeline mapping, and content contained in a timestamp corresponding to the origin_timestamp information may vary with the origin_timestamp_type. For example, when the origin_timestamp_type indicates a DTS and a value of the origin_timestamp_format is '0x01', the timestamp corresponding to the origin timestamp information may indicate a decoding time point expressed by an NTP. The origin_timestamp information may be indicated by 32 bits when the origin_timestamp_version is 0 and by 64 bits when the corresponding field value is 1.

The private_data_length information may indicate a length having a byte as a unit of the following private_data_bytes.

The private_data_bytes( ) information indicates an area which may be privately defined to have a length corresponding to a private_data_length or include extended content later.

The timescale information may indicate a time scale available for use when expressing a media time.

The media_time information may indicate a media time. Content contained in a media time corresponding to the media_time information may vary with a timestamp_type. For example, when the timestamp_type is a PTS, the media_time information may indicate a media time with respect to a reproduction time point. The media_time information may be indicated by 32 bits when a timestamp_version value is 0 and by 64 bits when the corresponding field value is 1.

The timestamp information may indicate a timestamp of a format that varies with a field value of a timestamp_format, and content contained in a timestamp corresponding to the timestamp information may vary with a timestamp_type. For example, when the timestamp_type indicates a DTS and the timestamp_format has a value '0x01', the timestamp corresponding to the timestamp information may indicate a decoding time point expressed by an NTP. The timestamp information may be indicated by 32 bits when a timestamp_version value is 0 and by 64 bits when the corresponding field value is 1.

The data_bytes( ) information indicates fields or areas for including extended content later.

FIG. 39 illustrates a method of synchronization between a stream transmitted over a broadcast network and a stream transmitted over a heterogeneous network using timeline reference signaling information according to another embodiment of the present invention.

As described above, when a video stream is transmitted over the broadcast network and an audio stream is transmitted over the Internet network, the two streams need to be synchronized for one service to be decoded and/or reproduced. However, since the two streams have different timelines, a mechanism to map the two timelines to each other is needed.

According to another embodiment, at least one stream transmitted over a heterogeneous network such as the broadcast network and the Internet network maybe synchronized using the timeline reference signaling information. That is, streams transmitted from the receiver of the aforementioned broadcast system over heterogeneous networks such as the broadcast network and the Internet network may be synchronized and used for one service.

The transmitter according to another embodiment transmits information enabling a stream transmitted over the broadcast network to be synchronized with a stream transmitted over the heterogeneous network using the timeline reference signaling information. To this end, the transmitter of this embodiment may include a signaling encoder (not shown), a broadcast network interface (not shown), and/or a heterogeneous network interface (not shown).

The signaling encoder encodes timeline reference signaling information containing metadata for synchronizing streams transmitted via one or more networks.

The signaling encoder may include a first encoder for encoding a broadcast stream including a first portion (e.g., video information) of the broadcast content and the timeline reference signaling information and a second encoder for encoding a heterogeneous stream including a second portion (e.g., audio information) of the broadcast content.

The timeline reference signaling information may include at least one timeline reference information constituting timeline of at least one of the broadcast stream and the heterogeneous stream.

The broadcast network interface may transmit the encoded broadcast stream via a broadcast network.

The heterogeneous network interface may transmit the encoded heterogeneous stream via a heterogeneous network.

In addition, the receiver according to another embodiment may synchronize a stream transmitted via the broadcast network with a stream transmitted via a heterogeneous network using the timeline reference signaling information. To this end, the receiver of this embodiment may include a broadcast network interface (not shown), a heterogeneous network interface (not shown), and/or a processor (not shown).

The broadcast network interface may receive a broadcast stream including a first portion (e.g., video information) of the broadcast content via a broadcast network. The broadcast network interface may include the broadcast interface J2030 and/or the transport packet interface J32070 as described above.

The heterogeneous network interface may receive a heterogeneous stream including a second portion (e.g., audio information) of the broadcast content via a heterogeneous network. The heterogeneous network interface may include the Internet interface J2020 and/or the broadband packet interface J32080 as described above.

The broadcast stream may include timeline reference signaling information containing metadata for synchronizing streams transmitted via the one or more networks. The timeline reference signaling information may include at least one timeline reference information constituting a timeline of at least one of the broadcast stream and the heterogeneous stream.

The processor may configure the broadcast content using the broadcast stream and the heterogeneous stream based on the timeline reference signaling information. The processor may include the processor J2080 and/or the A/V processor J32110 described above.

The broadcast stream according to another embodiment may include a packet header and/or a packet payload. The packet header may include a timestamp for the broadcast stream. The packet payload may include the timeline reference signaling information. However, embodiments of the present invention are not limited thereto. The timeline reference signaling information may be included in the packet header.

When the timeline reference signaling information is included in the packet payload and transmitted, the timeline reference signaling information may be included in a timeline reference information AU (access unit). A timeline component AU may include the timeline reference information AU. However, embodiments of the present invention are not limited thereto. The timeline reference information AU may be present independently of the timeline component AU.

In the case in which the timeline reference signaling information is included in the packet header, timeline reference signaling information may be included in an extended header extension.

The timeline component AU and/or timeline reference information AU transmitted via the broadcast network may include internal timeline reference information constituting timeline of a stream transmitted via the broadcast network, which is an internal network, and/or external timeline reference information capable of mapping the timeline of a stream transmitted via the heterogeneous network (e.g., Internet network), which is an external network to the internal network.

The timestamp described above represents a time to start decoding such as a DTS and/or a PTS and/or a time to start presentation. Accordingly, the timestamp indicates only times such as the decoding time and the presentation time at which a specific event occurs.

The timeline reference information according to another embodiment represents a reference clock value constituting the timeline of a media stream transmitted over the internal network and/or the external network. Herein, the reference clock value represents time information indicating a time constituting the timeline of the media stream. Herein, the time constituting the timeline may correspond to a predetermined time in a broadcast system. For example, the reference clock value may include timestamp information such as DTS and PTS and/or a wall clock. However, the reference clock value is not limited to the DTS and/or the PTS.

In addition, the timeline reference information AU may be packetized in the form of a packet structure identical to that of a broadcast network transmission stream.

According to another embodiment of the present invention, the receiver may synchronize two streams transmitted via the broadcast network and the heterogeneous network (e.g., the Internet network) on one timeline based on the timeline reference information AU, thereby decoding and/or reproducing the same. For example, the receiver and/or the processor may configure broadcast content using the broadcast stream and the heterogeneous stream based on the timestamps and/or the timeline reference signaling information. The receiver and/or the processor may map a stream transmitted via the broadcast network to a stream transmitted via the heterogeneous network based on the internal timeline reference information and the external timeline reference information. In the case in which the external timeline reference information includes timestamp information such as DTS and/or PTS, the receiver and/or the processor may map the stream transmitted via the broadcast network to the stream transmitted via the heterogeneous network based on the external timeline reference information and the timestamp information constituting the timeline of a media stream transmitted over the internal network.

The description given above may also be applied to a case in which streams transmitted via one network use different timelines. For example, when a heterogeneous stream corresponds to a broadcast stream, the timeline of the heterogeneous stream may differ from that of the broadcast stream.

With the method described above, a relay service operator collecting the streams transmitted via a plurality of heterogeneous networks and providing the same to viewers need not directly perform reprocessing for synchronization of the different streams.

FIG. 40 illustrates a syntax of a timeline reference information AU according to another embodiment of the present invention.

The timeline reference information AU may be presented in other formats such as XML. The timeline reference information AU may be applied to various media transmission protocols such as RPT and ALC/LCT, and used by being operatively connected with service signaling information proper for the protocols.

The service signaling information may include information such as information indicating that a stream is carrying a timeline reference of an internal network or an external network, external media URL information contained in the timeline reference information AU, flag information indicating whether various fields are included, and/or timescale information which are applicable to each packet in common.

Specifically, the timeline reference information AU may include AU_identifier information, AU_length information, external_media_URL_flag information, internal_timeline_reference_flag information, external_timeline_reference_flag information, external_media_URL_length information, external_media_URL information, internal_timeline_reference_format information, internal_timeline_reference_timescale_flag information, internal_timeline_reference_length information, internal_timeline_reference_timescale information, internal_timeline_reference information, external_timeline_reference_format information, external_timeline_reference_timescale_flag information, external_timeline_reference_length information, external_timeline_reference_timescale information, and/or external_timeline_reference information. The information which the timeline reference information AU includes may be referred to as timeline reference signaling information.

Description of the information included in the syntax of the timeline component AU described above may be applied to the information assigned the same names.

The AU_identifier information is an identifier uniquely representing the structure of the timeline reference information AU.

The AU_length information indicates the length of a timeline reference information AU.

The external_media_URL_flag information indicates whether or not the timeline reference information AU includes URL information of a stream transmitted via an external network (e.g., the Internet network).

The internal_timeline_reference_flag information indicates whether not the timeline reference information AU includes internal timeline reference information.

The external_timeline_reference_flag information indicates whether or not the timeline reference information AU includes external timeline reference information.

The external_media_URL_length information indicates the length of the external media URL information. For example, the external_media_URL_length information may indicate the length of the external_media_URL information in bytes.

The external_media_URL information may include such information as location information about media transmitted via an external network (e.g., the Internet network), and/or a unique identifier (identification information). For example, if the media transmitted over the external network is MPEG-DASH, the external_media_URL information may include a URL of the corresponding MPD and/or MPD ID.

The internal_timeline_reference_format information may indicate the format of the internal timeline reference. For example, if the value of the internal_timeline_reference_format information is 0x00, this may indicate that the format is the media time. If the value is 0x01, this may indicate that the format is the network time protocol (NTP). If the value is 0x02, this may indicate that the format is PTP. If the value is 0x03, this may indicate that the format is the timecode. If the value is one of 0x04 to 0x1F, it may be reserved such that the format can be defined later.

The internal_timeline_reference_timescale_flag information indicates whether or not the timeline reference information AU contains a timescale about the internal timeline reference.

The internal_timeline_reference_length information indicates the length of the internal timeline reference value. For example, the internal_timeline_reference_length information may indicate the length of the internal timeline reference value in bytes.

The internal_timeline_reference_timescale information indicates the time unit of the internal timeline reference information. For example, the internal_timeline_reference_timescale information may indicate the time unit of the internal timeline reference value in Hz.

The internal_timeline_reference information indicates a reference clock value constituting the timeline of a media stream transmitted over the internal network.

The external_timeline_reference_format information may indicate the format of the external timeline reference. For example, if the value of the external_timeline_reference_format information 0x00, this may indicate the media time. If the values is 0x01, this may indicate the network time protocol (NTP). If the value is 0x02, this may indicate PTP. If the value is 0x03, this may indicate the timecode. If the value is one of 0x04 to 0x1F, it may be reserved such that the format can be defined later.

The external_timeline_reference_timescale_flag information indicates whether or not the timeline reference information AU contains a timescale of the external timeline reference.

The external_timeline_reference_length information indicates the length of the external timeline reference value. For example, the external_timeline_reference_length information may indicate the length of the external timeline reference value in bytes.

The external_timeline_reference_timescale information indicates the time unit of the external timeline reference information. For example, the external_timeline_reference_timescale information may indicate the time unit of the external timeline reference value in Hz.

The external_timeline_reference information indicates a reference clock value constituting the timeline of a media stream transmitted over an external network.

According to another embodiment of the present invention, the receiver and/or the processor may synchronize a stream transmitted over the broadcast network with a stream transmitted over a heterogeneous network by applying the internal_timeline_reference information and/or external_timeline_reference information which are included in the timeline reference information AU and/or the timeline component AU to the stream of the external network identified by the external_media_URL information. In addition, the receiver and/or the processor may configure broadcast content using the broadcast stream and the heterogeneous stream based on the external media URL information, the timeline reference information, and/or the timestamps.

FIG. 41 illustrates a syntax of a timeline reference information AU according to another embodiment of the present invention.

The timeline reference information AU of this embodiment may include at least one piece (or multiple pieces) of internal_timeline_reference information. In addition, the timeline reference information AU may include at least one (or multiple) external_timeline_reference information.

Specifically, the timeline reference information AU may include AU_identifier information, AU_length information, external_media_location_flag information, nb_of_timeline_reference information, external_media_URL_length information, external_media_URL information, timeline_reference_type information, timeline_reference_identifier information, timeline_reference_format information, timeline_reference_timescale_flag information, timeline_reference_length information, timeline_reference_timescale information, and/or timeline_reference information. The information included in the timeline reference information AU may be referred to as timeline reference signaling information.

Description of the information included in the syntax of the timeline reference information AU described above may be applied to the information assigned the same names.

The AU_identifier information is an identifier uniquely representing the structure of the timeline reference information AU.

The AU_length information indicates the length of a timeline reference information AU.

The external_media_URL_flag information indicates whether or not the timeline reference information AU includes URL information of a stream transmitted via an external network (e.g., the Internet network).

The nb_of_timeline_reference information indicates the number of timeline reference informations included in the timeline reference information AU.

The external_media_URL_length information indicates the length of the external media URL information. For example, the external_media_URL_length information may indicate the length of the external_media_URL information in bytes.

The external_media_URL information may include such information as location information about media transmitted via an external network (e.g., the Internet network), and/or a unique identifier. For example, if the media transmitted over the external network is MPEG-DASH, the external_media_URL information may include may include a URL of the corresponding MPD, and/or MPD ID.

The timeline_reference_type information indicates the type of the timeline reference information. For example, if the timeline_reference_type information is set to '0', the type of the timeline reference information may indicate internal timeline reference information. If the timeline_reference_type information is set to '1', the type of the timeline reference information may indicate external timeline reference information.

The timeline_reference_identifier information is a unique identifier of the timeline reference information. For example, the timeline_reference_identifier information may be assigned an integer value between 0 and 127.

The timeline_reference_format information may indicate the format of the internal timeline reference information and/or the format of the external timeline reference information. For example, if the value of the timeline_reference_format information is 0x00, this may indicate that the format is the media time. If the value is 0x01, this may indicate that the format is the network time protocol (NTP). If the value is 0x02, this may indicate that the format is PTP. If the value is 0x03, this may indicate that the format is the timecode. If the value is one of 0x04 to 0x1F, it may be reserved such that the format can be defined later.

The timeline_reference_timescale_flag information indicates whether or not the timeline reference information AU contains timescale information about the internal timeline reference information and/or the external timeline reference information.

The timeline_reference_length information indicates the length of the internal timeline reference value and/or the length of the external timeline reference value. For example, the timeline_reference_length information may indicate the length of the internal timeline reference value and/or the length of the external timeline reference value in bytes.

The timeline_reference_timescale information indicates the time unit of the internal timeline reference value and/or the time unit of the external timeline reference value. For example, the timeline_reference_timescale information may indicate the time unit of the internal timeline reference value and/or the time unit of the external timeline reference value in Hz.

The timeline_reference information indicates a reference clock value constituting the timeline of a media stream transmitted over an internal network and/or an external network. For example, the timeline_reference information may have at least one value (or multiple values) based on the nb_of_timeline_reference information. The timeline_reference information may include at least one internal_timeline_reference information and/or at least one external_timeline_reference information described above.

According to another embodiment of the present invention, the receiver may synchronize a stream transmitted over the broadcast network with a stream transmitted over a heterogeneous network by applying at least one timeline_reference information included in the timeline component AU and/or the timeline reference information AU to the stream of the external network identified by the external_media_URL information. Specifically, the receiver may synchronize a stream transmitted over the broadcast network with a stream transmitted over a heterogeneous network by applying at least one (or multiple) internal_timeline_reference information and/or at least one (multiple) external_timeline_reference information included in the timeline component AU and/or the timeline reference information AU to the stream of the external network identified by the external_media_URL information.

FIG. 42 illustrates the structure of an LCT packet supporting transmission of timeline reference information according to another embodiment of the present invention.

A broadcast stream according to this embodiment may include an LCT packet. The timeline reference signaling information of this embodiment may be transmitted by being included in an extended Header Extension. For example, the LCT packet may include the timeline reference signaling information by extending the existing header extension (EXT_TIME). According to this embodiment, the timeline reference signaling information is information for synchronization of media streams transmitted over heterogeneous networks. The timeline reference signaling information may include information identical and/or similar to the timeline reference information AU described above. The timeline reference signaling information may be applied to a packet for a transmission protocol such as the real-time protocol (RTP).

The timeline reference signaling information may operate in connection with service signaling information proper for the aforementioned protocol. The service signaling information may include information such as information indicating that a stream is carrying a timeline reference of an internal network or an external network, external media URL information contained in the timeline reference information AU, flag information, and/or timescale information which are applicable to each packet in common.

A packet according to another embodiment may be an LCT packet. The LCT packet may include an LCT version number field (V), a congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (ISO, a Transport Object Identifier field (TOI), a Header Extensions field, an FEC Payload ID field, and/or an Encoding Symbol(s) field.

LCT version number field (V) indicates the protocol version number. For example, this field indicates the LCT version number. The version number field of the LCT header may be interpreted as the ROUTE version number field. This version of ROUTE implicitly makes use of version '1' of the LCT building block. For example, the version number is '0001b'.

The congestion control flag field (C) indicates the length of a Congestion Control Information field. C=0 indicates that the Congestion Control Information (CCI) field is 32-bits in length. C=1 indicates that the CCI field is 64-bits in length. C=2 indicates that the CCI field is 96-bits in length. C=3 indicates that the CCI field is 128-bits in length.

The Protocol-Specific Indication field (PSI) may be used as an indicator for a specific purpose in an LCT higher protocol. The PSI field indicates whether the current packet is a source packet or an FEC repair packet. As the ROUTE source protocol only delivers source packets, this field shall be set to '10b'.

Transport Session Identifier flag field(S) indicates the length of a Transport Session Identifier field.

The Transport Object Identifier flag field (O) indicates the length of a Transport Object Identifier field. For example, an object may represent one file, and the TOI is identification information about each object. A file with the TOI set to 0 is referred to as FDT.

The Half-word flag field (H) indicates whether or not a half-word (16 bits) is added to the length of the TSI and TOI fields.

Reserved field (Res) reserved for future use.

The Close Session flag field (A) indicates that a session closes or is about to close.

The Close Object flag field (B) indicates that an object being transmitted closes or is about to close.

The LCT header length field (HDR_LEN) indicates the total length of the LCT header in units of 32-bit words.

The Codepoint field (CP) indicates the type of the payload that is carried by this packet. Depending on the type of the payload, additional payload header may be added to prefix the payload data.

The Congestion Control Information field (CCI) is used in transmitting Congestion Control information such as layer numbers, logical channel numbers, and sequence numbers. The Congestion Control Information field in the LCT header contains the required Congestion Control Information.

The Transport Session Identifier field (TSI) is a unique identifier of a session. The TSI uniquely identifies a session among all sessions from a particular sender. Each TSI field may be mapped to each component and/or representation of MPEG-DASH.

This field identifies the Transport Session in ROUTE. The context of the Transport Session is provided by the LSID (LCT Session Instance description). The LSID defines what is carried in each constituent LCT transport session of the ROUTE session. Each transport session is uniquely identified by a Transport Session Identifier (TSI) in the LCT header. The LSID may be transmitted trough the same ROUTE session including LCT transport sessions, or may be transmitted via a communication network, a broadcast network, an Internet network, a cable network, and/or a satellite network. Means for transmission of the LSID are not limited thereto. For example, the LSID may be transmitted through a specific LCT transport session with the value of TSI set to '0'. The LSID may include signaling information about all transport sessions transmitted through the ROUTE session. The LSID may include LSID version information and information about validity of the LSID. The LSID may also include transport session information providing information about the LCT transport session. The transport session information may include TSI information for identifying a transport session, source flow information transmitted to a corresponding TSI and providing information about a source flow through which source data is transmitted, repair flow information transmitted to a corresponding TSI and providing information about a repair flow through which repair data is transmitted, and transport session property information including additional property information about the transport session.

The Transport Object Identifier field (TOI) is a unique identifier of an object. The TOI indicates which object within the session this packet pertains to. Each TOI field may be mapped to each segment of MPEG-DASH. However, embodiments of the present invention are not limited thereto. Each TOI field may be mapped to a part of a segment of MPEG-DASH such as Chunk, GOP, and/or Access Unit.

This field indicates to which object within this session the payload of the current packet belongs. The mapping of the TOI field to the object is provided by the Extended FDT. Extended FDT specifies the details of the file delivery data. This is the extended FDT instance. The extended FDT together with the LCT packet header may be used to generate the FDT-equivalent descriptions for the delivery object. The Extended FDT may either be embedded or may be provided as a reference. If provided as a reference the Extended FDT may be updated independently of the LSID. If referenced, it shall be delivered as an in-band object on TOI=0 of the included source flow.

The Header Extensions field is used as an LCT header extension part for transmission of additional information. The Header Extensions are used in LCT to accommodate optional header fields that are not always used or have variable size.

For example, EXT_TIME extension is used to carry several types of timing information. It includes general purpose timing information, namely the Sender Current Time (SCT), Expected Residual Time (ERT), and Sender Last Change (SLC) time extensions described in the present document.

The FEC Payload ID field includes identification information about an encoding symbol or a transmission block. FEC Payload ID indicates an identifier for a case in which the file is FEC-encoded. For example, when the FLUTE protocol file is FEC-encoded, an FEC Payload ID may be allocated in order for a broadcasting station or a broadcasting server to identify the file.

The Encoding Symbol(s) field may include data of a transmission block or an encoding symbol.

The packet payload contains bytes generated from an object. If more than one object is carried in the session, then the Transmission Object ID (TOI) within the LCT header MUST be used to identify from which object the packet payload data is generated.

Header Extensions (EXT_TIME) according to another embodiment may include a Header Extension Type field (HET), a Header Extension Length field (HEL), an SCT Hi field, an SCT Low field, an ERT field, an SLC field, a Reserved field, a Sender Current Time field, an Expected Residual Time field, and/or a Session Last Changed field. Header Extensions (EXT_TIME) may also include a Use field. The Use field may include an SCT Hi field, an SCT Low field, an ERT field, an SLC field, and/or a Reserved field.

The Header Extension Type field (HET) indicates the type of a corresponding Header Extension. The HET field may be an 8-bit integer. Basically, in LCT, if HET has a value between 0 and 127, Header Extension with a variable length in the unit of 32-bit word is present in HET, and the length thereof is described in Header Extension Length field (HEL) subsequent to HET. If HET has a value between 128 and 255, the Header Extension has a 32-bit fixed length. For example, the HET field may have '2' or a value less than or equal to '127' and identify Header Extension described above.

The HEL field indicates the total length of Header Extension with a variable length. Basically, in LCT, if HET has a value between 0 and 127, Header Extension with a variable length in the unit of 32-bit word is present in HET, and the HEL field subsequent to the HET field indicates the total length of Header Extension in the unit of 32-bit word.

The Use field (Use) indicates the semantic of the following 32-bit time value(s).

The SCT Hi field indicates whether or not a Sender Current Time field is included in the header extension.

The SCT Low field indicates whether or not a 64-bit Sender Current Time field is included in the header extension.

The ERT field indicates whether or not an Expected Residual Time field is included in the header extension.

The SLC field indicates whether or not a Session Last Changed field is included in the header extension.

The Reserved field (Res) is reserved for future use.

The Sender Current Time field represents the current clock at the sender and at the time this packet was transmitted, measured in units of 1 ms and computed modulo $2^{32}$ units from the start of the session.

When the SCT High field is set, the associated 32-bit time value provides an unsigned integer representing the time in seconds of the sender's wall clock. In the particular case where NTP is used, these 32 bits provide an unsigned integer representing the time in seconds relative to 00:00 hours GMT, Jan. 1, 1900, (i.e., the most significant 32 bits of a full 64-bit NTP time value).

When the SCT-Low flag is set, the associated 32-bit time value provides an unsigned integer representing a multiple of $\frac{1}{2}^{\wedge\wedge}32$ of a second, in order to allow sub-second precision. When the SCT-Low flag is set, the SCT-High flag MUST be set, too. In the particular case where NTP is used, these 32 bits provide the 32 least significant bits of a 64-bit NTP timestamp.

Expected Residual Time field represents the sender expected residual transmission time for the current session or for transmission of the current object, measured in units of 1 ms. If the packet containing the ERT field also contains the TOI field, then ERT refers to the object corresponding to the TOI field, otherwise it refers to the session.

If the packet containing the ERT timing information also contains the TOI field, then ERT refers to the object corresponding to the TOI field; otherwise, it refers to the only object in the session. When the ERT flag is set, it is expressed as a number of seconds. The 32 bits provide an unsigned integer representing this number of seconds.

Session Last Changed field represents the server wall clock time, in seconds, at which the last change to session data occurred. That is, it expresses the time at which the last (most recent) Transport Object addition, modification, or removal was made for the delivery session. In the case of modifications and additions, it indicates that new data will be transported that was not transported prior to this time. In the case of removals, SLC indicates that some prior data will no longer be transported. When the SLC field is set, the associated 32-bit time value provides an unsigned integer representing a time in seconds. In the particular case where NTP is used, these 32 bits provide an unsigned integer representing the time in seconds relative to 00:00 hours GMT, Jan. 1, 1900, (i.e., the most significant 32 bits of a full 64-bit NTP time value). In that case, handling of wraparound of the 32-bit time is outside the scope of NTP and LCT. In some cases, it may be appropriate that a packet containing an EXT_TIME Header Extension with SLC information also contain an SCT-High information.

The LCT packet may further include the timeline reference signaling information (internal_timeline_reference information and/or external_timeline_reference information) described above by extending the Header Extensions (EXT_TIME).

The timeline reference signaling information may include ITR Hi information, ITR Low information, ETR Hi information, ETR Low information, internal_timeline_reference_timescale_flag information (ITR Scale), external_timeline_reference_timescale_flag information (ETR Scale), internal_timeline_reference_format information (ITR Format), external_timeline_reference_format information (ETR Format), external_media_URL_flag information (URL), internal_timeline_reference information (Internal Timeline Reference), external_timeline_reference information (External Timeline Reference), internal_timeline_reference_timescale information (Internal Timeline Reference Timescale), external_timeline_reference_timescale information (External Timeline Reference Timescale), and/or external_media_URL information (External Media URL).

Header Extensions (EXT_TIME) may include Use information. The Use information may include ITR Hi information, ITR Low information, ETR Hi information, ETR Low information, internal_timeline_reference_timescale_flag information (ITR Scale), external_timeline_reference_timescale_flag information (ETR Scale), internal timeline_reference_format information (ITR Format), external_timeline_reference_format information (ETR Format), and/or external_media_URL_flag information (URL).

The ITR Hi information and/or the ITR Low information may be referred to as the internal_timeline_reference_flag information described above. The ETR Hi information and/or the ETR Low information may be referred to as the external_timeline_reference_flag information described above.

The ITR Hi (Internal Timeline Reference High Flag) information indicates whether or not 64-bit internal_timeline_reference information (Internal Timeline Reference) is included in the header extension.

The ITR Low (Internal Timeline Reference Low Flag) information indicates whether or not 32-bit internal_timeline_reference information (Internal Timeline Reference) is included in the header extension.

The ETR Hi (External Timeline Reference High Flag) information indicates whether or not 64-bit external_timeline_reference information is included in the header extension.

The ETR Low (External Timeline Reference Low Flag) information indicates whether or not 32-bit external_timeline_reference information is included in the header extension.

The internal_timeline_reference_timescale_flag information (ITR Scale) indicates whether or not 32-bit internal_timeline_reference_timescale information is included in the header extension.

The external_timeline_reference_timescale_flag information (ETR Scale) indicates whether or not 32-bit external_timeline_reference_timescale information is included in the header extension.

The internal timeline_reference_format information (ITR Format) may indicate the format of an internal timeline reference. For example, if the value of the internal timeline_reference_format information (ITR Format) is 0x00, this may indicate that the format is the media time. If the value is 0x01, this may indicate that the format is the network time protocol (NTP). If the value is 0x02, this may indicate that the format is PTP. If the value is 0x03, this may indicate that the format is the timecode. If the value is one of 0x04 to 0x1F, it may be reserved such that the format can be defined later.

The external_timeline_reference_format information (ETR Format) may indicate the format of an external timeline reference. For example, if the value of the external_timeline_reference_format information (ETR Format) is 0x00, this may indicate that the format is the media time. If the value is 0x01, this may indicate that the format is the network time protocol (NTP). If the value is 0x02, this may indicate that the format is PTP. If the value is 0x03, this may indicate that the format is the timecode. If the value is one of 0x04 to 0x1F, it may be reserved such that the format can be defined later.

The external_media_URL_flag information (URL) may indicate whether or not the external_media_URL information (External Media URL) is included in the header extension.

The internal_timeline_reference information (Internal Timeline Reference) indicates a reference clock value constituting the timeline of a media stream transmitted over the Internal network.

The external_timeline_reference information (External Timeline Reference) is a reference clock value constituting the timeline of a media stream transmitted over an external network.

The internal_timeline_reference_timescale information (Internal Timeline Reference Timescale) indicates the time unit of internal timeline reference information. For example, the internal_timeline_reference_timescale information may indicate the time unit of the internal timeline reference value in Hz.

The external_timeline_reference_timescale information (External Timeline Reference Timescale) indicates the time unit of external timeline reference information. For example, the external_timeline_reference_timescale information may indicate the time unit of the external timeline reference value in Hz.

The external_media_URL information (External Media URL) may include information such as location information about media transmitted via an external network (e.g., the Internet network), and/or a unique identifier. For example, if the media transmitted over the external network is MPEG-DASH, the external_media_URL information may include information such as URL of the corresponding MPD and/or MPD ID. The length of this field may be identified through the HEL field.

According to another embodiment of the present invention, the receiver and/or the processor may acquire LCT Header Extensions (EXT_TIME) from broadcast signals of the broadcast network and acquire the timeline reference signaling information from the Header Extensions (EXT_TIME). In addition, the receiver and/or the processor may synchronize a stream transmitted via the broadcast network with a stream transmitted via a heterogeneous network by applying timestamps, internal_timeline_reference information, and/or external_timeline_reference information to a stream of an external network identified by the external_media_URL information.

FIG. 43 illustrates the structure of an LCT packet supporting transmission of timeline reference information according to another embodiment of the present invention.

The LCT packet of this embodiment may include timeline reference signaling information (EXT_TRC (Extension for Timeline Reference Clock)) by extending the existing Header Extension. The timeline reference signaling information may include information identical and/or similar to the timeline reference information AU described above. The timeline reference signaling information may be applied to a packet for a transmission protocol such as the real-time protocol (RTP).

The timeline reference signaling information may operate in connection with service signaling information proper for the aforementioned protocol. The service signaling information may include information such as information indicating that a stream is carrying a timeline reference of an internal network or an external network, external_media_URL information contained in the timeline reference information AU, flag information, and/or timescale information which are applicable to each packet in common.

A packet according to another embodiment may be an LCT packet. The LCT packet may include an LCT version number field (V), a congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), a Header Extensions field, an FEC Payload ID field, and/or an Encoding Symbol(s) field.

The LCT packet may further include the timeline reference signaling information described above by extending the existing Header Extensions (EXT_TRC (Extension for Timeline Reference Clock)).

The timeline reference signaling information may include ITR Hi information, ITR Low information, ETR Hi information, ETR Low information, internal_timeline_reference_timescale_flag information (ITR Scale), external_timeline_reference_timescale_flag information (ETR Scale), external_media_URL_flag information (URL), Reserved information (Res), internal_timeline_reference_format information (ITR Format), external_timeline_reference_format information (ETR Format), internal_timeline_reference information (Internal Timeline Reference), external_timeline_reference information (External Timeline Reference), internal_timeline_reference_timescale information (Internal Timeline Reference Timescale), external_timeline_reference_timescale information (External Timeline Reference Timescale), and/or external_media_URL information (External Media URL).

Header Extensions (EXT_TIME) may include Use information. The Use information may include ITR Hi information, ITR Low information, ETR Hi information, ETR Low information, internal_timeline_reference_timescale_flag information (ITR Scale), external_timeline_reference_timescale_flag information (ETR Scale), external_media_URL_flag information (URL), Reserved information (Res), internal_timeline_reference_format information (ITR Format), and/or external_timeline_reference_format information (ETR Format).

Description of the information included in the LCT packet described above is applied to the information assigned the same names.

According to another embodiment of the present invention, the receiver and/or the processor may acquire Header Extensions (EXT_TIME) from broadcast signals of the broadcast network and acquire the timeline reference signaling information from the Header Extensions (EXT_TIME). In addition, the receiver and/or the processor may synchronize a stream transmitted via the broadcast network with a stream transmitted via a heterogeneous network by applying timestamps, internal_timeline_reference information, and/or external_timeline_reference information to a stream of an external network identified by the external_media_URL information.

FIG. 44 illustrates a synchronization scheme using the timeline component AU between a transport stream in the broadcasting network to which DASH is applied and a transport stream in a heterogeneous network (for example, the Internet) according to an embodiment of the present invention.

This figure illustrates an example in which a synchronization scheme between transport streams through heterogeneous networks is applied to DASH using a timeline component. In this example, a video stream may be transmitted through the broadcasting network, and an audio stream may be transmitted through the Internet. Even though both the streams are serviced by being encapsulated through DASH, the streams are transmitted through separate networks and thus may have different timelines as separate forms of content having separate MPDs.

To synchronize the two streams having separate timelines, the timeline component may be included in DASH content transmitted through the broadcasting network. The video stream transmitted through the broadcasting network and a timeline component stream may be included in one content to share one timeline. The timeline component includes timeline information of the audio stream transmitted through the Internet. The receiver may synchronize the transport stream in the Internet through a timeline of the broadcasting network based on this information.

The timeline component stream may be configured as one track similarly to the video stream or the audio stream in the DASH content. The timeline component stream may be assigned a timestamp such as a DTS, a PTS, or the like with an AU as a unit using timing information provided by MPD and traf boxes and the like, and mapped to a broadcasting network timeline. When the timeline component stream is configured as the track, signaling information may be needed to verify that the track includes the timeline component stream. The signaling information may be included in an hdlr box in an ISO BMFF-based DASH initialization segment, and provided as a handler_type that indicates a type of included media, a sample entry in an stsd box indicating initialization information and a specific type of a media stream and a media header box included in an minf box, and the like.

The timeline component may be indicated to be included in a metadata type by a handler type of "meta" in the hdlr box, and include a null media header box referred to as "nmhd".

FIG. 45 illustrates the sample entry for identifying a timeline component in the ISO BMFF according to an embodiment of the present invention.

According to the present embodiment, stream signaling information included in the stsd box may be configured as illustrated to identify the timeline component.

To identify a timeline component stream in a file, Timeline Component MetaData SampleEntry may be defined as a derived type of a metadata sample entry. Timeline Component MetaData SampleEntry may have a 4-byte type such as 'metc', and be uniquely identified in a file using the above-mentioned type field.

A location URL of a stream described by the timeline component or parameters for signaling and initialization such as an initial delay occurring until the stream is reproduced may be included in an "metc" sample entry.

FIG. 46 illustrates a track reference type box for expressing a dependency relation between a timeline component track and another track in the ISO BMFF according to an embodiment of the present invention.

To include the timeline component in an ISO BMFF-based file structure such as a DASH segment, it is possible to signal information about the dependency relation with respect to another track in addition to the above-described signaling information. This figure illustrates an example in which a dependency relation between the timeline component track and another track of the DASH segment is expressed through a tref box that expresses a dependency relation between tracks.

The tref box includes the track reference type box therein. The tref box may define a reference_type referred to as 'metl' as described above as a type for expressing a dependency relation between the above-described timeline component and another track. A track_ID in the tref box indicates an ID of a track having a reference relation. It is possible to express a dependency relation between the timeline component track and another track that shares a timeline with the timeline component track by defining the 'metl' reference type box.

As illustrated in the figure described above, the tref box including the above-described 'metl' box is included in a timeline component track box, and includes an ID of a video track having a dependency relation in the 'metl' box. Alternatively, the tref box and the 'metl' box may be included in the video track of the example, and a track_ID of 'metl' may include an ID of the timeline component track.

FIG. 47 illustrates a configuration for acquiring a service and/or content in the next generation broadcasting system according to an embodiment of the present invention.

The scheme proposed in the present invention enables the receiver to efficiently acquire a service or content through the broadcasting network or the Internet in the next generation broadcasting system.

The figure illustrates an example for acquisition of a service or content in a hybrid broadcasting system.

For example, Service 0 includes one video and one audio, and each video/audio may be acquired through an IP stream transmitted through a terrestrial broadcasting network.

In Service 1, an IP stream for transmitting a video and an IP stream for transmitting audio are transmitted through one PLP and thus the receiver may acquire Service 1 by decoding the PLP.

In Service N, while video is transmitted through the terrestrial broadcasting network, audio may be acquired through the Internet.

As described in the foregoing, the above-described embodiments of the present invention may be used when the receiver acquires a component included in Service 0, Service 1 or Service N. That is, the receiver may identify a PLP for transmitting each component included in Service 0, Service 1 or Service N, and decode the PLP to acquire a desired service.

FIG. 48 illustrates a scheme of accessing video data and/or audio data in the ISO BMFF according to an embodiment of the present invention.

The figure illustrates a partial structure of the ISO BMFF. The illustrated scheme of accessing video data and/or audio data includes synchronization between data during a local replay.

The receiver identifies a track using 'tkhd' in an ISO file.

The receiver may verify whether a media type is audio or video using 'hdlr' (handler_type).

The receiver may initialize a decoder using sample description of 'stbl', and decode data (samples) included in mdat using information included therein.

An 'stbl' box may include an 'stts' box, a 'ctts' box, an 'stsc' box, an 'stco' box and/or an 'stsz' box.

The 'stts' box indicates a decoding time. The 'stts' box includes information enabling indexing from a decoding time to a sample number. The 'stts' box may provide a pointer and a sample size derived from the sample number.

The 'ctts' box provides information about an offset between a decoding time and a composition time.

The 'stsc' box includes attribute information related to a chunk including a sample, a location of the chunk and/or the sample. Samples in media data may be grouped into chunks. Chunks may have different sizes, and samples in one chunk may have different sizes.

The 'stco' box may include index information of each chunk included in files. 'stco' box gives the offset of the start of a chunk into its containing media file.

'stsz' box contains the sample count and a table giving the size in bytes of each sample. This allows the media data itself to be unframed. The total number of samples in the media is always indicated in the sample count. 'stsz' box contains may contain information specifying the default sample size. If all the samples are the same size, the information contains that size value. If this information is set to 0, then the samples have different sizes, and those sizes are stored in the sample size table. If this information is not 0, it specifies the constant sample size, and no array follows.

The receiver may synchronize a video sample (video data) with an audio sample (audio data) using the above-described information included in the 'stbl' box.

FIG. 49 illustrates a scheme of accessing video data and/or audio data in the ISO BMFF according to another embodiment of the present invention.

The illustrated scheme of accessing video data and/or audio data includes synchronization between data during a streaming replay. In this case, the video data and/or the audio data are transmitted/received in states of being fragmented and/or segmented.

The receiver acquires basic information necessary for file decoding from an initialization segment. The receiver identifies a track using 'tkhd' in the ISO file.

The receiver may verify whether a media type is audio or video using 'hdlr' (handler_type).

The receiver initializes a decoder using attribute information of media on a current track included in an 'minf' box.

The receiver identifies a media segment corresponding to the track identified by 'tkhd' using a 'tfhd' box in the media segment, and acquires a sample description index corresponding to sample description of the 'minf' box.

The receiver extracts samples of the video data and/or the audio data using base data offset information included in the 'tfhd' box, data offset information included in a 'trun' box and/or sample size information included in the 'trun' box.

The receiver performs synchronization between the samples of the video data and/or the audio data using sample duration information and sample composition time offset information included in the 'trun' box.

The described methods of the present inventions may be performed in the transmitter or the receiver described above.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

MODE FOR INVENTION

Various embodiments have been described in the best mode for carrying out the invention.

INDUSTRIAL APPLICABILITY

The present invention is available in a series of broadcast signal provision fields. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An apparatus for receiving a service via one or more networks, the apparatus comprising:
a broadcast network interface of a broadcast receiver to receive a frame that includes a broadcast stream including a first component of the service via a broadcast network,
wherein the first component of the service is carried by at least one Layered Coding Transport (LCT) packet,
wherein a header of the at least one LCT packet includes information for representing reconfiguration of a presentation timeline,
wherein the broadcast stream further includes signaling data for synchronization of the first component and a second component of the service,
wherein the signaling data includes first timeline information and first timescale information of the first component that is received via the broadcast network and second timeline information and second timescale information of the second component that is received via a broadband network,
wherein the frame further includes information for fast service acquisition of the service, and
wherein the frame further includes physical layer signaling information that includes flag information for indicating whether the information for fast service acquisition is included in the frame;
a broadband network interface of the broadcast receiver to receive a broadband stream including the second component via the broadband network; and
a processor to output the service including the first component and the second component by synchronizing the first component and the second component based on at least the first timescale information of the first component and the second timescale information of the second component included in the signaling data.

2. The apparatus of claim 1, wherein the signaling data further includes internal timeline reference information for identifying predetermined time information constituting timeline of the broadcast stream and external timeline reference information for identifying predetermined time information constituting timeline of the broadband stream.

3. The apparatus of claim 1, wherein the signaling data further includes external media URL information identifying the broadband stream, and
wherein the external media URL information includes one of location information or identification information.

4. The apparatus of claim 1, wherein the broadband stream corresponds to an internet stream.

5. An apparatus for transmitting a service via one or more networks, the apparatus comprising:
a first encoder to encode a first component of the service,
wherein the first component of the service is carried by at least one Layered Coding Transport (LCT) packet, and
wherein a header of the at least one LCT packet includes information for representing reconfiguration of a presentation timeline;
a second encoder to encode a second component of the service;
a broadcast network interface of a broadcast station to transmit a frame that includes a broadcast stream including the encoded first component via a broadcast network; and
a broadband network interface of the broadcast station to transmit a broadband stream including the encoded second component via a broadband network,
wherein the broadcast stream transmitted via the broadcast network further includes signaling data for synchronization of the first component and the second component,
wherein the signaling data includes first timeline information and first timescale information of the first component transmitted via the broadcast network and second timeline information and second timescale information of the second component transmitted via the broadband network,
wherein the synchronization of the first component and the second component in a broadcast receiver is performed based on at least the first timescale information of the first component and the second timescale information of the second component included in the signaling data,
wherein the frame further includes information for fast service acquisition of the service, and wherein the frame further includes physical layer signaling information that includes flag information for indicating whether the information for fast service acquisition is included in the frame.

6. The apparatus of claim 5, wherein the signaling data further includes internal timeline reference information for identifying predetermined time information constituting timeline of the broadcast stream and external timeline reference information for identifying predetermined time information constituting timeline of the broadband stream.

7. The apparatus of claim 5, wherein the signaling data further includes external media URL information identifying the broadband stream, and
wherein the external media URL information includes one of location information or identification information.

8. The apparatus of claim 5, wherein the broadband stream corresponds to an internet stream.

9. A method of receiving a service via one or more networks, the method comprising:
receiving, by a broadcast network interface of a broadcast receiver, a frame that includes a broadcast stream including a first component of the service via a broadcast network,
wherein the first component of the service is carried by at least one Layered Coding Transport (LCT) packet,
wherein a header of the at least one LCT packet includes information for representing reconfiguration of a presentation timeline,
wherein the broadcast stream further includes signaling data for synchronization of the first component and a second component of the service,
wherein the signaling data includes first timeline information and first timescale information of the first component that is received via the broadcast network and second timeline information and second timescale information of the second component that is received via a broadband network,
wherein the frame further includes information for fast service acquisition of the service, and
wherein the frame further includes physical layer signaling information that includes flag information for indicating whether the information for fast service acquisition is included in the frame;
receiving, by a broadband network interface of the broadcast receiver, a broadband stream including the second component via the broadband network; and
outputting the service including the first component and the second component by synchronizing the first component and the second component based on at least the first timescale information of the first component and the second timescale information of the second component included in the signaling data.

10. A method of transmitting a service via one or more networks, the method comprising:
encoding a first component of the service,
wherein the first component of the service is carried by at least one Layered Coding Transport (LCT) packet, and
wherein a header of the at least one LCT packet includes information for representing reconfiguration of a presentation timeline;
encoding a second component of the service;
transmitting, by a broadcast network interface of a broadcast station, a frame that includes a broadcast stream including the encoded first component via a broadcast network; and
transmitting, by a broadband network interface of the broadcast station, a broadband stream including the encoded second component via a broadband network,
wherein the broadcast stream transmitted via the broadcast network includes signaling data for synchronization of the first component and the second component,
wherein the signaling data includes first timeline information and first timescale information of the first component that is transmitted via the broadcast network and second timeline information and second timescale information of the second component that is transmitted via the broadband network,
wherein the synchronization of the first component and the second component in a broadcast receiver is performed based on at least the first timescale information of the first component and the second timescale information of the second component included in the signaling data,
wherein the frame further includes information for fast service acquisition of the service, and
wherein the frame further includes physical layer signaling information that includes flag information for indicating whether the information for fast service acquisition is included in the frame.

* * * * *